US012734706B2

(12) United States Patent
Miyauchi et al.

(10) Patent No.: US 12,734,706 B2
(45) Date of Patent: Sep. 15, 2026

(54) ROBOT CONTROL SYSTEM, METHOD OF CONTROLLING A ROBOT, AND INFORMATION STORAGE MEDIUM

(71) Applicant: Kabushiki Kaisha Yaskawa Denki, Kitakyushu (JP)

(72) Inventors: Kohei Miyauchi, Kitakyushu (JP); Takashi Suyama, Kitakyushu (JP); Keisuke Shiraga, Kitakyushu (JP); Hisashi Ideguchi, Kitakyushu (JP); Hiroki Tachikake, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 138 days.

(21) Appl. No.: 18/750,523

(22) Filed: Jun. 21, 2024

(65) Prior Publication Data

US 2024/0424683 A1 Dec. 26, 2024

(30) Foreign Application Priority Data

Jun. 23, 2023 (JP) ................................ 2023-103527
Jun. 23, 2023 (JP) ................................ 2023-103528

(51) Int. Cl.
*B25J 11/00* (2006.01)
*B25J 9/16* (2006.01)
*B25J 19/02* (2006.01)

(52) U.S. Cl.
CPC ......... *B25J 11/0055* (2013.01); *B25J 9/1661* (2013.01); *B25J 19/023* (2013.01)

(58) Field of Classification Search
CPC .... B25J 11/0055; B25J 9/1661; B25J 19/023; B25J 9/1684; B25J 9/1602; B25J 9/161;
(Continued)

(56) References Cited

U.S. PATENT DOCUMENTS

2007/0162174 A1* 7/2007 Doke .................... B25J 9/0093 700/114
2010/0043610 A1 2/2010 Tanaka
(Continued)

FOREIGN PATENT DOCUMENTS

JP 7-265035 A 10/1995
JP 8-252785 A 10/1996
(Continued)

OTHER PUBLICATIONS

Japanese Office Action issued May 21, 2024 in corresponding JP application No. 2023-103528 (with English Translation), 4 pages.
(Continued)

*Primary Examiner* — Jason Holloway
*Assistant Examiner* — Elizabeth Rose Neleski
(74) *Attorney, Agent, or Firm* — Oblon, McClelland, Maier & Neustadt, L.L.P.

(57) ABSTRACT

A robot control system, comprising: a robot configured to hold a cutter; and circuitry configured to control the robot so that the robot cuts a packaging material with a blade of the cutter, and control the robot so that the blade is oriented more toward an outer side of the packaging material when the robot cuts a face of the packaging material with the blade than when the robot cuts a corner of the packaging material with the blade.

20 Claims, 27 Drawing Sheets

(58) Field of Classification Search
CPC .. B25J 13/00; B26D 2001/006; B26D 1/0006; B26D 3/10; B26D 5/005; B65B 57/02; B65B 69/0033
See application file for complete search history.

(56) References Cited

U.S. PATENT DOCUMENTS

| | | | | |
|---|---|---|---|---|
| 2012/0247289 | A1 | 10/2012 | Tanaka | |
| 2012/0247295 | A1 | 10/2012 | Tanaka | |
| 2013/0247727 | A1 | 9/2013 | Tanaka | |
| 2022/0063042 | A1* | 3/2022 | Edwards | B25J 11/0055 |
| 2022/0219857 | A1* | 7/2022 | Tsujimori | B25J 15/009 |

FOREIGN PATENT DOCUMENTS

| | | | |
|---|---|---|---|
| JP | 2022-64268 | A | 2/2002 |
| JP | 2003-81229 | A | 3/2003 |
| JP | 2004-244028 | A | 9/2004 |
| JP | 2020-23357 | A | 2/2020 |
| WO | WO2007/039978 | A1 | 4/2007 |
| WO | WO2020/105631 | A1 | 5/2020 |

OTHER PUBLICATIONS

Extended European Search Report issued Dec. 3, 2024 in European Patent Application No. 24182802.9, 11 pages.

* cited by examiner

C3
CP
C4
RD1
222
C2
C1
220
22
C3
CP
C4
MD2
222
C1
C2
220
22

C3
CP
C4
MD2
222
C1
C2
220
22
C3
CP
C4
MD2
222
C1
C2
220
22

C3
CP
C4
222
C2
220
C1
RD2
22
C3
CP
C4
220
222
22
C2
C1

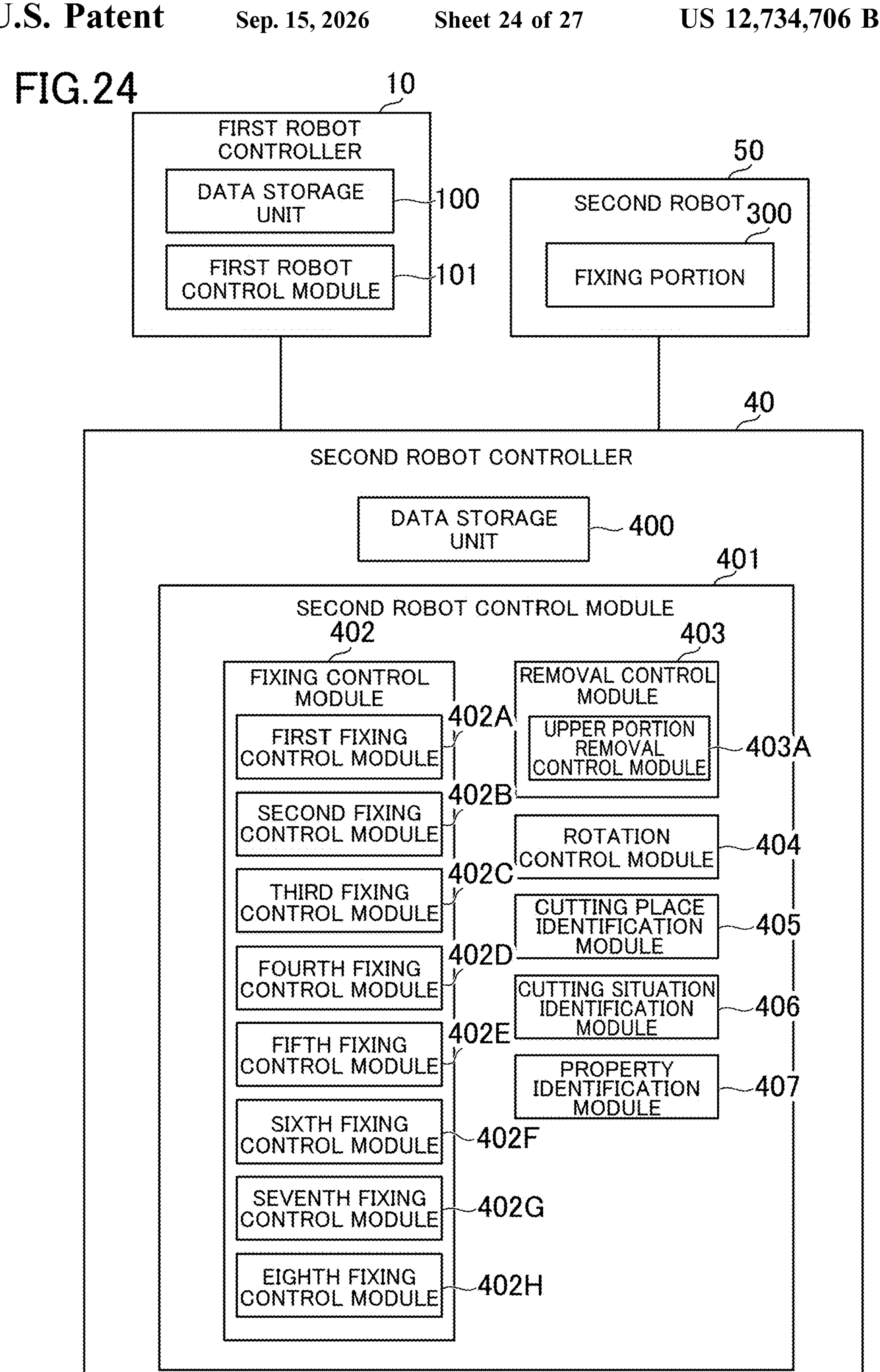
FIG.24
10
FIRST ROBOT CONTROLLER
DATA STORAGE UNIT
100
FIRST ROBOT CONTROL MODULE
101
50
SECOND ROBOT
300
FIXING PORTION
40
SECOND ROBOT CONTROLLER
DATA STORAGE UNIT
400
401
SECOND ROBOT CONTROL MODULE
402
FIXING CONTROL MODULE
FIRST FIXING CONTROL MODULE
402A
SECOND FIXING CONTROL MODULE
402B
THIRD FIXING CONTROL MODULE
402C
FOURTH FIXING CONTROL MODULE
402D
FIFTH FIXING CONTROL MODULE
402E
SIXTH FIXING CONTROL MODULE
402F
SEVENTH FIXING CONTROL MODULE
402G
EIGHTH FIXING CONTROL MODULE
402H
403
REMOVAL CONTROL MODULE
UPPER PORTION REMOVAL CONTROL MODULE
403A
ROTATION CONTROL MODULE
404
CUTTING PLACE IDENTIFICATION MODULE
405
CUTTING SITUATION IDENTIFICATION MODULE
406
PROPERTY IDENTIFICATION MODULE
407

1
40
50
30,31
PM
T
21
22
20
10

1
40
50
30,31
PM
21
22
CT
T
PM
20
10

1
40
50
30,31
21
22
PM
T
20
10

ROBOT CONTROL SYSTEM, METHOD OF CONTROLLING A ROBOT, AND INFORMATION STORAGE MEDIUM

CROSS-REFERENCE TO RELATED APPLICATION

The present disclosure contains subject matter related to that disclosed in Japanese Patent Applications JP2023-103527 and JP2023-103528 filed in the Japan Patent Office on Jun. 23, 2023, the entire contents of which are hereby incorporated by reference.

BACKGROUND OF THE INVENTION

1. Field of the Invention

The present disclosure relates to a robot control system, a method of controlling a robot, and an information storage medium.

2. Description of the Related Art

For example, in Japanese Patent Application Laid-open No. H8-252785, there is disclosed a robot which moves an end effector along a surface of a workpiece. When there is an angular change of a predetermined value or more at a corner portion of the workpiece, an advancing speed of the end effector is decreased and a pressing force of the end effector against the workpiece is reduced when the end effector approaches close to the corner portion.

For example, in Japanese Patent Application Laid-open No. H7-265035, there is disclosed a tobacco raw material case opening device which opens a tobacco raw material case filled with tobacco raw material in a rectangular cylindrical box forming a rectangular parallelepiped storage space. When the tobacco raw material case opening device is placed on a turntable and rotated, the tobacco raw material case opening device cuts the tobacco raw material case by using a rotary saw blade movably arranged in a back-and-forth manner toward a rotation axis of the turntable near the turntable.

For example, in Japanese Patent Application Laid-open No. 2003-081229, there is disclosed an automatic dispensing method in which, when a packaging material in which contents are packaged is placed on a support stand, a robot cuts the packaging material to remove a top part of the packaging material, and then dispenses the contents by rotating the remaining part of the packaging material.

SUMMARY OF THE INVENTION

According to at least one aspect of the present disclosure, there is provided a robot control system including: a robot including a cutter; and circuitry configured to control the robot so that the robot cuts a packaging material with a blade of the cutter, and control the robot so that the blade is oriented more toward an outer side of the packaging material when the robot cuts a face of the packaging material with the blade than when the robot cuts a corner of the packaging material with the blade.

BRIEF DESCRIPTION OF THE DRAWINGS

FIG. 24 is a diagram for illustrating an example of functions implemented in the modification examples relating to the second embodiment.

DESCRIPTION OF THE EMBODIMENTS

1. First Embodiment

Description is given of a first embodiment of the present disclosure, which is an example of an embodiment of a robot control system, a method of controlling a robot, and a program according to the present disclosure.

1-1. Hardware Configuration of Robot Control System

Figure 1:
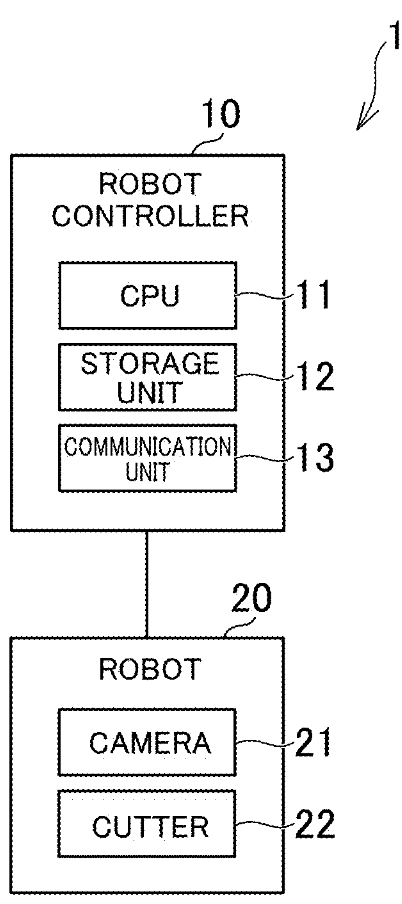
FIG. 1 is a diagram for illustrating an example of a hardware configuration of a robot control system.

FIG. 1 is a diagram for illustrating an example of a hardware configuration of the robot control system. For example, a robot control system 1 includes a robot controller 10 and a robot 20. The robot controller 10 is connected to the robot 20 by a cable such as a power line or a signal line. The devices included in the robot control system 1 are not limited to the example of FIG. 1. The robot control system 1 may include any device. For example, the robot control system 1 may include a host controller which controls the robot controller 10.

The robot controller 10 is a device which controls at least one robot 20. For example, the robot controller 10 includes a CPU 11, a storage unit 12, and a communication unit 13. The CPU 11 includes at least one processor. The storage unit 12 includes at least one of a volatile memory or a non-volatile memory. The communication unit 13 includes at least one of a communication interface for wired communication or a communication interface for wireless communication. The robot controller 10 also includes other hardware, such as a power supply unit for supplying electric power to at least one motor included in the robot 20.

The robot 20 is a device which includes at least one motor that is controlled by the robot controller 10. In the first embodiment, description is given of a case in which the robot 20 is a vertically articulated robot, but the robot 20 may be of any type and is not limited to a vertically articulated robot. For example, the robot 20 may be a horizontally articulated robot, a parallel link robot, or a Cartesian robot. The robot 20 may have any number of axes, for example, any of 4 axes to 7 axes.

For example, the robot 20 can hold at least one camera 21. The camera 21 may also be referred to as "vision sensor." In the first embodiment, description is given of a case in which the camera 21 is a 3D camera, but the camera 21 may be of any type and is not limited to a 3D camera. For example, the camera 21 may be a 2D camera (a camera without a depth sensor) or an infrared camera. The camera 21 may generate moving images by continuously capturing images at a predetermined frame rate, or may generate still images without continuously capturing images.

The robot 20 can hold at least one cutter 22. In the first embodiment, description is given of a case in which the cutter 22 is an ultrasonic cutter, but the cutter 22 may be of any type and is not limited to an ultrasonic cutter. For example, the cutter 22 may be a vibration cutter which vibrates at high speed instead of ultrasonic vibration, or a cutter which does not generate vibrations. In the first embodiment, a case in which the cutter 22 is removably connected to the robot 20 is given as an example, but the cutter 22 is not limited to being removably connected, and may be fixed to the robot 20.

A program or data stored in the storage unit 12 may be supplied to the robot controller 10 via a network such as an industrial network, the Internet, or a LAN. For example, the robot controller 10 may include at least one of a reading unit (for example, a memory card slot) which reads a computer-readable information storage medium, or an input/output unit (for example, a USB terminal) which connects to an external device. A program or data stored in a computer-readable information storage medium may be supplied to the robot controller 10 via the reading unit or the input/output unit.

Various hardware can be applied to the robot controller 10 and the robot 20. The hardware configuration of each of the robot controller 10 and the robot 20 is not limited to the above-mentioned example. For example, the robot controller 10 may include a circuit such as an FPGA or an ASIC. In the first embodiment, description is given of a case in which the CPU 11 corresponds to a configuration referred to as "circuitry," but another circuit such as an FPGA or an ASIC may correspond to the "circuitry." For example, a sensor such as a motor encoder, a torque sensor, a position sensor, an acceleration sensor, a gyroscope, or a contact sensor may be connected to the robot controller 10. Those sensors may be included in the robot 20.

1-2. Overview of First Embodiment

Figure 2:
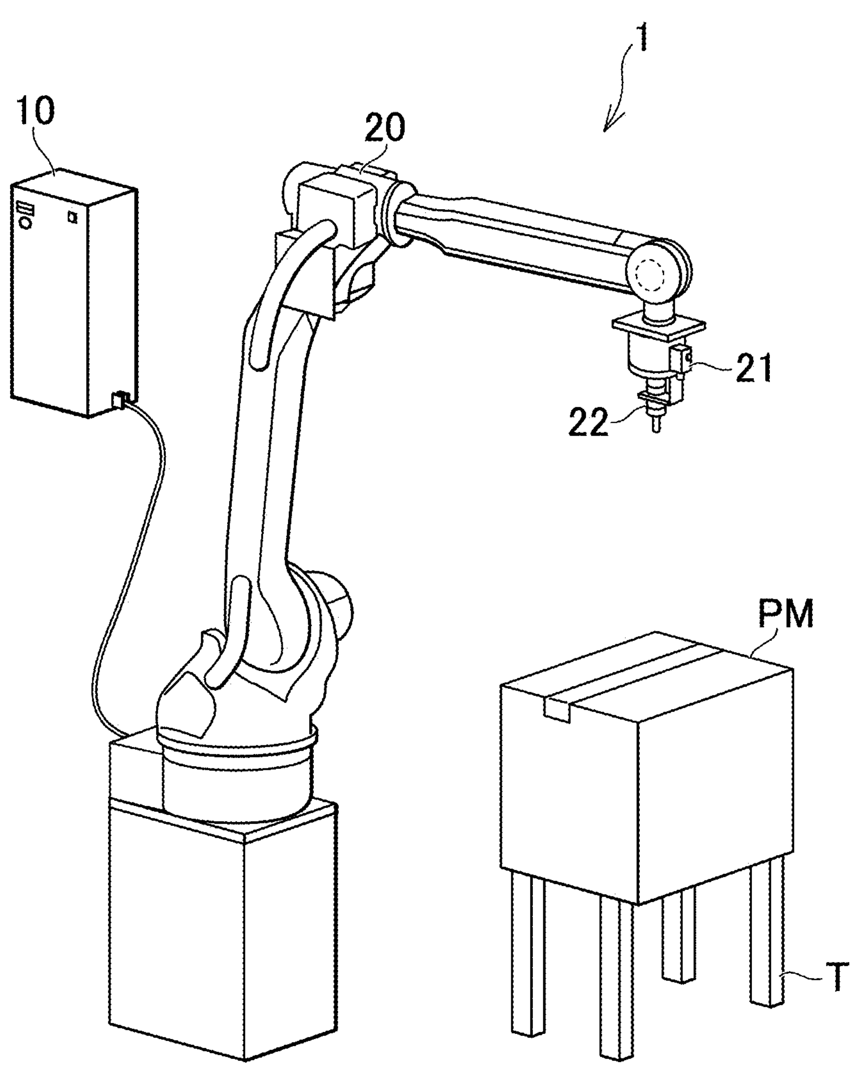
FIG. 2 is a diagram for illustrating an example of a space in which a robot controller and a robot in a first embodiment of the present disclosure are arranged.

FIG. 2 is a diagram for illustrating an example of a space in which the robot controller 10 and the robot 20 in the first embodiment are arranged. For example, the robot controller 10 and the robot 20 are arranged in a facility such as a factory. For example, the camera 21 and the cutter 22 are attached to a tip of the robot 20. A work table T is arranged in front of the robot 20. In the first embodiment, the robot controller 10 controls the robot 20 so that the robot 20 rotates around the side faces of a packaging material PM placed on the work table T and cuts the side faces with the cutter 22.

The packaging material PM is the material used to package an object to be packaged. In the first embodiment, description is given of a case in which corrugated cardboard corresponds to the packaging material PM, but the packaging material PM may be any material and is not limited to corrugated cardboard. The packaging material PM may be a box made of paper other than corrugated cardboard, a plastic box, a plastic tank, a metal can, bubble wrap, or another material other than corrugated cardboard. The object packaged by using the packaging material PM is hereinafter referred to as "content."

In the first embodiment, a top plate of the work table T is smaller than a bottom face of the packaging material PM. As a result, when the robot 20 cuts the packaging material PM with the cutter 22, interference between the work table T and the robot 20 can be prevented. The work table T is not limited to the example of the first embodiment. For example, the top plate of the work table T may be larger than the bottom face of the packaging material PM as long as the work table T and the robot 20 do not interfere with each other. For example, the work table T may be such that a difference between the long side of the top plate of the work table T and the long side of the packaging material PM is less than a threshold value corresponding to the length of the cutter 22. As another example, the work table T may be such that a difference between the short side of the top plate of the work table T and the short side of the packaging material PM is less than a threshold value corresponding to the length of the cutter 22. For example, the packaging material PM may be placed such that the top plate of the work table T is not visible from above at only the portion of the packaging material PM to be cut by the robot 20 with the cutter 22.

In the first embodiment, description is given of a case in which a poly bag corresponds to the content, but the content may be any object and are not limited to a poly bag. For example, the content may be an aluminum vapor-deposited bag, a polyvinyl bag, a paper bag, a jute bag, a flexible intermediate bulk container, another bag, a box, an object wrapped in bubble wrap, or another object. A plurality of types of content may be packaged by the packaging material PM. For example, the raw materials or materials of a product to be produced in the factory in which the robot 20 is arranged may be packaged in the content. The content may be, instead of an amorphous object having a shape which easily changes, like a poly bag, a fixed object having a shape which does not easily change.

For example, the robot controller 10 controls the robot 20 so that the robot 20 photographs the packaging material PM by using the camera 21 in order to identify a relative positional relationship between the robot 20 and the packaging material PM and an overall shape of the packaging material PM. The photographing by the camera 21 is performed before the robot 20 starts cutting the packaging material PM. In the first embodiment, the packaging material PM is photographed from each of a plurality of photography positions determined in advance.

Figure 3:
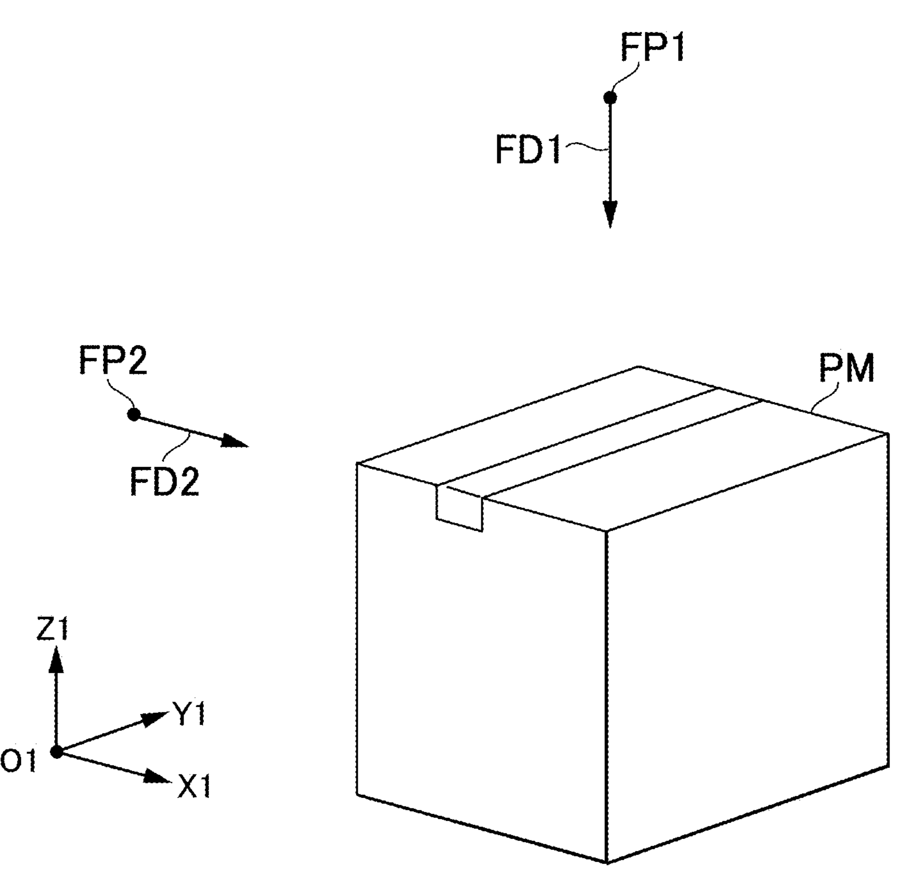
FIG. 3 is a diagram for illustrating an example of photography positions.

FIG. 3 is a diagram for illustrating an example of photography positions. For example, the robot controller 10 identifies positions in real space by using a coordinate system in which an X1 axis, a Y1 axis, and a Z1 axis are set around an origin O1 corresponding to the base on which the robot 20 is arranged. The coordinate system may be any coordinate system used in robot control, and is not limited to the example of FIG. 3. For example, a coordinate system may be set for each axis of the robot 20.

In the example of FIG. 3, a photography position FP1 on an upper side of the packaging material PM and a photography position FP2 on a transverse side of the packaging material PM are determined in advance. At the photography position FP1, a photographing direction FD1 in the negative direction of the Z1 axis is determined. At the photography position FP2, a photographing direction FD2 in the positive direction of the X1 axis is determined. For example, the robot controller 10 controls the robot 20 so that the camera 21 photographs the packaging material PM from the photography position FP1 in the photographing direction FD1. Then, the robot controller 10 controls the robot 20 so that the camera 21 photographs the packaging material PM from the photography position FP2 in the photographing direction FD2.

The combinations of the photography position and the photographing direction are not limited to two combinations as illustrated in FIG. 3. There may be only one combination of the photography position and the photographing direction, or there may be three or more combinations of the photography position and the photographing direction. For example, the robot controller 10 may control the robot 20 so that the camera 21 evenly photographs the packaging material PM while moving around the packaging material PM. The combination of the photography position and the photographing direction is not required to be determined in advance. For example, the robot controller 10 may determine the combination of photography position and photography direction at the time the photographed images are generated by the camera 21.

The packaging material PM may be photographed by the camera 21 at any timing. The timing of photographing the packaging material PM by the camera 21 is not limited to the example of the first embodiment. For example, in a case in which the robot 20 uses the cutter 22 to cut each side face of the packaging material PM one by one instead of rotating around and cutting the packaging material PM with the cutter 22, an operation in which the camera 21 photographs one side face of the packaging material PM and the robot 20 cuts the photographed side face with the cutter 22 may be repeated.

For example, the robot controller 10 analyzes the photographed images generated by the camera 21 and identifies the position of the packaging material PM and the shape of the packaging material PM. Any method used in the image processing field can be used as the identification method. For example, the robot controller 10 may identify the shape of the packaging material PM based on a machine learning method such as a neural network, or based on a pattern of feature points extracted from the photographed images. The robot controller 10 determines a cutting place of the packaging material PM based on the position of the packaging material PM and the shape of the packaging material PM.

Figure 4:
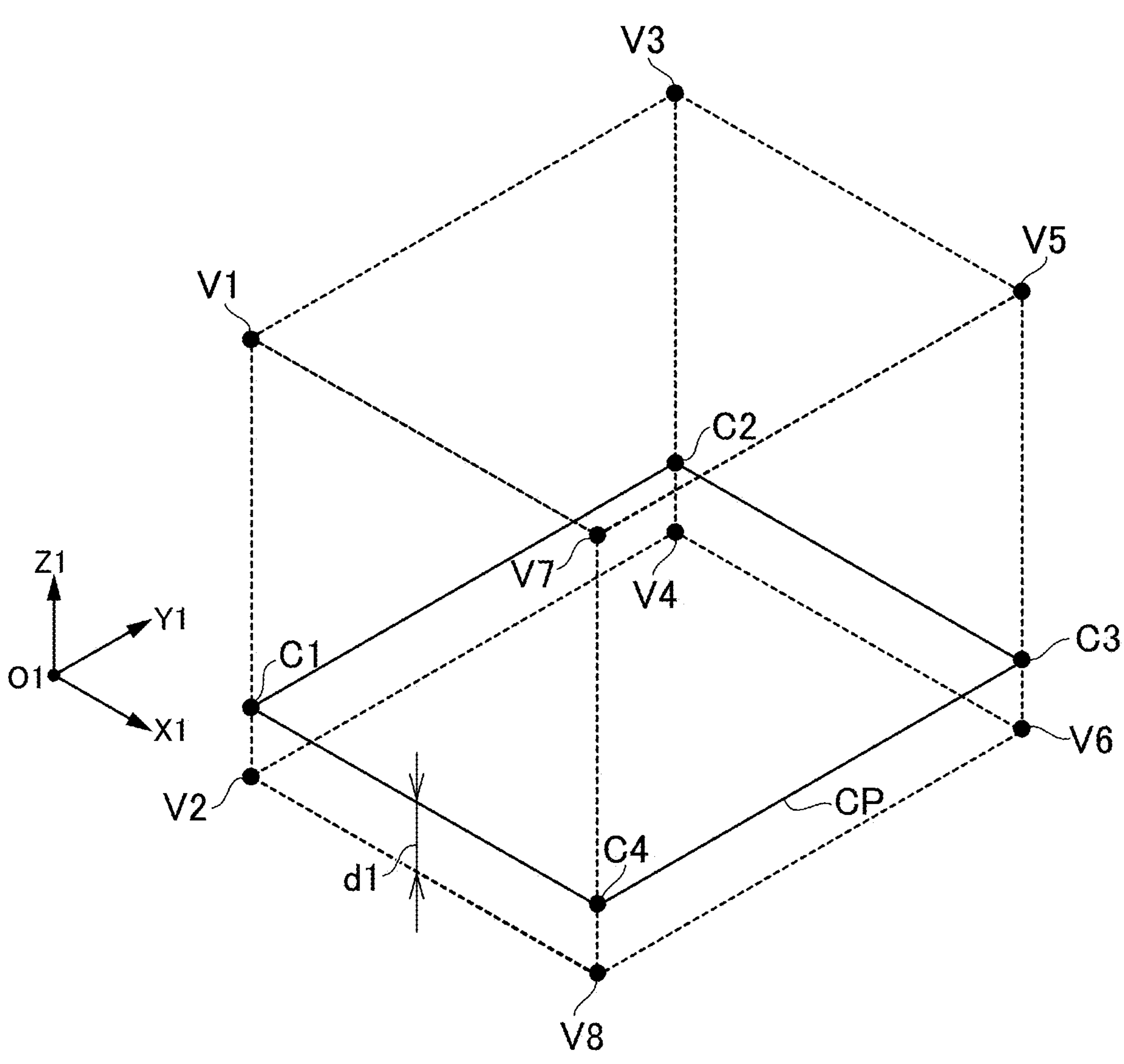
FIG. 4 is a diagram for illustrating an example of a cutting place.

FIG. 4 is a diagram for illustrating an example of a cutting place. The dashed line of FIG. 4 indicates the shape of the packaging material PM identified by the robot controller 10. The dashed line can also be said to be an outline of the packaging material PM. In the example of FIG. 4, to simplify the description, there is illustrated a case in which the packaging material PM is a rectangular parallelepiped, but the shape of the packaging material PM may be a shape other than a perfect rectangular parallelepiped. For example, when the packaging material PM is filled with the content, the packaging material PM may bulge out. Conversely, when a worker drops the packaging material PM, the packaging material PM may be dented. Even in such a case, the robot controller 10 can identify the bulge or dent on the surface by image analysis.

For example, the robot controller 10 identifies the positions of vertices V1 to V8 of the packaging material PM based on the photographed images generated by the camera 21. The robot controller 10 identifies the surface bound by the four vertices V2, V4, V6, and V8 positioned relatively on a low side as the bottom face of the packaging material PM. The robot controller 10 determines a line connecting the points at which a horizontal plane (X-Y plane) a predetermined distance d1 (for example, about 1 cm to about 5 cm) from the bottom face of the packaging material PM intersects the surface (side faces) of the packaging material PM as a cutting place CP to be cut by the cutter 22.

For example, the robot controller 10 controls the robot 20 so that the cutter 22 of the robot 20 moves along the cutting place CP of the packaging material PM. The cutter 22 may be a double-edged blade, but in the first embodiment, the cutter 22 is a single-edged blade. Further, the cutter 22 in the first embodiment does not have a blade on the tip, and has a rounded tip, and hence it is less likely that the blade of the cutter 22 touches the content.

Figure 5:
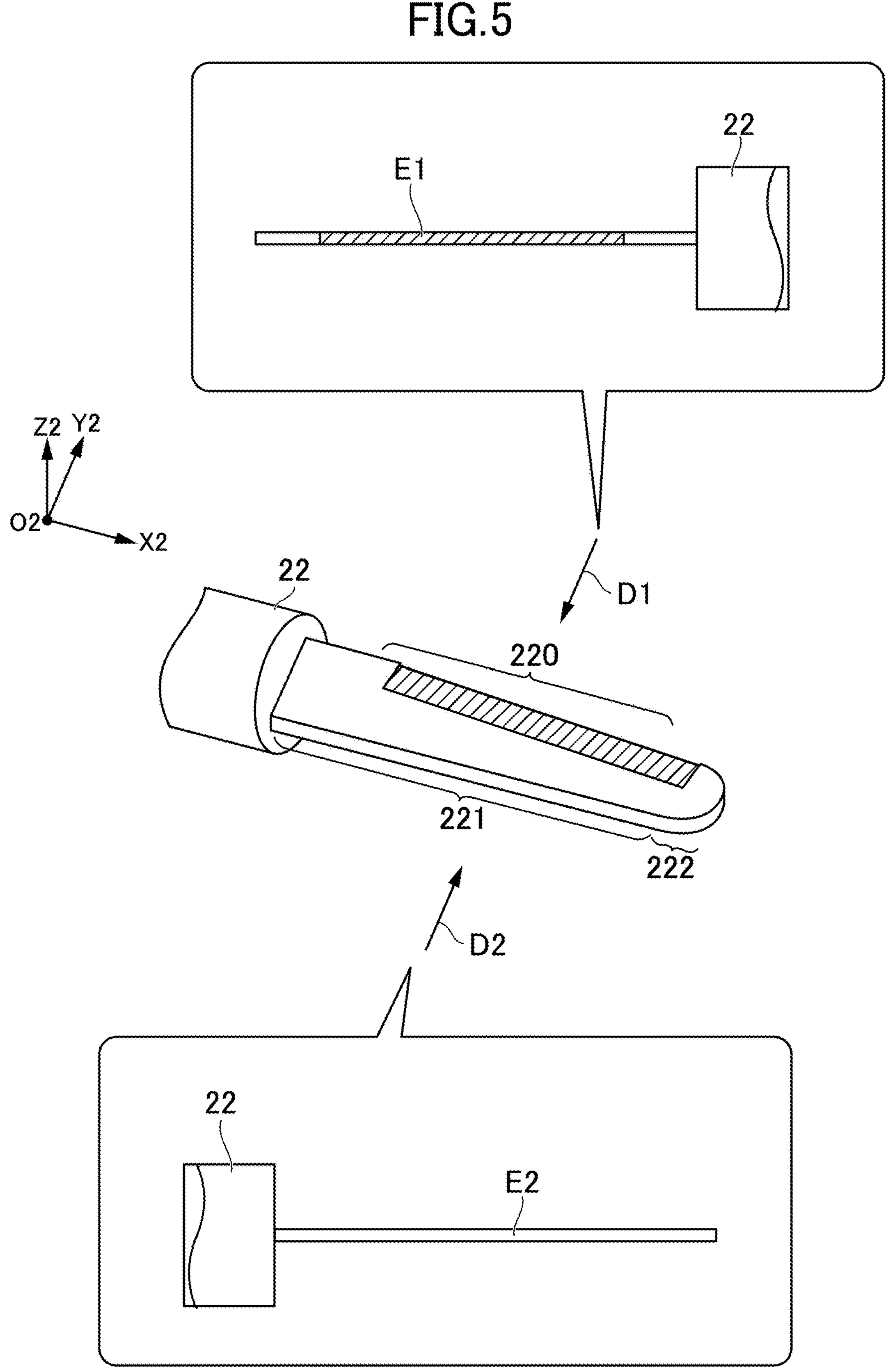
FIG. 5 is a diagram for illustrating an example of a cutter.

FIG. 5 is a diagram for illustrating an example of the cutter 22. In the example of FIG. 5, a coordinate system of an X2 axis, a Y2 axis, and a Z2 axis set around an origin O2 corresponding to the axis of the tip of the robot 20 is illustrated. For example, the cutter 22 includes a body 221 including a blade 220, and a tip 222. The body 221 is a portion of the cutter 22 that is relatively close to the robot 20. The tip 222 is a portion of the cutter 22 that is relatively far from the robot 20. The tip 222 does not have the blade 220, and is rounded.

For example, the blade 220 is arranged at one edge portion E1 of the cutter 22. In the example of FIG. 5, the blade 220 is arranged at the one edge portion E1 of two edge portions in the short direction (Y2 axis direction) of the cutter 22. The one edge portion E1 is the edge portion visible when the cutter 22 is viewed from the direction D1 of FIG. 5. The blade 220 is arranged at the one edge portion E1, and thus the one edge portion E1 of the body 221 is sharper than another edge portion E2 of the body 221.

For example, of the two edge portions in the short direction (Y2 axis direction) of the cutter 22, the another edge portion E2 is the edge portion on which the blade 220 is not arranged. The another edge portion E2 is the edge portion which is visible when the cutter 22 is viewed from the direction D2 of FIG. 5. The other edge portion E2 does not have the blade 220. The another edge portion E2 corresponds to the spine of the blade 220. The another edge portion E2 is the edge portion on the opposite side of the one edge portion E1. The another edge portion E2 is thicker (thickness in the Z2 axis direction of FIG. 5) than the portion of the blade 220 of the one edge portion E1. The another edge portion E2 is less sharp than the portion of the blade 220 of the one edge portion E1. When the cutter 22 is double-edged, the another edge portion E2 may have a blade.

For example, the tip 222 does not include the blade 220. The tip 222 can also be said to be the portion of the cutter 22 which is further forward than the blade 220. The one edge portion E1 of the body 221 is sharper than the tip 222. The tip 222 is less sharp than the portion of the blade 220 of the one edge portion E1. The tip 222 is thicker than the portion of the blade 220 of the one edge portion E1. The tip 222 may be any member that prevents the blade 220 from coming into contact with the content, and the shape of the tip 222 is not limited to the example of FIG. 5. The tip 222 serves as a cover for the blade 220.

For example, during the cutting of the packaging material PM by the robot 20, the tip 222 enters the packaging material PM. The tip 222 enters the packaging material PM through a cut made in the packaging material PM by the blade 220. The thickness of the tip 222 (thickness in the 22 axis direction of FIG. 5) is reduced by a certain extent so that the tip 222 can enter the packaging material PM through a cut in the packaging material PM. For example, the thickness is less than 5 mm. Description is now given of an example of control in which the cutter 22 of FIG. 5 cuts the cutting place CP of FIG. 4.

Figure 6:
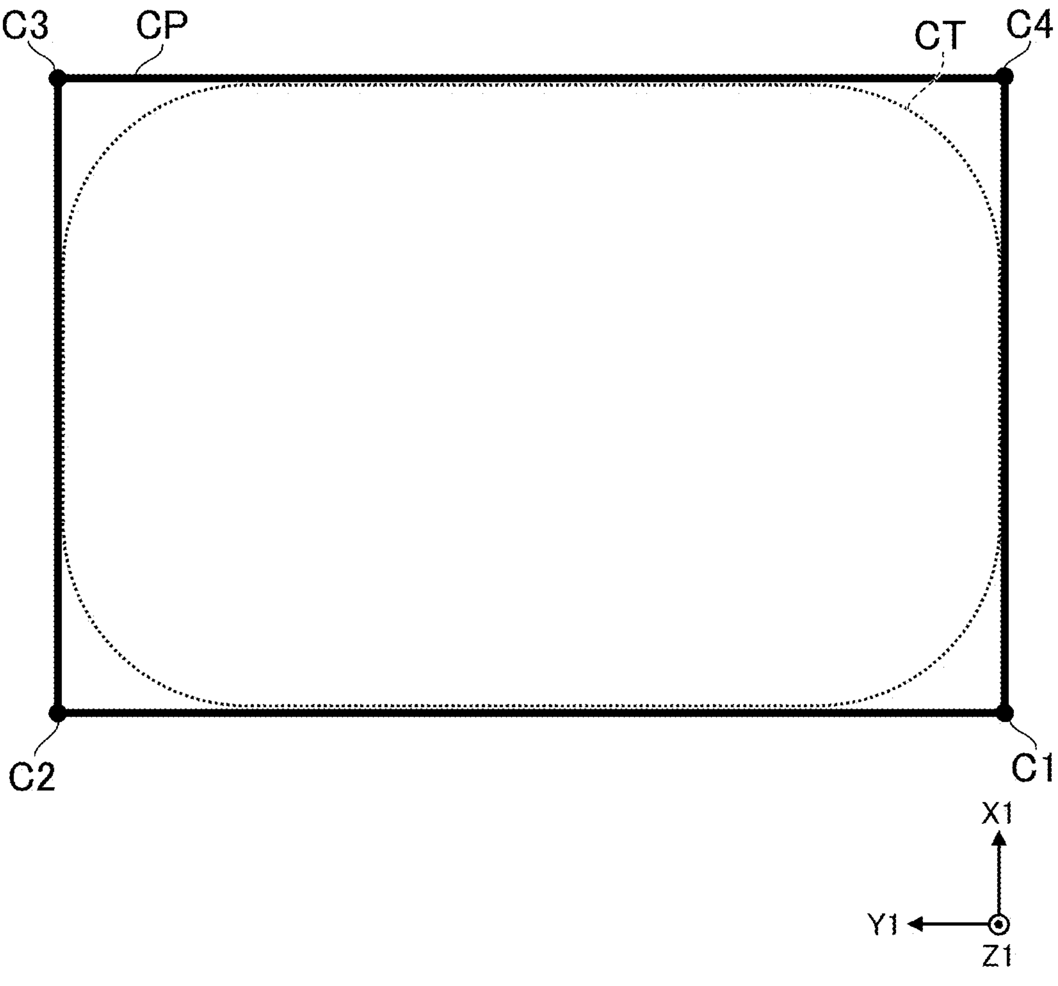
FIG. 6 is a diagram for illustrating an example of the cutting place viewed from directly above a packaging material.

FIG. 6 is a diagram for illustrating an example of the cutting place CP viewed from directly above the packaging material PM. The dashed line of FIG. 6 indicates a content CT (in the first embodiment, a poly bag). In the example of FIG. 6, the content CT are in contact with the inner side of the side faces of the packaging material PM. Even when the volume of the content CT is close to the volume of the packaging material PM, like in the case illustrated in FIG. 6, there is often some space inside the packaging material PM near corners C1 to C4. The robot controller 10 controls the robot 20 so that the robot 20 makes a cut at any of the corners C1 to C4. Even when the blade 220 cuts a small amount into the inner side of any of the corners C1 to C4, in many cases the blade 220 does not touch the content CT.

FIG. 7 to FIG. 11 are diagrams for illustrating an example of a method of cutting the packaging material PM. In FIG. 7 to FIG. 11, the dashed line of the content CT of FIG. 6 and the coordinate axes of FIG. 6 are not shown. In FIG. 7 to FIG. 11, of the packaging material PM, the portion of the cutting place CP at which the packaging material PM has not been cut is indicated by a solid line, and the portion of the cutting place CP at which the packaging material PM has been cut is indicated by a dashed line. In the examples of FIG. 7 to FIG. 11, the cutter 22 is drawn as a large size in order to make it easier to view the cutter 22 in the drawings.

Figure 7:
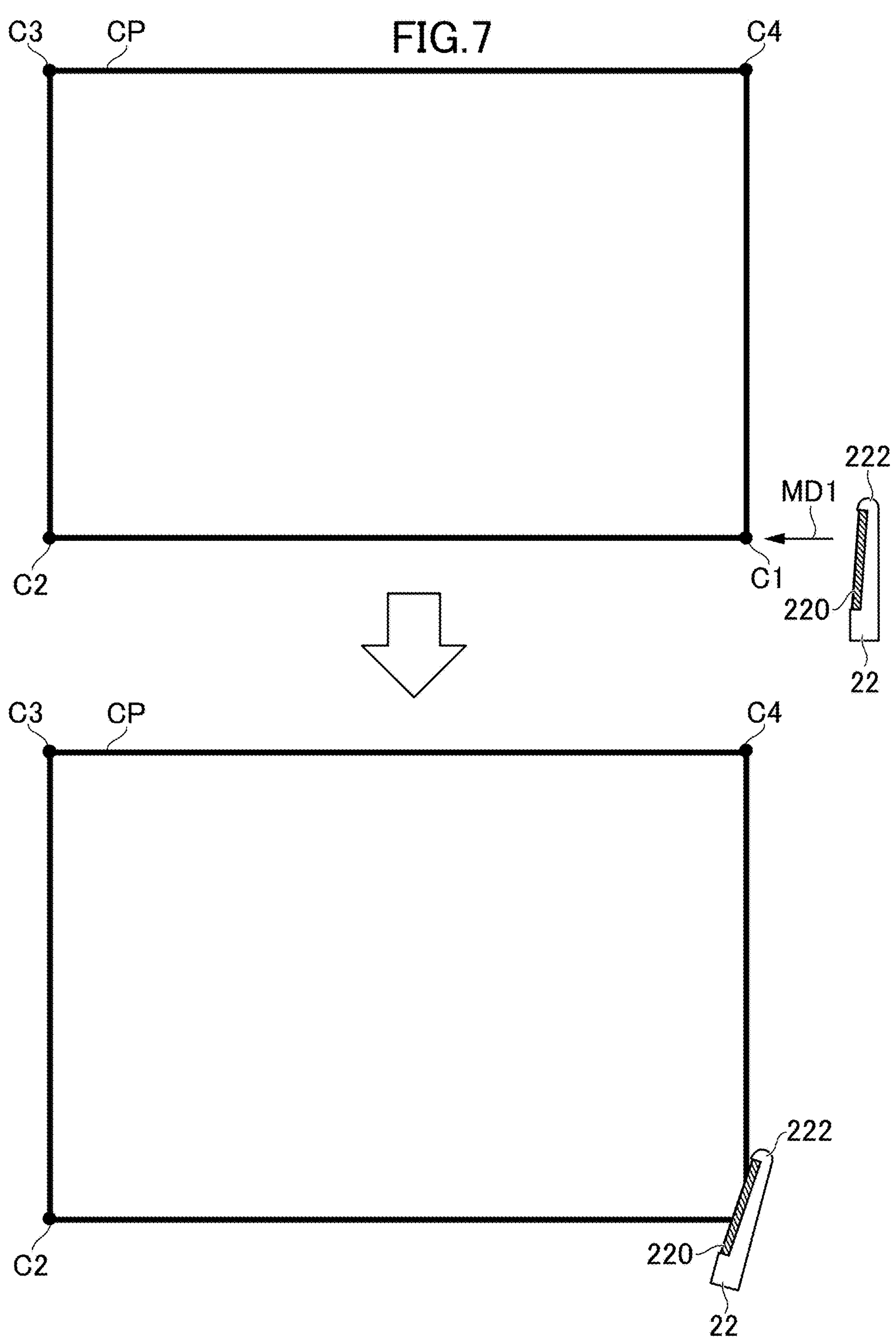
FIG. 7 is a diagram for illustrating an example of a method of cutting the packaging material.

For example, as illustrated in the upper part of FIG. 7, the robot controller 10 controls the robot 20 so that the blade 220 moves in a moving direction MD1 and approaches the corner C1 of the packaging material PM. In the example of FIG. 7, the moving direction MD1 is an angle of 180 degrees or approximately 180 degrees (for example, 160 degrees to 200 degrees) to the normal of the side face on the cutter 22 side (in FIG. 7, the side face of the right side) among the side faces of the packaging material PM. In other words, the moving direction MD1 is the direction from the corner C1 initially cut by the cutter 22 toward the corner C2 which the cutter 22 is to cut next. When the blade 220 moves in the moving direction MD1, the blade 220 comes into contact with the corner C1 of the packaging material PM, as illustrated in the lower part of FIG. 7. The robot controller 10 controls the robot 20 so that the blade 220 continues to move in the moving direction MD1 and starts cutting the corner C1 of the packaging material PM.

For example, a cut can be made at and around the corner C1 of the packaging material PM. The robot controller 10 controls the robot 20 so that the tip 222 enters the packaging material PM from the cut. For example, the robot controller 10 moves the cutter 22 a predetermined distance outside the packaging material PM, then rotates the cutter 22 and inserts the tip 222 inside the packaging material PM so that the tip 222 enters the packaging material PM, and moves the cutter 22 by a certain distance in the moving direction MD1.

Figure 8:
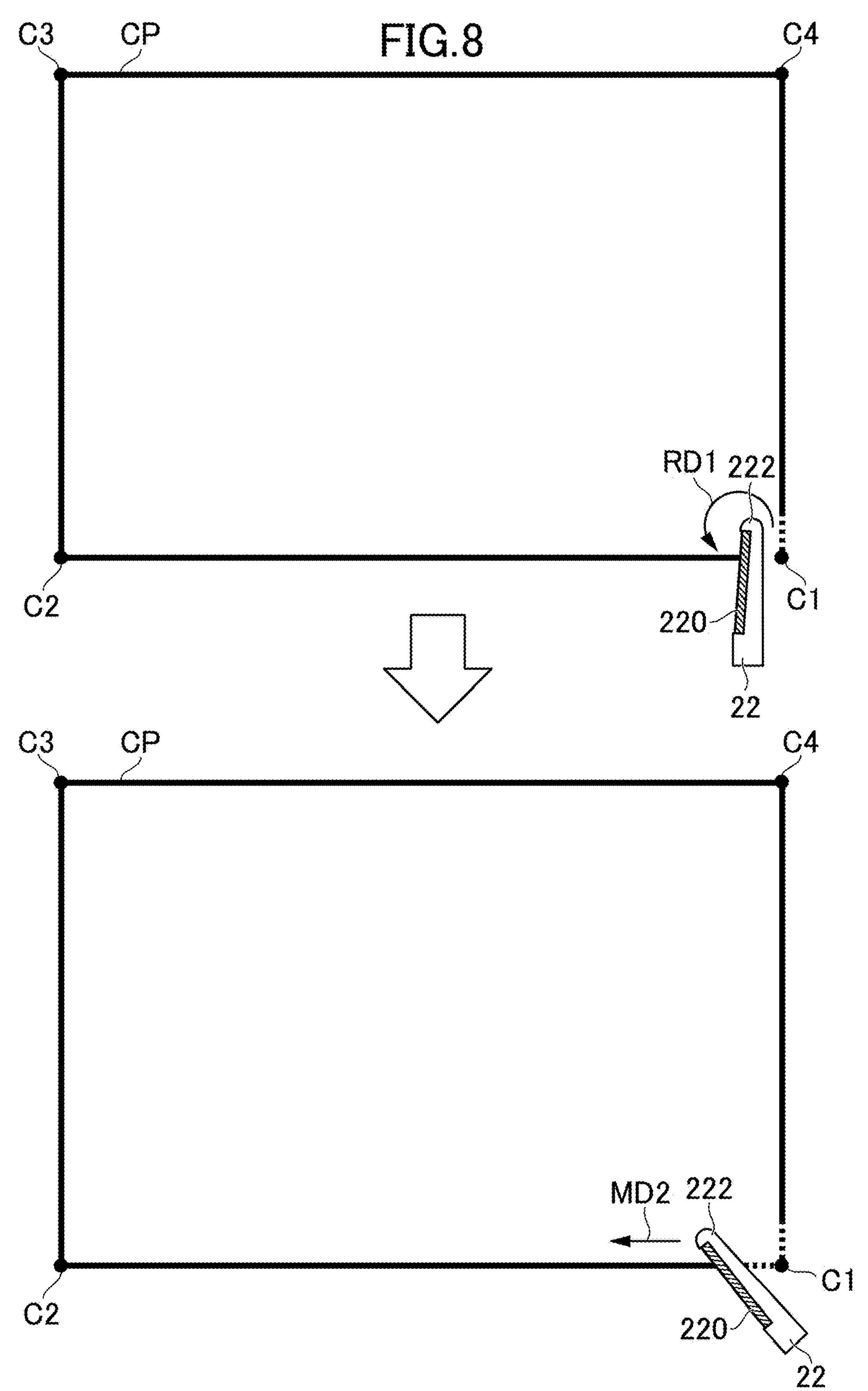
FIG. 8 is a diagram for illustrating an example of the method of cutting the packaging material.
Figure 9:
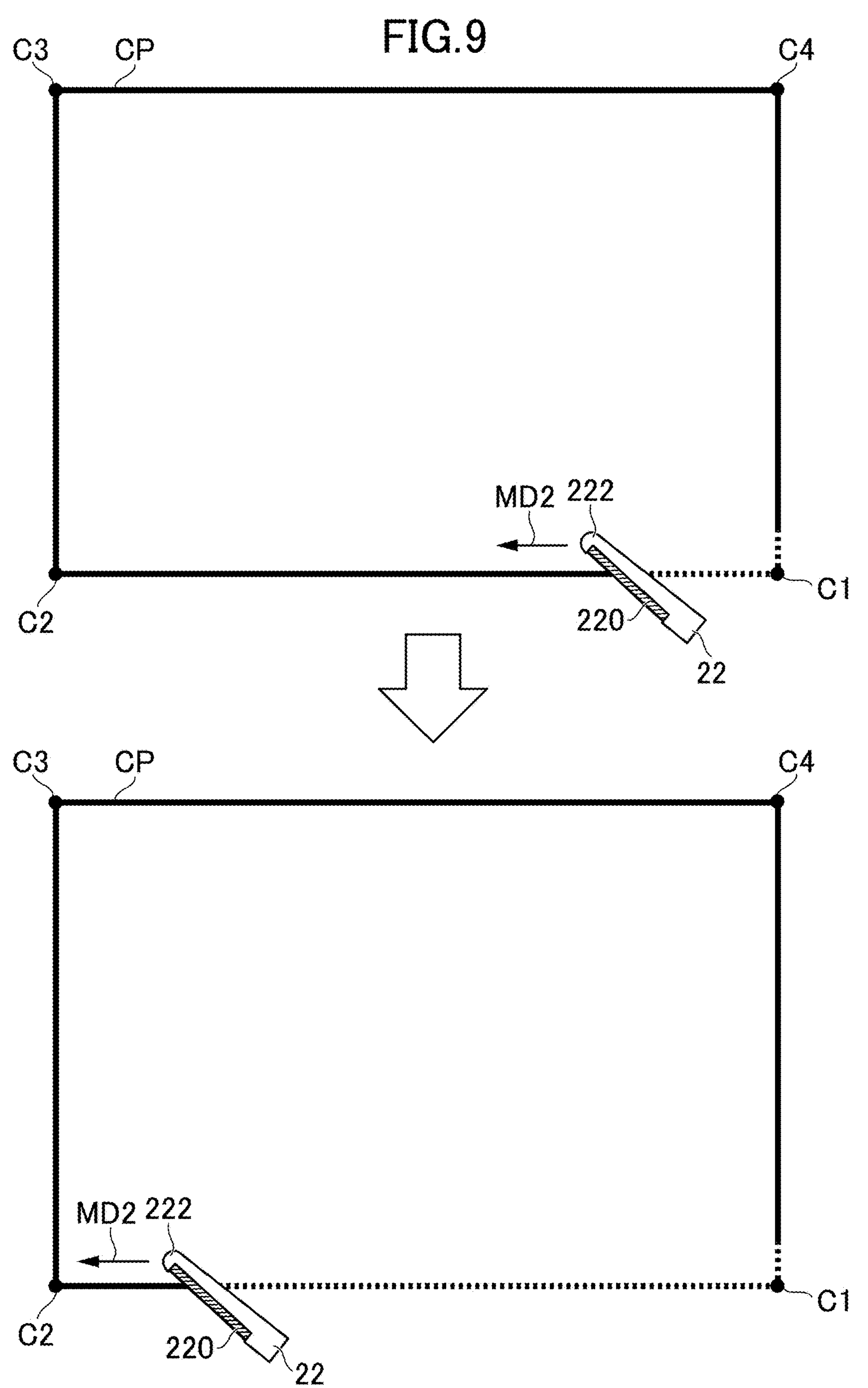
FIG. 9 is a diagram for illustrating an example of the method of cutting the packaging material.

For example, as illustrated in the upper part of FIG. 8, the robot controller 10 controls the robot 20 so that when the tip 222 enters the packaging material PM, the cutter 22 is rotated by a predetermined angle in a counterclockwise rotation direction RD1. Then, as illustrated in the lower part of FIG. 8, the robot controller 10 controls the robot 20 so that the cutter 22 moves in a moving direction MD2 while maintaining its orientation. In the example of FIG. 8, the moving direction MD2 is the direction from the corner C1 cut most recently by the cutter 22 to the corner C2 to be cut next by the cutter 22. As illustrated in the upper and lower parts of FIG. 9, when the cutter 22 advances in the moving direction MD2, there is a possibility of the tip 222 touching the content CT. However, because the tip 222 does not have the blade 220, the content CT are less likely to tear. For example, the cutter 22 advances by pushing away the content CT, which is a poly bag, with the tip 222, and thus the blade 220 is less likely to come into contact with the content CT while the cutter 22 is moving.

Figure 10:
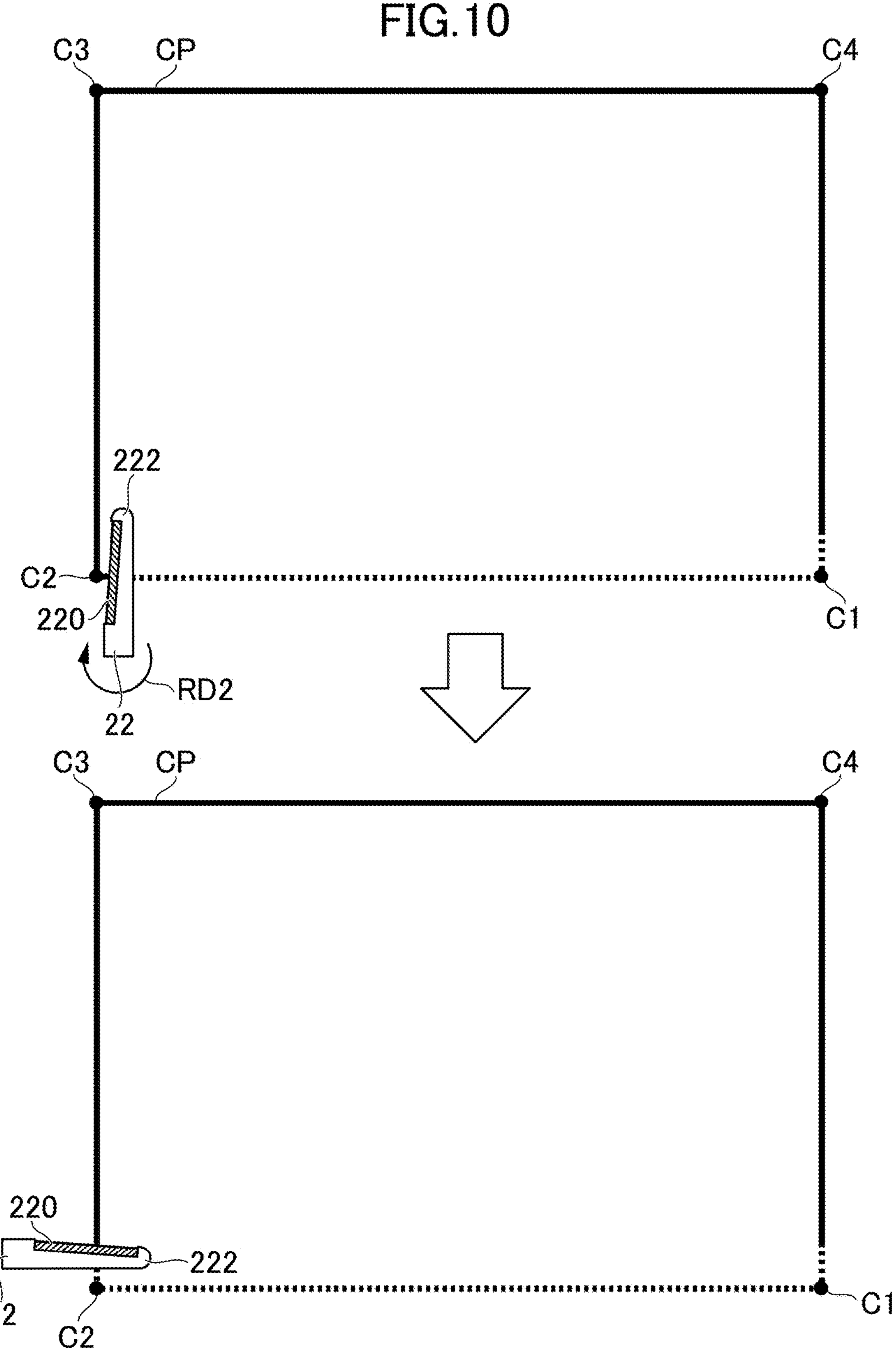
FIG. 10 is a diagram for illustrating an example of the method of cutting the packaging material.

For example, when the cutter 22 reaches the corner C2, as illustrated in the upper part of FIG. 10, the robot controller 10 controls the robot 20 so that the cutter 22 is rotated by a predetermined angle in a clockwise rotation direction RD2. As a result, as illustrated in the lower part of FIG. 10, the cutting of the corner C2 is complete. The robot controller 10 may control the robot 20 so that the cutter 22 moves somewhat toward the corner C3. In addition, the robot controller 10 may control the robot 20 so that after the cutter 22 reaches the corner C2, the cutter 22 continues to move in the moving direction MD2, and the cutter 22 is pulled out from the packaging material PM. Then, the robot controller 10 may control the robot 20 so that the angle of the cutter 22 is changed in a region in which the robot 20 does not interfere with the packaging material PM, and start cutting from the corner C2 to the corner C3. The cutter 22 may be pulled out from the packaging material PM in a similar manner when cutting the other corners C3 and C4.

Figure 11:
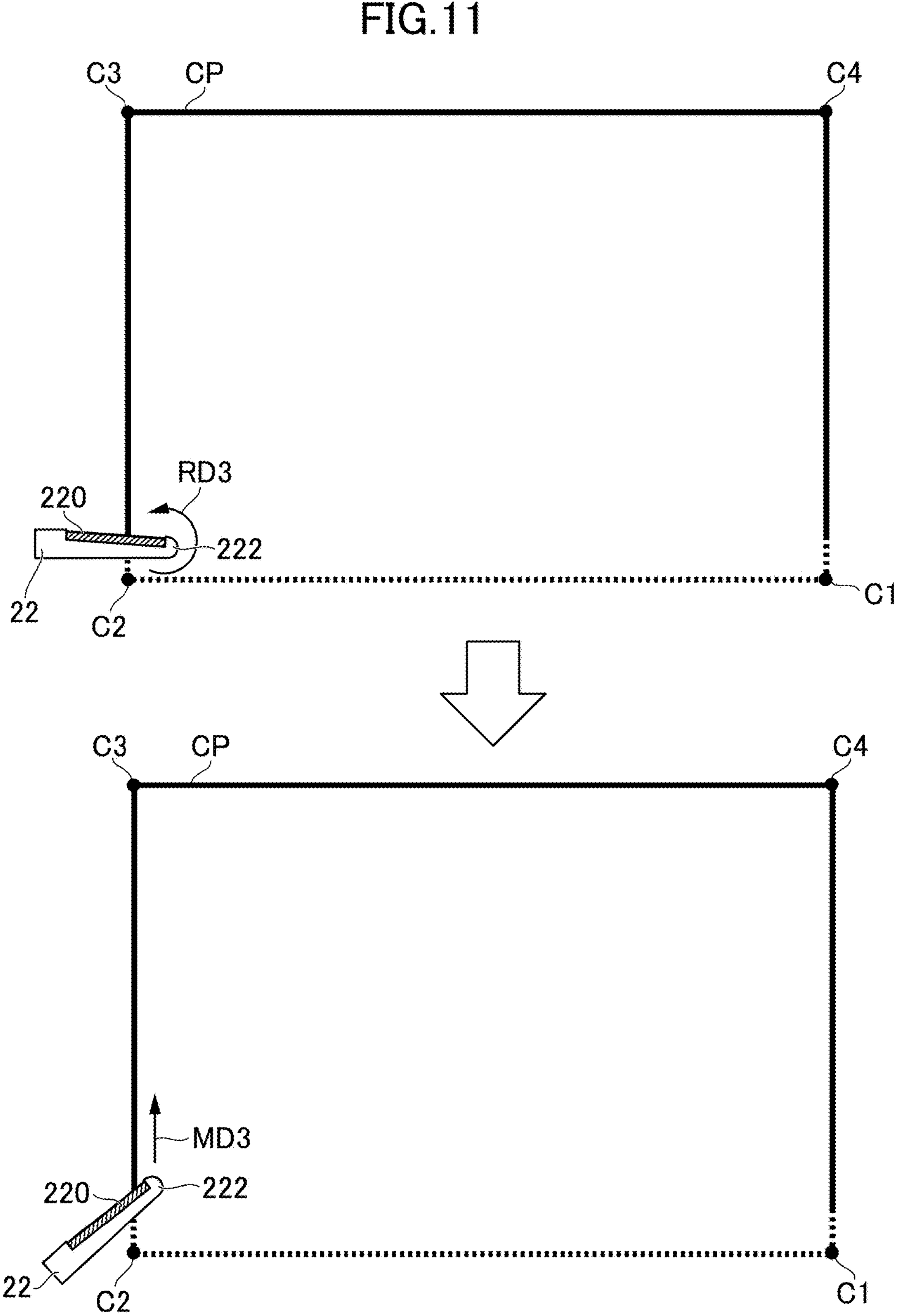
FIG. 11 is a diagram for illustrating an example of the method of cutting the packaging material.

For example, as illustrated in the upper part of FIG. 11, the robot controller 10 controls the robot 20 so that the cutter 22 is rotated by a predetermined angle in a counterclockwise rotation direction RD3. Then, as illustrated in the lower part of FIG. 11, the robot controller 10 controls the robot 20 so that the cutter 22 moves in a moving direction MD3 while maintaining its orientation. In the example of FIG. 11, the moving direction MD3 is the direction from the corner C2 cut most recently by the cutter 22 to the corner C3 to be cut next by the cutter 22. When the cutter 22 advances while having this orientation, even when the cutter 22 comes into contact with the content CT, the tip 222 touches the content CT, and thus the content CT are less likely to be torn.

Then, in the same way, the robot controller 10 controls the robot 20 so that the cutter 22 moves along the cutting place CP and returns to the starting point at or near the corner C1. As described above, the robot controller 10 controls the robot 20 so that the blade 220 is oriented more toward (directing) the outer side of the packaging material PM when the robot 20 cuts the faces of the packaging material PM with the blade 220 than when the robot 20 cuts the corners C1 to C4 with the blade 220. As a result, the content CT are less likely to be torn. Details of the robot control system 1 are now described.

1-3. Functions Implemented in First Embodiment

Figure 12:
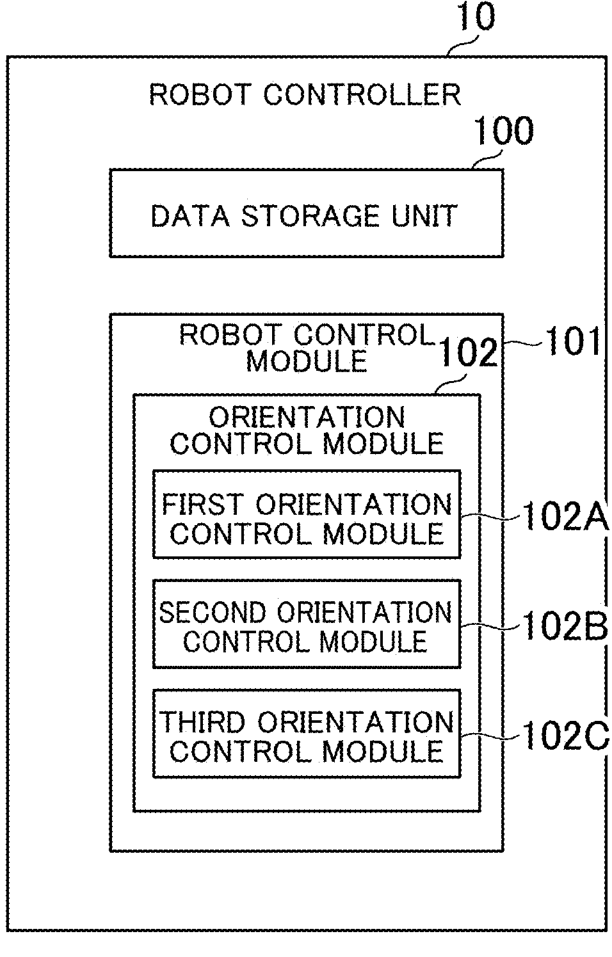
FIG. 12 is a diagram for illustrating an example of functions implemented in the first embodiment.

FIG. 12 is a diagram for illustrating an example of functions implemented in the first embodiment. For example, the robot controller 10 includes a data storage unit 100 and a robot control module 101. The data storage unit 100 is implemented by the storage unit 12. The robot control module 101 is implemented by the CPU 11.

[Data Storage Unit]

The data storage unit 100 stores data required for the robot controller 10 to control the robot 20. For example, the data storage unit 100 stores programs including code (commands) indicating control content of the robot 20. The programs can be written in any language, for example, a robot language or a ladder language. Any code used in those languages may be used. For example, the programs include at least one of code for moving the robot 20, code for changing a posture of the robot 20, or code for changing the orientation of the robot 20.

For example, the data storage unit 100 stores the following programs.

(1) Shape recognition program: A program for recognizing the shape of the packaging material PM based on photographed images generated by the camera 21

(2) Cutting place program: A program for calculating the cutting place CP based on the shape of the packaging material PM (3) Robot control program: A program for controlling the robot 20 so that the cutter 22 cuts the cutting place CP For example, the shape recognition program includes code for estimating the shape of the packaging material PM based on photographed images generated by the camera 21. In the first embodiment, the shape of the packaging material PM is identified based on the vertices V1 to V8, but when the surface of the packaging material PM is curved, it is assumed that the shape of the curved surface is also identified by the shape recognition program. The shape recognition program may be a program used in publicly known object detection.

In the first embodiment, the camera 21 is a 3D camera, and hence the shape recognition program includes code for estimating the shape of the packaging material PM based on a photographed image (an image including the depth between the camera 21 and the subject) photographed by the 3D camera. For example, the shape recognition program identifies the three-dimensional shape of the packaging material PM based on a plurality of photographed images taken by the camera 21. In the example of FIG. 4, the shape recognition program identifies the positions of the vertices V1 to V8.

For example, the cutting place program includes code for determining the cutting place CP based on the shape of the packaging material PM. The cutting place program includes code for calculating, as the cutting place CP, a path connecting the place at which a horizontal plane that is a predetermined distance d1 above the bottom face of the packaging material PM intersects the surface of the packaging material PM. The cutting place program may include code for calculating the cutting place CP based on a top face or a side face of the packaging material PM instead of the bottom face. The cutting place CP is not required to be a horizontal plane. For example, the cutting place CP may correspond to a path in which some sort of obstacle is avoided.

For example, the robot control program includes code for controlling the robot 20 based on the cutting place CP. The robot control includes code which indicates a program calculation of the movement path of the cutter 22, a calculation of the orientation of the cutter 22, and control of the robot based on those calculations. The movement path of the cutter 22 may be the same as the cutting place CP, but in the first embodiment, it is required that the robot 20 insert the tip 222 into the packaging material PM, and hence the movement path of the cutter 22 and the cutting place CP are not a complete match.

Figure 13:
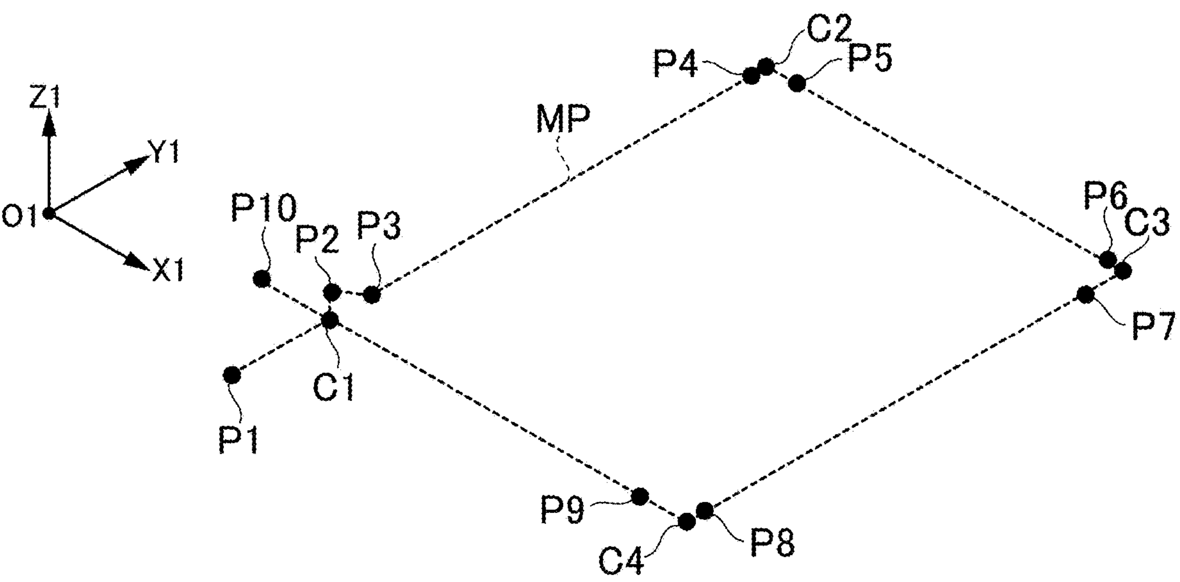
FIG. 13 is a diagram for illustrating an example of a movement path of the cutter.

FIG. 13 is a diagram for illustrating an example of a movement path of the cutter 22. Any algorithm for robot control may be used as the algorithm for calculating the movement path MP. For example, the robot control program may include code for calculating the movement path based on linear interpolation, circular interpolation, or spline interpolation. In the first embodiment, the robot control program includes, in addition to code indicating those algorithms, code for an operation by the robot 20 to insert the tip 222 into the packaging material PM.

For example, the robot control program includes code for moving the cutter 22 to an initial position P1. The initial position P1 is specified in advance by a user of the robot control system 1. The robot control program includes code for moving the cutter 22 to a position a predetermined distance away from the initial position P1 in the direction toward the corner C1 (moving direction MD1 illustrated in FIG. 7), and then moving the cutter 22 to a position P2 outside the packaging material PM. The robot control program includes code indicating an operation of causing the tip 222 to enter the packaging material PM from the position P2. In the example of FIG. 13, it is assumed that the position after the operation is a position P3.

For example, the robot control program includes code for rotating the cutter 22, which has been moved to the position P3, counterclockwise by a predetermined angle. The position P3 is assumed to be a position a predetermined distance away from the corner C1 toward the next corner C2. The robot control program includes code for moving the cutter 22 from the position P3 to a position P4, which is a predetermined distance before the corner C2. The robot control program includes code for rotating the cutter 22 clockwise at the position P4. The robot control program includes code for moving the cutter 22 from the corner C2 toward the next corner C3 to a position P5 that is a predetermined distance away, and rotates the cutter 22 that has moved to the position P5 counterclockwise by a predetermined angle.

For example, the robot control program includes code for moving the cutter 22 from the position P5 to a position P6, which is a predetermined distance before the corner C3. The robot control program includes code for rotating the cutter 22 clockwise at the position P6. The robot control program includes code for moving the cutter 22 from the corner C3 toward the next corner C4 to a position P7 that is a predetermined distance away, and rotating the cutter 22 that has moved to the position P7 counterclockwise by a predetermined angle.

For example, the robot control program includes code for moving the cutter 22 from the position P7 to a position P8, which is a predetermined distance before the corner C4. The robot control program includes code for rotating the cutter 22 clockwise at the position P8. The robot control program includes code for moving the cutter 22 from the corner C4 toward the next corner C1 to a position P9 that is a predetermined distance away, and rotating the cutter 22 that has moved to the position P9 counterclockwise by a predetermined angle. The robot control program includes code for moving the cutter 22 from the position P9 to a position P10, which is on an extension of the line to the corner C1. The series of operations described above is defined in the robot control program.

The data stored by the data storage unit 100 is not limited to the above-mentioned example. For example, the data storage unit 100 may store other programs other than the shape recognition program, the cutting place program, and the robot control program. Further, the data stored by the data storage unit 100 is not limited to programs. For example, the data storage unit 100 may store cutting place data indicating the cutting place CP and movement path data indicating the movement path of the robot 20. For example, the data storage unit 100 may store parameters which are referenced by the above-mentioned programs. The parameters may be any parameters used in robot control. For example, the parameters may be a position parameter indicating the position of a motor in the robot 20, or values detected by various sensors such as a torque sensor.

[Robot Control Module]

The robot control module 101 controls the robot 20 based on the programs and parameters stored in the data storage unit 100 so that the robot 20 cuts the packaging material PM with the blade 220 of the cutter 22. In the first embodiment, the content CT are a poly bag, and thus the robot control module 101 controls the robot 20 so that the robot 20 cuts the packaging material PM in which bag-shaped content CT are packaged with the blade 220. The bag-shaped content CT are not limited to a poly bag, and may be any of the various bags described above.

For example, the robot control module 101 estimates the shape of the packaging material PM based on photographed images generated by the camera 21 and a shape recognition program. The robot control module 101 executes the code included in the shape recognition program, and extracts the vertices V1 to V8 from the photographed images. The robot control module 101 records data indicating the vertices V1 to V8 in the data storage unit 100.

For example, the robot control module 101 calculates the cutting place CP based on the shape of the packaging material PM and the cutting place program. In the first embodiment, the robot control module 101 calculates the cutting place CP as a predetermined distance d1 above the bottom face of the packaging material PM bound by the vertices V2, V4, V6, and V8.

For example, based on the robot control program, the robot control module 101 calculates a movement path MP, and controls the robot 20 so that the cutter 22 moves along the movement path MP. The control of the robot 20 based on the robot control program is as described above. For example, when the robot control program is written in a robot language, the robot control module 101 executes the code of a MOVE instruction included in the robot control program to control the robot 20 so that the cutter 22 moves along the movement path MP of FIG. 13.

[Orientation Control Module]

For example, the robot control module 101 includes an orientation control module 102. The orientation control module 102 controls the orientation of the cutter 22. The orientation of the cutter 22 can also be referred to as the orientation of the blade 220, the orientation of the body 221, or the orientation of the tip 222. The orientation of the cutter 22 can also be referred to as the posture of the cutter 22. In the first embodiment, code indicating a change to the orientation of the cutter 22 is defined in the robot control program, and thus the orientation control module 102 controls the orientation of the cutter 22 based on the robot control program. For example, the code is code for rotating a motor corresponding to the axis of the tip of the robot 20.

Figure 14:
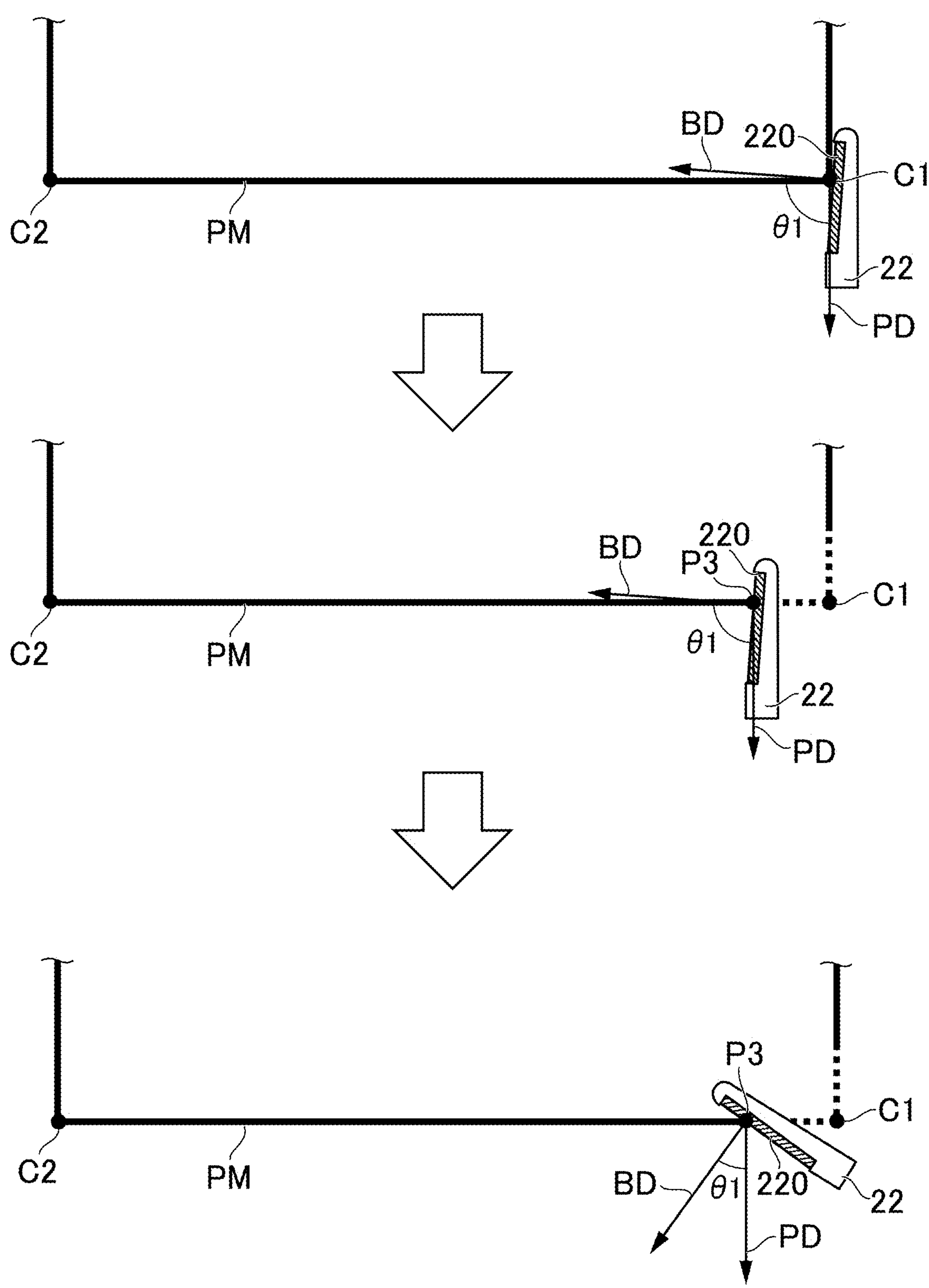
FIG. 14 is a diagram for illustrating an example of processing by an orientation control module.

FIG. 14 is a diagram for illustrating an example of processing by the orientation control module 102. In FIG. 14, the normal direction of the blade 220 is defined as an orientation BD of the blade 220. Of the four side faces of the packaging material PM, the normal direction of the side face which is being cut by the blade 220 (normal direction) is indicated by a reference symbol PD. When the orientation of the cutter 22 is changed by the orientation control module 102, an angle θ1 between the orientation BD of the blade 220 and the normal direction PD of the side face which is being cut by the blade 220 changes. The angle θ1 is smaller when the blade 220 cuts from the position P3 to the next corner C2 than when the blade 220 cuts the corner C1.

For example, the orientation control module 102 of the robot controller 10 controls the robot 20 so that the blade 220 is oriented more toward (directing) the outer side of the packaging material PM when the robot 20 cuts the faces of the packaging material PM with the blade 220 than when the robot 20 cuts the corners of the packaging material PM with the blade 220. In other words, "oriented more toward" means "more oriented toward". As used herein, "oriented more toward (directing) the outer side of the packaging material PM" means that the blade 220 is rotated toward the direction perpendicular to the side face which is being cut. In the example of FIG. 14, a decrease in the angle θ1 corresponds to the blade 220 being oriented more toward (directing) the outer side of the packaging material PM.

For example, when the cutter 22 reaches the position P3 on the movement path MP, the orientation control module 102 rotates the cutter 22 so that the angle θ1 becomes smaller. The orientation control module 102 controls the robot 20 so that the motor corresponding to the axis of the tip of the robot 20 is rotated by a predetermined angle (difference between θ1 before rotation and θ1 after rotation) in the rotation direction in which the angle θ1 becomes smaller. It is assumed that the target angle θ1 (θ1 after rotation) is indicated in advance in the robot control program. Instead of the target angle θ1, the amount of rotation (the above-mentioned predetermined angle) may be indicated in advance in the robot control program.

Figure 15:
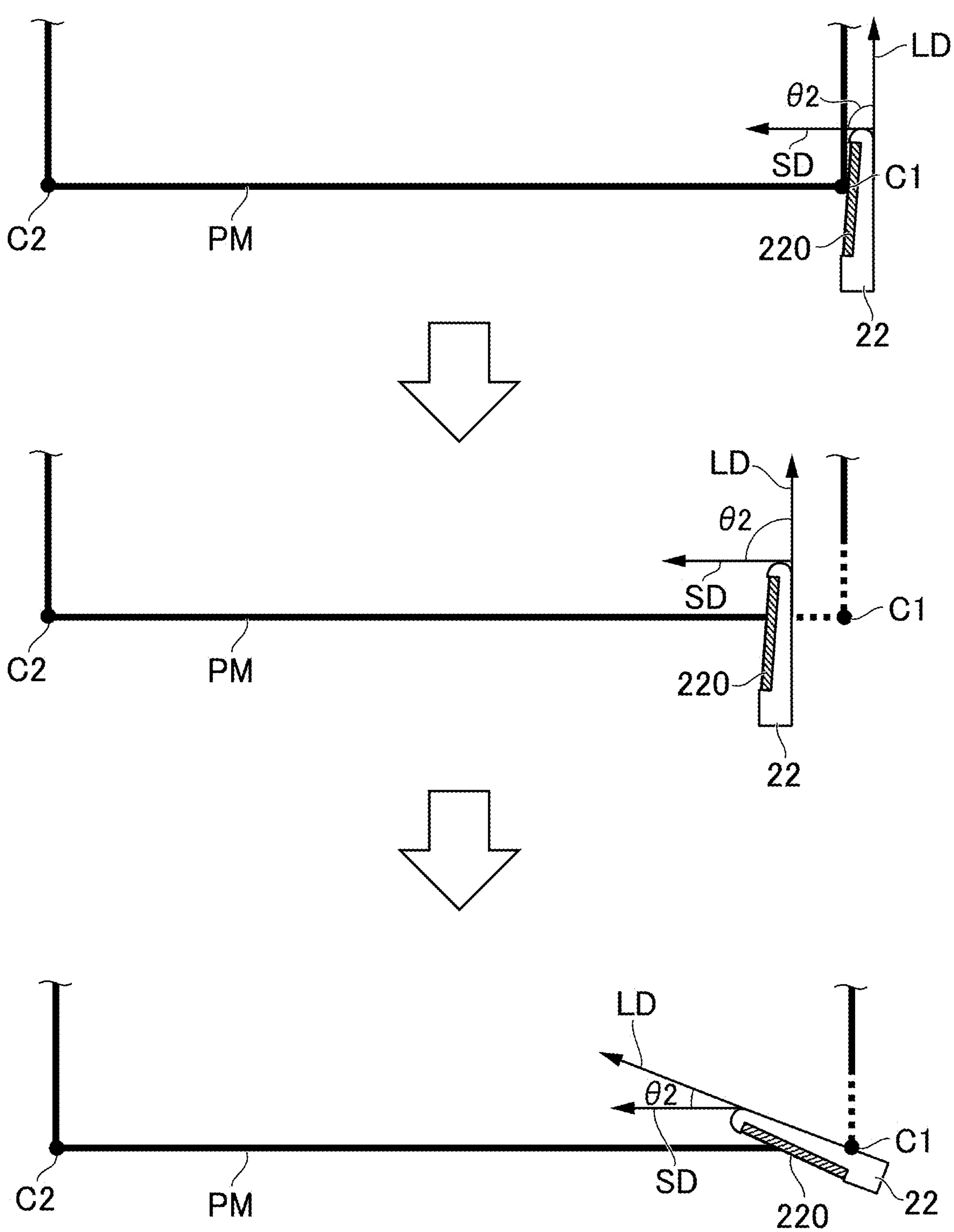
FIG. 15 is a diagram for illustrating an example of the processing by the orientation control module from a different perspective from that of FIG. 14.

FIG. 15 is a diagram for illustrating an example of the processing of the orientation control module 102 from a different perspective from FIG. 14. In FIG. 15, the longitudinal direction of the cutter 22 is indicated by a reference symbol LD. The direction from the corner C1 to the corner C2 of the packaging material PM is indicated by a reference symbol SD, and SD can also be referred to as the moving direction of the cutter 22. When the orientation of the cutter 22 is changed by the orientation control module 102, an angle θ2 between the longitudinal direction LD of the cutter 22 and the direction SD from the corner C1 to the corner C2 changes. In the example of FIG. 15, a decrease in the angle θ2 corresponds to the blade 220 being oriented more toward (directing) the outer side of the packaging material PM. The angle θ2 is smaller when the blade 220 cuts from the position P3 to the next corner C2 than when the blade 220 cuts the corner C1.

For example, when the cutter 22 reaches the position P3 on the movement path MP, the orientation control module 102 rotates the cutter 22 so that the angle θ2 becomes smaller. The orientation control module 102 controls the robot 20 so that the motor corresponding to the axis of the tip of the robot 20 is rotated by a predetermined angle (difference between θ2 before rotation and θ2 after rotation) in the rotation direction in which the angle θ2 becomes smaller. It is assumed that the target angle θ2 (θ2 after rotation) is indicated in advance in the robot control program. Instead of the target angle θ2, the amount of rotation (the above-mentioned predetermined angle) may be indicated in advance in the robot control program.

The blade 220 being oriented more toward (directing) the outer side of the packaging material PM may be defined by an angle other than the angles θ1 and θ2 illustrated in FIG. 14 and FIG. 15. For example, a decrease in the angle between the longitudinal direction LD of the cutter 22 and the normal direction PD of the side face of the packaging material PM may correspond to the blade 220 being oriented more toward (directing) the outer side of the packaging material PM. A decrease in the angle between the orientation BD of the blade 220 and the direction SD from the corner C1 to the corner C2 may correspond to the blade 220 being oriented more toward (directing) the outer side of the packaging material PM.

In the first embodiment, the cutter 22 cuts the packaging material PM by rotating clockwise around the packaging material PM when viewed from above the packaging material PM. In this case, rotating the cutter 22 counterclockwise around the packaging material PM when viewed from above the packaging material PM corresponds to the blade 220 being oriented more toward (directing) the outer side of the packaging material PM. Conversely, when the cutter 22 cuts the packaging material PM by rotating counterclockwise around the packaging material PM when viewed from above the packaging material PM, rotating the cutter 22 clockwise around the packaging material PM when viewed from above the packaging material PM corresponds to the blade 220 being oriented more toward (directing) the outer side of the packaging material PM. The orientation control module 102 may control the orientation of the cutter 22 so that when the cutter 22 cuts the corners of the packaging material PM, the blade 220 comes into contact with the outer side of the packaging material PM, and when the cutter 22 cuts the faces of the packaging material PM, the blade 220 comes into contact with the inner side of the packaging material PM. As described above, the cutter 22 may be pulled out from the packaging material PM while being rotated around the packaging material PM.

In the first embodiment, the orientation control module 102 includes a first orientation control module 102A, a second orientation control module 102B, and a third orientation control module 102C. For example, the first orientation control module 102A controls the robot 20 to cause the blade 220 to enter the corner C1 of the packaging material PM, then orient the blade 220 toward the outer side of the packaging material PM, and then cut the face of the packaging material PM with the blade 220. For example, the first orientation control module 102A causes the blade 220 to enter the corner C1 by moving the cutter 22 from the initial position P1 in the moving direction MD1 based on the movement path MP determined as illustrated in FIG. 13.

For example, the first orientation control module 102A moves the cutter 22 from the position P2 to the position P3 of FIG. 13. The first orientation control module 102A controls the robot 20 so that the blade 220 is oriented toward the outer side of the packaging material PM at the position P3. In the example of FIG. 13, the first orientation control module 102A rotates the cutter 22 at the position P3 by a predetermined angle counterclockwise when viewed from above the packaging material PM. Then, the first orientation control module 102A controls the robot 20 so that the cutter 22 moves toward the position P4 and the blade 220 cuts the face of the packaging material PM.

For example, the second orientation control module 102B changes the orientation BD of the blade 220 so that the tip 222 is arranged between the content CT of the packaging material PM and the body 221. In the example of FIG. 13, the second orientation control module 102B moves the cutter 22 from the position P2 to the position P3, and causes the tip 222 to enter the packaging material PM. In this state, the second orientation control module 102B arranges the tip 222 between the content CT and the body 221 by rotating the cutter 22 at the position P3 by a predetermined angle counterclockwise when viewed from above the packaging material PM. The second orientation control module 102B changes the orientation BD of the blade 220 so that the blade 220 does not touch the content CT even when the tip 222 touches the content CT.

For example, the third orientation control module 102C changes the orientation of the blade 220 so that the another edge portion E2 is arranged between the content CT and the one edge portion E1. In the example of FIG. 13, the third orientation control module 102C moves the cutter 22 from the position P2 to the position P3, and inserts the tip 222 inside the packaging material PM. In this state, the third orientation control module 102C arranges the another edge portion E2 between the content CT and the one edge portion E1 by rotating the cutter 22 at the position P3 by a predetermined angle counterclockwise when viewed from above the packaging material PM. The third orientation control module 102C changes the orientation BD of the blade 220 so that the one edge portion E1 on which the blade 220 is arranged does not touch the content CT.

1-4. Processing Executed in First Embodiment

Figure 16:
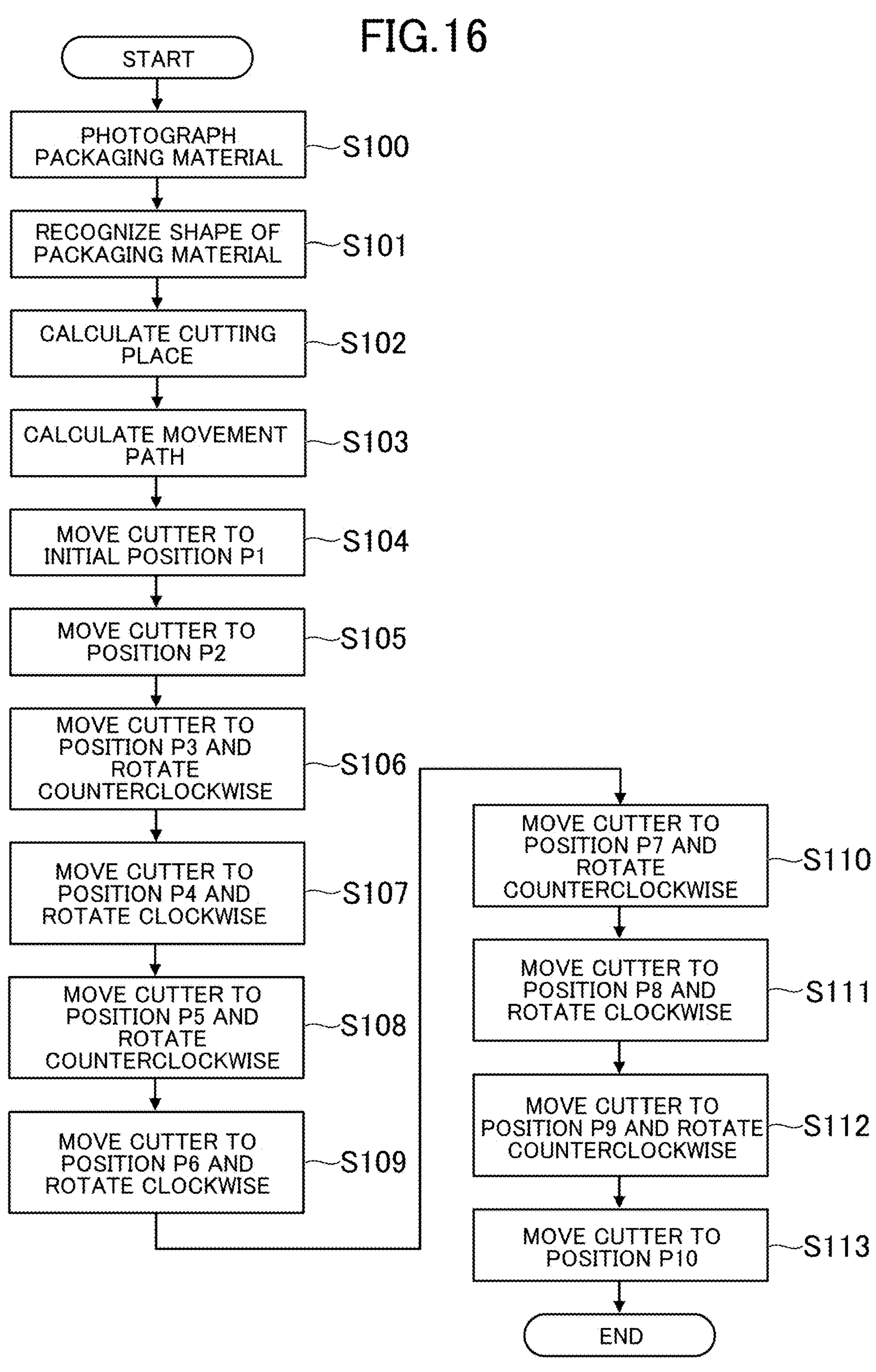
FIG. 16 is a flowchart for illustrating an example of processing executed in the first embodiment.

FIG. 16 is a flowchart for illustrating an example of processing executed in the first embodiment. The processing illustrated in FIG. 16 is executed by the CPU 11 executing programs stored in the storage unit 12. The processing of FIG. 16 is executed when the packaging material PM is placed on the work table T. The placement of the packaging material PM on the work table T can be detected by any method. For example, the placement of the packaging material PM on the work table T may be detected by a contact sensor or the like arranged on the work table T.

As illustrated in FIG. 16, the robot controller 10 controls the robot 20 so that the robot 20 photographs the packaging material PM by using the camera 21 (Step S100). The robot controller 10 recognizes the shape of the packaging material PM based on photographed images generated by the camera 21 and the shape recognition program (Step S101). The robot controller 10 calculates the cutting place CP based on the shape of the packaging material PM estimated in Step S101 and the cutting place program (Step S102).

The robot controller 10 calculates the movement path MP of the robot 20 based on the cutting place CP calculated in Step S102 and the robot control program (Step S103). In Step S103, the robot controller 10 also determines the position to rotate the cutter 22. The robot controller 10 controls the robot 20 so that the cutter 22 moves to the initial position P1 based on the movement path MP calculated in Step S103 (Step S104).

The robot controller 10 moves the cutter 22 from the initial position P1 to the corner C1 of the packaging material PM, cuts the corner C1 with the blade 220, and then moves the cutter 22 to the position P2 (Step S105). The robot controller 10 moves the cutter 22 to the position P3 so that the tip 222 enters the cut made by the movement in Step S105, and rotates the cutter 22 counterclockwise so that the blade 220 is oriented toward the outer side of the packaging material PM (Step S106).

The robot controller 10 moves the cutter 22 to the position P4, and rotates the cutter 22 clockwise (Step S107). The robot controller 10 moves the cutter 22 to the position P5, and rotates the cutter 22 counterclockwise (Step S108). The robot controller 10 moves the cutter 22 to the position P6, and rotates the cutter 22 clockwise (Step S109). The robot controller 10 moves the cutter 22 to the position P7, and rotates the cutter 22 counterclockwise (Step S110).

The robot controller 10 moves the cutter 22 to the position P8, and rotates the cutter 22 clockwise (Step S111). The robot controller 10 moves the cutter 22 to the position P9, and rotates the cutter 22 counterclockwise (Step S112). The robot controller 10 moves the cutter 22 to the position P10 (Step S113), and the cutting of the packaging material PM is complete.

1-5. Summary of First Embodiment

The robot control system 1 of the first embodiment controls the robot 20 so that the blade 220 is oriented more toward (directing) an outer side of the packaging material PM when the robot 20 cuts the faces of the packaging material PM with the blade 220 than when the robot 20 cuts the corners C1 to C4 of the packaging material PM with the blade 220. As a result of orienting the blade 220 of the cutter 22 more toward (directing) the outer side of the packaging material PM when the robot 20 cuts the faces of the packaging material PM with the blade 220 than when the robot 20 cuts the corners C1 to C4 of the packaging material PM with the blade 220, the blade 220 can be prevented from coming into contact with the content CT of the packaging material PM.

Further, the robot control system 1 controls the robot 20 to cause the blade 220 to enter the corner C1 of the packaging material PM, orient the blade 220 toward the outer side of the packaging material PM, and cut the face of the packaging material PM with the blade 220. As a result of controlling the robot 20 to cause the blade 220 of the cutter 22 to enter the corner C1 of the packaging material PM, orient the blade 220 of the cutter 22 toward the outer side of the packaging material PM, and cut the face of the packaging material PM with the blade 220 of the cutter 22, the packaging material PM can be cut smoothly. For example, the packaging material PM can be cut such that the blade 220 of the cutter 22 rotates around the side faces of the packaging material PM. As a result, it is easier to remove the content CT and to clean up the cut packaging material PM.

Further, the cutter 22 includes the body 221 including the blade 220, and the tip 222. The robot control system 1 changes the orientation of the blade 220 so that the tip 222 is arranged between the content CT of the packaging material PM and the body 221. As a result of arranging the tip 222 between the content CT of the packaging material PM and the body 221 including the blade 220, the blade 220 of the cutter 22 is less likely to come into contact with the content CT. Even when the tip touches the content CT, because the tip is less sharp than the body, the content CT are less likely to be damaged.

Further, the blade 220 is arranged on the one edge portion E1 of the cutter 22. The one edge portion E1 is sharper than the another edge portion E2 of the cutter 22. The robot control system 1 changes the orientation of the blade 220 so that the another edge portion E2 is arranged between the content CT and the one edge portion E1. As a result of arranging the another edge portion E2 between the content CT and the one edge portion E1 on which the blade 220 is arranged, the probability of the blade 220 of the cutter 22 coming into contact with the content CT can be further reduced. As a result, the probability of damage to the content CT can be further reduced.

Further, the robot control system 1 controls the robot 20 so that the robot 20 cuts the packaging material PM in which the bag-shaped content CT are packaged with the blade 220. The bag-shaped content CT may touch the inner side of the faces of the packaging material PM, but in many cases the bag-shaped content CT are not touching the inner side of the corner C1 of the packaging material PM. In the case of a packaging material PM in which content CT are packaged in this manner, there is often a space inside the packaging material PM near the corners C1 to C4. When the robot 20 cuts the corners C1 to C4 of the packaging material PM with the blade 220 of the cutter 22, the blade 220 of the cutter 22 is less likely to come into contact with the content CT, but when the robot 20 cuts the faces of the packaging material PM, the blade 220 of the cutter 22 is more likely to come into contact with the content CT. As a result of orienting the blade 220 of the cutter 22 more toward (directing) the outer side when the robot 20 cuts the faces of the packaging material PM with the blade 220 of the cutter 22 than when the robot 20 cuts the corners C1 to C4 of the packaging material PM with the blade 220 of the cutter 22, it is possible to prevent the blade 220 of the cutter 22 from coming into contact with the content CT of the packaging material PM.

2. Second Embodiment

Next, a second embodiment of the present disclosure, which is an example of another embodiment of the robot control system 1, is described. In the second embodiment, descriptions of points that are the same as in the first embodiment are omitted.

Figure 17:
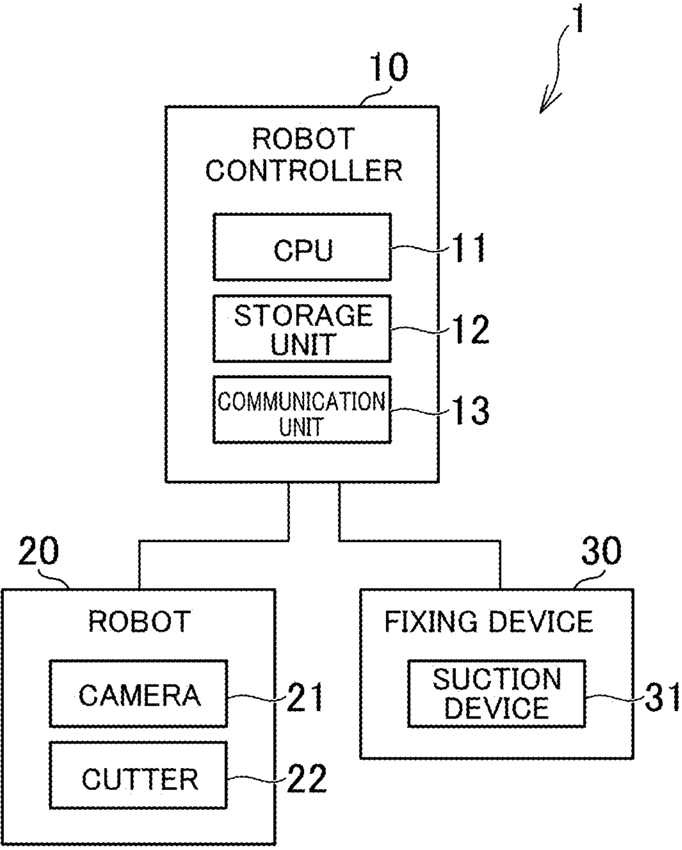
FIG. 17 is a diagram for illustrating an example of a hardware configuration of a robot control system according to a second embodiment of the present disclosure.

FIG. 17 is a diagram for illustrating an example of a hardware configuration of the robot control system 1 of the second embodiment. The robot control system 1 of the second embodiment includes a fixing device 30. For example, the fixing device 30 is a device which contacts the bottom face of the packaging material PM, and fixes at least a part of the portion in contact with the bottom face when the robot 20 including the cutter 22 is controlled to rotate around and cut the side faces of the packaging material PM with the blade 220 of the cutter 22.

For example, the fixing device 30 includes a suction device 31 which sucks at least a part of the portion in contact with the bottom face of the packaging material PM. The suction device 31 includes a suction cup (sucker) which contacts the packaging material PM, and a pump for suction. For example, the suction device 31 uses the pump to create a vacuum state between the suction cup and the object which the suction cup touches. The suction device 31 may be of any type, and is not limited to a type using a suction cup. For example, the suction device 31 may be a mat-like type instead of a suction cup, or may be a type referred to as a vacuum gripper.

For example, the robot controller 10 is connected to the fixing device 30 by a cable such as a signal line or a communication line. In the second embodiment, the fixing device 30 controls on/off of suction by the suction device 31 based on an instruction from the robot controller 10. The fixing device 30 controls a suction force by the suction device 31 based on an instruction from the robot controller 10. The fixing device 30 may be connected to another device other than the robot controller 10. In this case, at least one of turning on and off the suction by the suction device 31 or the suction force may be controlled by another device.

The fixing device 30 may fix the at least a part of the portion in contact with the bottom face of the packaging material PM by a method other than suction. That is, the fixing device 30 is not required to include the suction device 31. For example, the fixing device 30 may fix the at least a part of the portion in contact with the bottom face of the packaging material PM by using a sucker, rubber, a claw, or another member that does not have a suction function. The member may have a coefficient of static friction which is higher than that of the top plate of the work table T, such as a sucker or rubber, or may have a shape capable of supporting the bottom face of the packaging material PM, such as a claw. For example, the fixing device 30 may fix the at least a part of the portion in contact with the bottom face of the packaging material PM by using magnetic force or electrostatic force. In addition, for example, the fixing device 30 may be a robot different from the robot 20, like in a modification example described later.

Figure 18:
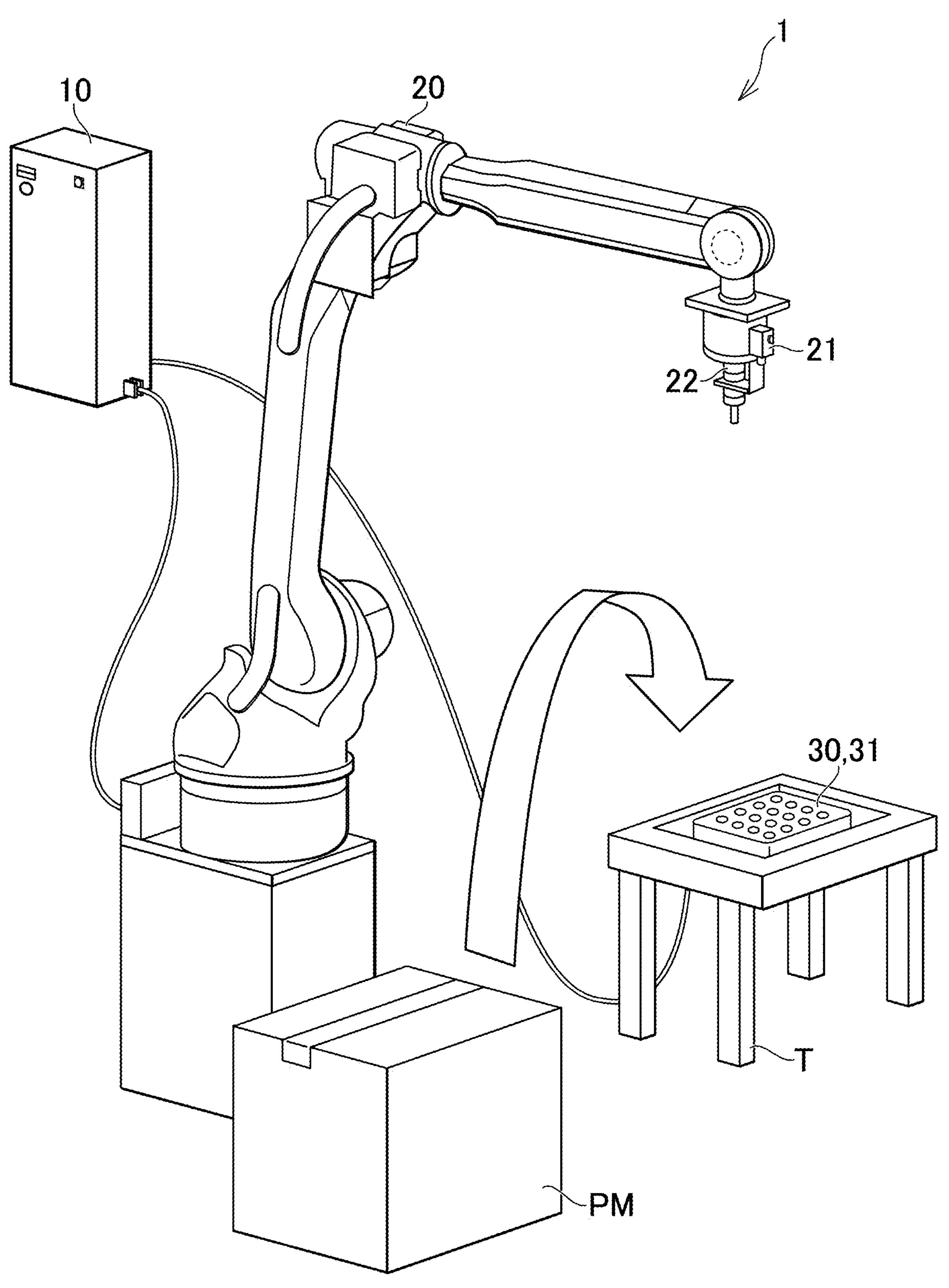
FIG. 18 is a diagram for illustrating an example of a space in which a robot controller, a robot, and a fixing device in the second embodiment are arranged.

FIG. 18 is a diagram for illustrating an example of a space in which the robot controller 10, the robot 20, and the fixing device 30 in the second embodiment are arranged. In FIG. 18, an example of a work table T before the packaging material PM is placed on the work table T is illustrated. As illustrated in FIG. 18, the top plate of the work table T has a hole near the center. A fixing portion 300 is arranged in the hole so that the suction cup of the suction device 31 faces upward. For example, the fixing device 30 is arranged so that the suction cup is at the same height as that of the top plate of the work table T. A sensor for detecting an object may be arranged on the surface of the suction device 31 on which the suction cup is arranged. When the packaging material PM is placed on the suction cup of the suction device 31, the suction device 31 may automatically start suction.

Figure 19:
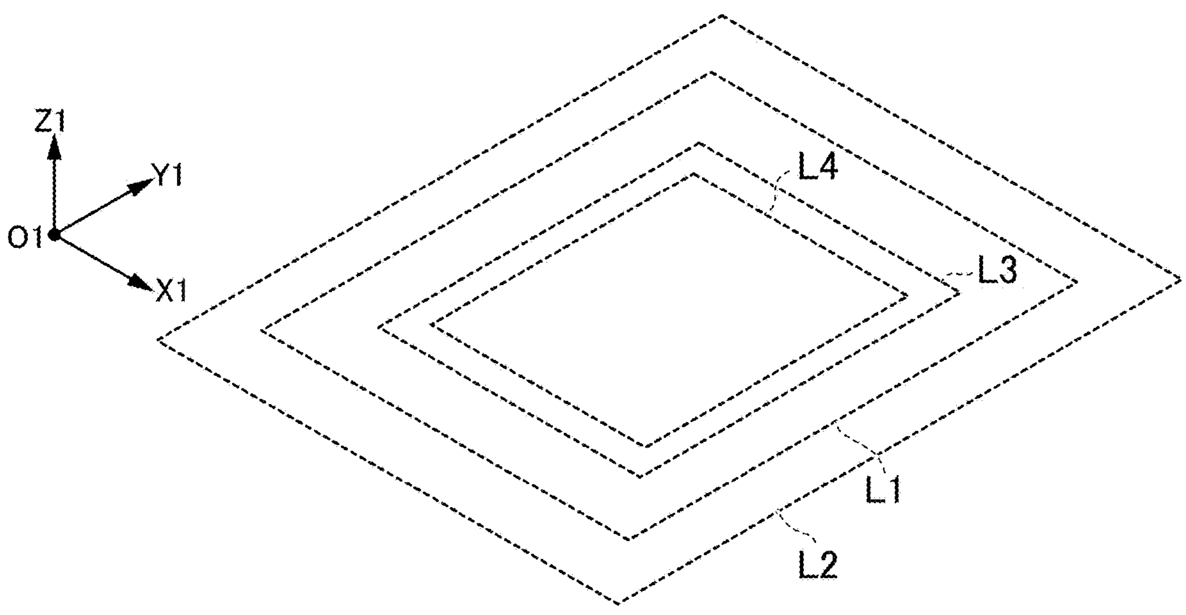
FIG. 19 is a diagram for illustrating an example of a relationship between a bottom face of the packaging material and the fixing device.

FIG. 19 is a diagram for illustrating an example of a relationship between the bottom face of the packaging material PM and the fixing device 30. In FIG. 19, an outline L1 of the top plate of the work table T, an outline L2 of the bottom face of the packaging material PM, an outline L3 of the hole in the top plate of the work table T, and an outline L4 of the fixing device 30 are illustrated. For example, the outline L2 is larger than the outline L1, and hence, even when the packaging material PM is placed on the top plate of the work table T, there is an area on the bottom face of the packaging material PM which does not touch the top plate of the work table T.

For example, the outline L2 is larger than the outlines L3 and L4, and hence, even when the packaging material PM is placed on the top plate of the work table T, there is an area on the bottom face of the packaging material PM which is not sucked by the suction device 31. Of the bottom face of the packaging material PM, the area of all or a part of the outline L4 which is sucked by the suction device 31 (for example, the suction cup part) has a larger static friction force than that of the area which is not sucked by the suction device 31 (for example, the area between the outline L3 and the outline L1). The area of all of a part of the outline L4 is an example of at least a part of the portion in contact with the bottom face of the packaging material PM. In the second embodiment, due to the suction by the suction device 31, the static friction force of the sucked area of the bottom face of the packaging material PM becomes larger than that of the other areas of the bottom face.

Figure 20:
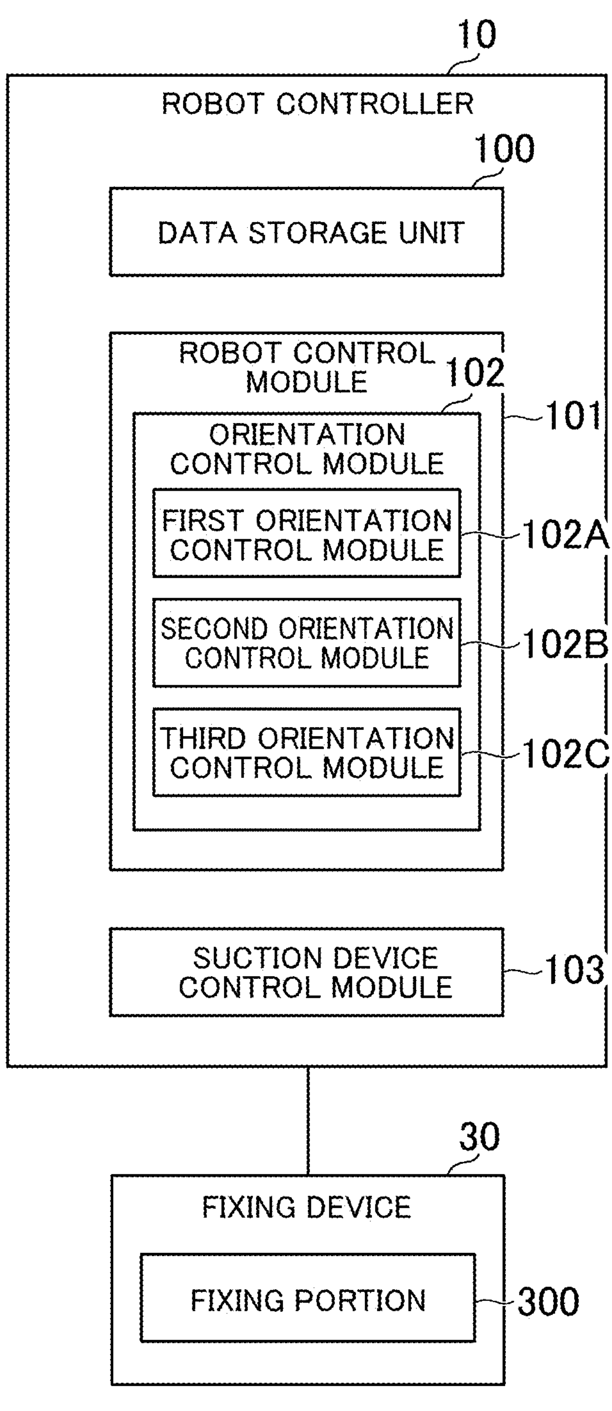
FIG. 20 is a diagram for illustrating an example of functions implemented in the second embodiment.

FIG. 20 is a diagram for illustrating an example of functions implemented in the second embodiment. Similarly to the first embodiment, the robot control module 101 in the second embodiment controls the robot 20 so that the robot 20 rotates around and cuts the side faces of the packaging material PM with the blade 220 of the cutter 22. The functions of the robot control module 101 are the same as those in the first embodiment, but the robot control module 101 in the second embodiment is not required to include all of the functions described in the first embodiment.

For example, the robot control module 101 in the second embodiment is not required to include the orientation control module 102. In this case, the robot control module 101 controls the robot 20 so that the robot 20 rotates around and cuts the side faces of the packaging material PM with the blade 220 of the cutter 22, but the orientation of the blade 220 is not required to be changed when the blade 220 cuts the side faces of the packaging material PM. In the case of a movement path MP like that of FIG. 13, the robot control module 101 is not required to change the orientation of the cutter 22 at the positions P3, P5, P7, and P9. For example, in the second embodiment, the cutter 22 may be a rotary blade instead of the cutter 22 like that described in the first embodiment.

In the second embodiment, the robot controller 10 includes a suction device control module 103. For example, the suction device control module 103 is implemented by the CPU 11. The suction device control module 103 controls the suction force of the suction device 31. For example, the suction device control module 103 transmits, to the suction device 31, at least one of a suction start signal indicating to start suction, a suction stop signal indicating to stop suction, an increase suction force signal to increase suction force, or a decrease suction force signal to decrease suction force. Those signals may be signals determined in advance.

For example, when the suction device 31 receives the suction start signal, the suction device 31 starts suction by the pump. When the suction device 31 receives the suction stop signal, the suction device 31 stops suction by the pump. When the suction device 31 receives the increase suction force signal, the suction device 31 controls the pump so that the suction force is increased. When the suction device 31 receives the decrease suction force signal, the suction device 31 controls the pump so that the suction force is decreased. The circuits of the suction device 31 are designed to perform those operations when the suction device 31 receives respective signals.

For example, the suction device control module 103 controls the suction device 31 so that when the robot 20 rotates around and cuts the side faces of the packaging material PM with the blade 220, the suction force of the suction device 31 is increased. As used herein, "when the robot 20 rotates around and cuts the side faces of the packaging material PM with the blade 220" may refer to only when the blade 220 is touching the packaging material PM, but in the second embodiment, the meaning includes before the blade 220 touches the packaging material PM.

In the example of the movement path MP of FIG. 13, the point in time after the cutter 22 has moved to the initial position P1 may correspond to "when the robot 20 rotates around and cuts the side faces of the packaging material PM with the blade 220." For example, the suction device control module 103 transmits the suction start signal to the suction device 31 when the cutter 22 moves to the initial position P1. When the suction device 31 receives the suction start signal, the suction device 31 starts suction. The suction device control module 103 transmits the suction stop signal to the suction device 31 when the cutter 22 moves to the position P10 and cutting of the packaging material PM is complete. When the suction device 31 receives the suction stop signal, the suction device 31 stops suction.

When suction has already started before the cutter 22 moves to the initial position P1, the suction device control module 103 may transmit the increase suction force signal to the suction device 31 instead of the suction start signal. When the suction device 31 receives the increase suction force signal, the suction device 31 increases the suction force. Further, the suction device control module 103 may transmit the decrease suction force signal to the suction device 31 instead of the suction stop signal when the cutter 22 moves to the position P10 and cutting of the packaging material PM is complete. When the suction device 31 receives the decrease suction force signal, the suction device 31 reduces the suction force.

The fixing device 30 includes the fixing portion 300. For example, the fixing portion 300 is implemented by the suction device 31. The fixing portion 300 contacts the bottom face of the packaging material PM, and fixes at least a part of the portion in contact with the bottom face. The portion contacting the bottom face of the packaging material PM may be the entire face of the fixing device 30 on the packaging material PM side, or may be a part of the face of the fixing device 30 on the packaging material PM side. For example, the fixing portion 300 fixes the at least a part of the portion in contact with the bottom face based on suction by the suction device 31.

The fixing method by the fixing portion 300 is not limited to the above-mentioned example. The fixing portion 300 may fix the at least a part of the portion in contact with the bottom face of the packaging material PM by a fixing method other than suction. For example, the fixing portion 300 may fix the at least a part of the portion in contact with the bottom face of the packaging material PM based on a static friction force generated between the at least a part of the portion in contact with the bottom face of the packaging material PM and a sucker, rubber, or another member. The fixing portion 300 may fix the at least a part of the portion in contact with the bottom face of the packaging material PM based on a supporting force generated between the at least a part of the portion in contact with the bottom face of the packaging material PM and a claw. The fixing portion 300 may fix the at least a part of the portion in contact with the bottom face of the packaging material PM based on a magnetic force or an electrostatic force generated between the fixing portion 300 and the at least a part of the portion in contact with the bottom face of the packaging material PM.

Figure 21:
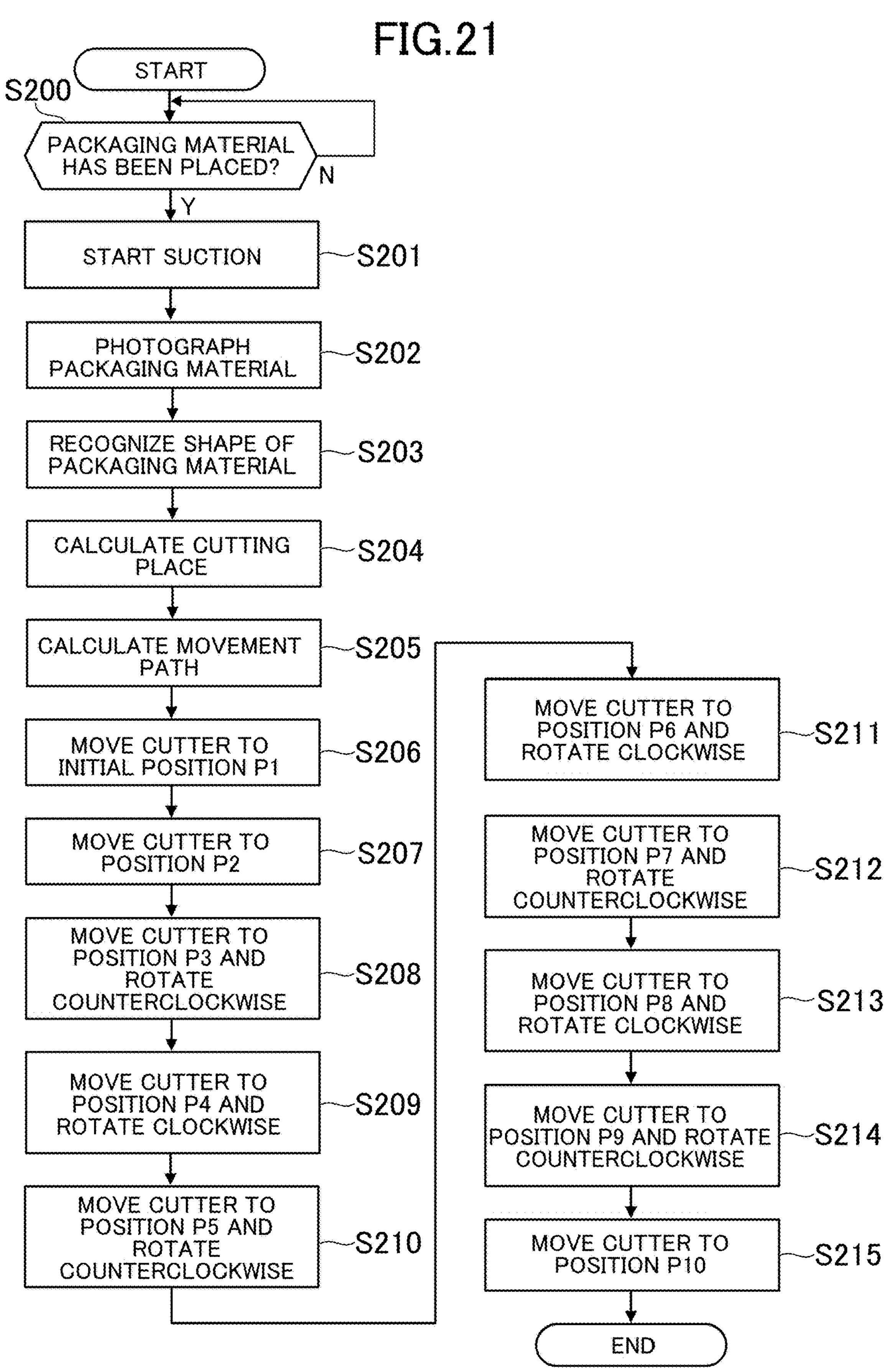
FIG. 21 is a flowchart for illustrating an example of processing executed in the second embodiment.

FIG. 21 is a flowchart for illustrating an example of processing executed in the second embodiment. The processing illustrated in FIG. 21 is executed by the CPU 11 executing programs stored in the storage unit 12. As illustrated in FIG. 21, the robot controller 10 determines whether or not the packaging material PM has been placed on the work table T (Step S200). For example, the robot controller 10 executes the determination of Step S200 based on, for example, an image photographed by the camera 21 or a contact sensor arranged on the work table T. When it is determined that the packaging material PM has been placed on the work table T ("Y" in Step S200), the robot controller 10 causes the suction device 31 to start suction (Step S201). The subsequent processing steps of from Step S202 to Step S215 are the same as the processing steps of from Step S100 to Step S113. In FIG. 21, a case in which the suction by the suction device 31 is started when the packaging material PM is placed on the work table T is illustrated. However, in Step S206, the robot controller 10 may start suction by the suction device 31 when the robot 20 moves to the initial position P1. Further, the robot controller 10 may stop the suction by the suction device 31 after the processing step of Step S215 is executed and the cutting is complete.

The robot control system 1 of the second embodiment includes the fixing portion 300 which contacts the bottom face of the packaging material PM, and fixes at least a part of the portion in contact with the bottom face. For example, in a case in which a jig supports the side faces of the packaging material PM, the jig may get in the way of the robot 20. However, the fixing portion 300 fixes the at least a part of the portion in contact with the bottom face, and thus the packaging material PM can be fixed without getting in the way of the cutter 22 when the robot 20 rotates around and cuts the side faces of the packaging material PM with the cutter 22. The packaging material PM is prevented from moving by the force from the cutter 22.

Further, the robot control system 1 includes the suction device 31 which sucks at least a part of the portion of the packaging material PM in contact with the bottom face of the packaging material PM. The suction device 31 enables the packaging material PM to be fixed without getting in the way of the cutter 22.

Further, the robot control system 1 controls the suction device 31 so that the suction force of the suction device 31 is increased when the robot 20 rotates around and cuts the side faces of the packaging material PM with the blade 220. As a result, when the robot 20 rotates around and cuts the side faces of the packaging material PM with the cutter 22, the packaging material PM can be easily fixed by increasing the suction force.

3. Modification Examples

The present disclosure is not limited to the first embodiment and the second embodiment described above, and can be modified suitably without departing from the spirit of the present disclosure.

3-1. Modification Examples Relating to First Embodiment

Figure 22:
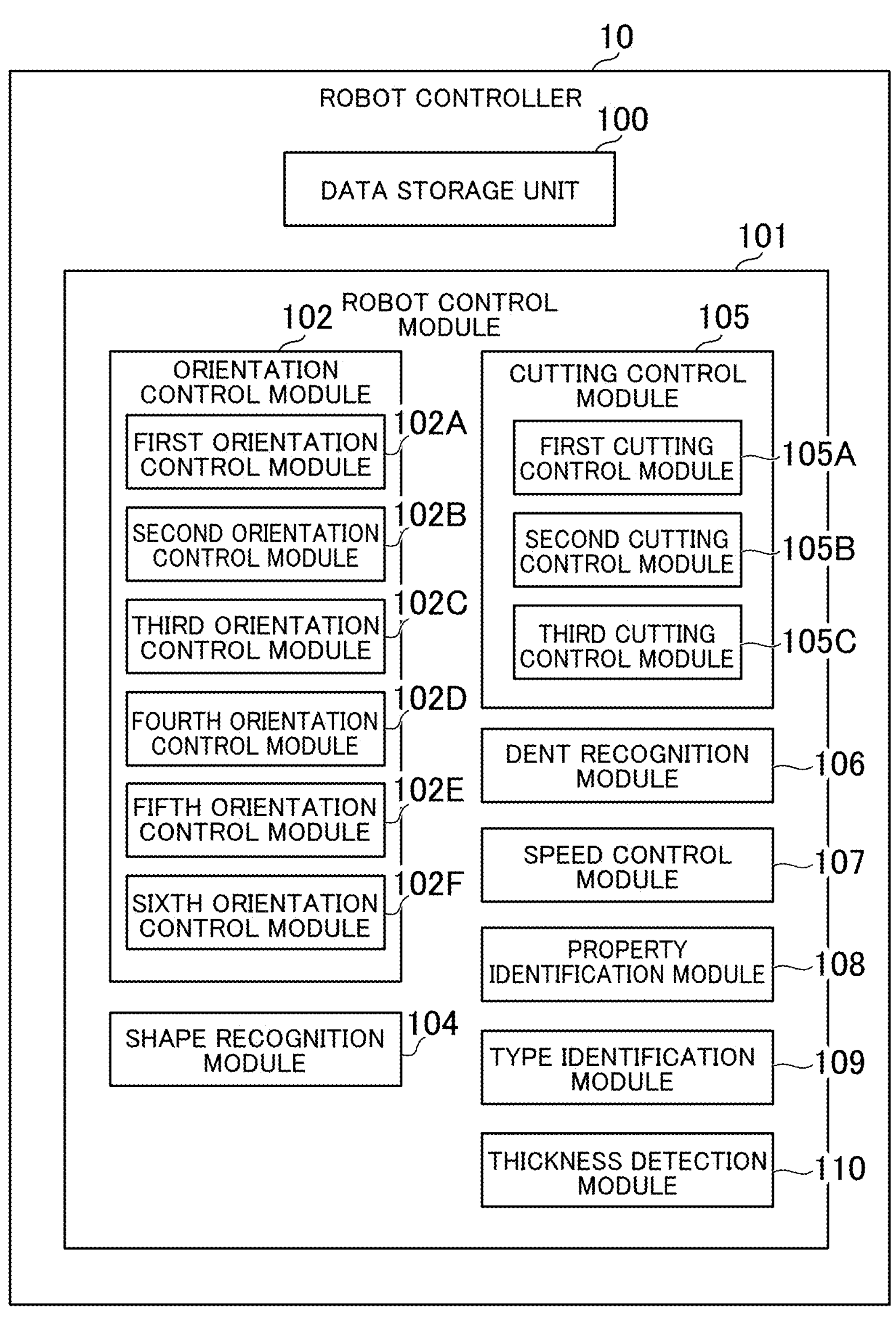
FIG. 22 is a diagram for illustrating an example of functions implemented in modification examples relating to the first embodiment.

First, description is given of modification examples relating to the first embodiment. FIG. 22 is a diagram for illustrating an example of functions implemented in the modification examples relating to the first embodiment. For example, in the modification examples relating to the first embodiment, the robot control module 101 includes a shape recognition module 104, a cutting control module 105, a dent recognition module 106, a speed control module 107, a property identification module 108, a type identification module 109, and a thickness detection module 110. Each of the shape recognition module 104, the cutting control module 105, the dent recognition module 106, the speed control module 107, the property identification module 108, the type identification module 109, and the thickness detection module 110 is implemented by the CPU 11.

Modification Example 1-1

For example, as described in the first embodiment, the surface of the packaging material PM may bulge out due to the content CT. It may be difficult to cut the place at which the packaging material PM bulges out with the cutter 22 because the surface is curved. Further, the content CT are present just inside the surface of the place at which the packaging material PM bulges out, and hence there is a possibility that the cutter 22 may come into contact with the content CT with a strong force. Thus, the robot controller 10 may control the robot 20 so that the robot 20 cuts below the bulge of the packaging material PM. In addition, the robot controller 10 may control the robot 20 so that the robot 20 cuts the packaging material PM by following the bulge of the packaging material PM.

The robot control system 1 of Modification Example 1-1 includes the shape recognition module 104 and the cutting control module 105. The shape recognition module 104 recognizes a shape of the packaging material PM based on the camera 21. The functions of the shape recognition module 104 are as described in relation to the functions of the robot control module 101 in the first embodiment. The shape recognition module 104 recognizes the shape of the packaging material PM based on photographed images generated by the camera 21 and the shape recognition program.

For example, the packaging material PM in Modification Example 1-1 has a bulge on the surface. For example, at least a part of a side face of the packaging material PM bulges out due to pressure from the content CT inside. Here, it is assumed that a midpoint between the bottom face and the top face of the packaging material PM bulges the most. The shape recognition module 104 can also recognize such a bulge based on the images generated by the camera 21.

The cutting control module 105 controls the robot 20 so that the robot 20 cuts the packaging material PM with the cutter 22. The processing of the cutting control module 105 may be the same as the processing described as the processing of the robot control module 101 in the first embodiment. In Modification Example 1-1, the cutting control module 105 includes a first cutting control module 105A. The first cutting control module 105A controls the robot 20 so that the robot 20 cuts below a bulge on a side face of the packaging material PM with the blade 220 based on the shape identified by the shape recognition module 104. For example, the first cutting control module 105A identifies the position bulging out the most based on the result (outline of the packaging material PM) of the recognition by the shape recognition module 104.

For example, the cutting control module 105 identifies the midpoint between the bottom face and the top face of the packaging material PM as the most bulging position. The first cutting control module 105A determines the position between the most bulging position of the packaging material PM and the bottom face of the packaging material PM as the cutting place CP. For example, the first cutting control module 105A calculates the distance between the most bulging position of the packaging material PM and the bottom face of the packaging material PM. The first cutting control module 105A determines, as the cutting place CP, a position which is a predetermined percentage (for example, 80%) of the distance below the most bulging position of the packaging material PM. The processing by the robot control module 101 after the cutting place CP is determined may be the same as in the first embodiment.

The method of determining the cutting place CP by the first cutting control module 105A is not limited to the above-mentioned example. It suffices that the first cutting control module 105A determine a position below the bulge of the packaging material PM as the cutting place CP. For example, the first cutting control module 105A may calculate the curve (curvature) of the outline of the packaging material PM, and determine a position at which the curve is less than a threshold value as the cutting place CP. As another example, the first cutting control module 105A may determine, as the cutting place CP, a position which is a predetermined percentage (for example, 20%) of the distance between the most bulging position of the packaging material PM and the bottom face of the packaging material PM away from the bottom face of the packaging material PM.

The robot control system 1 of Modification Example 1-1 recognizes the shape of the packaging material PM based on the camera 21. The robot control system 1 controls the robot 20 so that the robot 20 cuts below a bulge on a side face of the packaging material PM with the blade 220 based on the shape of the packaging material PM. As a result, the robot control system 1 uses the cutter 22 to cut below the bulge on the side face of the packaging material PM, and hence the blade 220 of the cutter 22 is less likely to come into contact with the content CT.

Modification Example 1-2

For example, as described in the first embodiment, the surface of the packaging material PM may have a dent instead of a bulge like in Modification Example 1-1. In this case, the robot controller 10 may control the robot 20 so that the robot 20 cuts the packaging material PM at a position corresponding to the dent with the blade 220. The robot control system 1 of Modification Example 1-2 includes the dent recognition module 106 and a second cutting control module 105B.

For example, the packaging material PM in Modification Example 1-2 has a dent on the surface. For example, the dent is produced when a worker has dropped packaging material PM. Here, it is assumed that the packaging material PM has a dent near the vertex V2. The dent recognition module 106 recognizes the dent of the packaging material PM based on the camera 21. The dent recognition module 106 is a function of the shape recognition module 104. For example, the dent recognition module 106 recognizes a portion at which the outline of the packaging material PM is curved inward (portion at which the curvature of the outline in the inward direction is equal to or more than a threshold value) as a dent.

The second cutting control module 105B controls the robot 20 so that the robot 20 cuts with the blade 220 at a position corresponding to the dent. As used herein, "position corresponding to the dent" refers to a position other than the dented portion of the packaging material PM. For example, the second cutting control module 105B controls the robot 20 so that the robot 20 cuts the packaging material PM while avoiding the dented portion of the packaging material PM. The second cutting control module 105B determines the cutting place CP so that the cutting place CP does not pass over the dent. The processing of the robot control module 101 after the cutting place CP is determined may be the same as in the first embodiment.

The robot control system 1 of Modification Example 1-2 recognizes the dent of the packaging material PM based on the camera 21. The robot control system 1 controls the robot 20 so that the robot 20 cuts a position corresponding to the dent with the blade 220. As a result, the robot control system 1 enables the robot to appropriately cut the packaging material PM with the blade 220 of the cutter 22 even when the packaging material PM is dented.

Modification Example 1-3

For example, the blade 220 is often less likely to get caught on the face portions of the packaging material PM when the cutting is performed at a sufficient speed. Thus, the speed of the cutter 22 may be changed between when the robot 20 cuts a corner of the packaging material PM and when the robot 20 cuts a face of the packaging material PM. "Speed" as referred to in Modification Examples 1-3 means the movement speed, but in the case of a cutter 22 which generates vibrations, such as an ultrasonic cutter, "speed" may refer to the vibration speed. The robot control system 1 of Modification Examples 1-3 includes the speed control module 107.

The speed control module 107 controls the robot 20 so that a speed of the cutter 22 changes between when the robot 20 cuts a face of the packaging material PM with the blade 220 and when the robot 20 cuts the corner C1 of the packaging material PM with the blade 220. For example, the speed control module 107 controls the robot 20 so that the speed at which the robot 20 cuts the faces of the packaging material PM with the blade 220 is faster than the speed at which the robot 20 cuts the corner C1 of the packaging material PM with the blade 220.

The control method by the speed control module 107 is not limited to the above-mentioned example. The speed control module 107 may control the robot 20 so that the speed at which the robot 20 cuts the faces of the packaging material PM with the blade 220 is slower than the speed at which the robot 20 cuts the corner C1 of the packaging material PM with the blade 220. For example, when a face of the packaging material PM is wet and easily torn, by using the speed control module 107 to control the speed in this manner, the wet face of the packaging material PM can be prevented from tearing.

The robot control system 1 of Modification Example 1-3 controls the robot 20 so that the speed of the cutter 22 changes between when the robot 20 cuts the faces of the packaging material PM with the blade 220 and when the robot 20 cuts the corner C1 of the packaging material PM with the blade 220. As a result of changing the speed of the cutter 22 between when the blade 220 of the cutter 22 cuts the faces of the packaging material PM and when the blade 220 of the cutter 22 cuts the corner C1 of the packaging material PM, the robot control system 1 can cut the packaging material PM at an appropriate speed. For example, takt time is improved. The cutter 22 is less likely to stop midway through cutting.

Modification Example 1-4

For example, the robot controller 10 may control the robot 20 so that a torque on the blade 220 is changed instead of changing the speed like in Modification Examples 1-3. The torque on the blade 220 is the torque detected when the blade 220 cuts the packaging material PM. The torque may increase due to a reaction force received by the blade 220 from the packaging material PM. The robot control system 1 of Modification Examples 1-4 includes a third cutting control module 105C.

The third cutting control module 105C controls the robot 20 so that the torque on the blade 220 changes between when the robot 20 cuts the faces of the packaging material PM with the blade 220 and when the robot 20 cuts the corner C1 of the packaging material PM with the blade 220. For example, the third cutting control module 105C controls the robot 20 so that the torque generated when the robot 20 cuts the faces of the packaging material PM with the blade 220 is larger than the torque generated when the robot 20 cuts the corner C1 of the packaging material PM with the blade 220. The third cutting control module 105C increases the force with which the robot 20 presses the blade 220 against the packaging material PM so that the torque generated when the robot 20 cuts the faces of the packaging material PM with the blade 220 is larger than the torque generated when the robot 20 cuts the corner C1 of the packaging material PM with the blade 220.

The control method by the third cutting control module 105C is not limited to the above-mentioned example. The third cutting control module 105C may control the robot 20 so that the torque generated when the robot 20 cuts the faces of the packaging material PM with the blade 220 is smaller than the torque generated when the robot 20 cuts the corner C1 of the packaging material PM with the blade 220. The third cutting control module 105C reduces the force with which the robot 20 presses the blade 220 against the packaging material PM so that the torque generated when the robot 20 cuts the faces of the packaging material PM with the blade 220 is smaller than the torque generated when the robot 20 cuts the corner C1 of the packaging material PM with the blade 220. For example, when a face of the packaging material PM is wet and easily torn, by using the third cutting control module 105C to control the robot 20 in this manner, the wet face of the packaging material PM can be prevented from tearing.

The robot control system 1 of Modification Example 1-4 controls the robot 20 so that the torque on the blade 220 changes between when the robot 20 cuts the faces of the packaging material PM with the blade 220 and when the robot 20 cuts the corner C1 of the packaging material PM with the blade 220. As a result of changing the torque on the blade 220 between when the blade 220 of the cutter 22 cuts the faces of the packaging material PM and when the blade 220 of the cutter 22 cuts the corner C1 of the packaging material PM, the robot control system 1 can cut the packaging material PM at an appropriate pressing force.

Modification Example 1-5

For example, the robot controller 10 may change the orientation of the blade 220 in accordance with a property of the packaging material PM. The property of the packaging material PM may be at least one of a thickness, a wetness, a hardness, or a material of the packaging material PM. The robot control system 1 includes the property identification module 108 and a fourth orientation control module 102D.

The property identification module 108 identifies a property of the packaging material PM. In Modification Example 1-5, the user using the robot control system 1 inputs a property of the packaging material PM from a handheld terminal connected to the robot controller 10. The property identification module 108 records, in the data storage unit 100, a property parameter indicating the property of the packaging material PM input by the user. For example, the user inputs at least one of the thickness, the wetness, the hardness, or the material of the packaging material PM from the handheld terminal.

The property identification module 108 may identify the property of the packaging material PM by using another method. For example, the property identification module 108 may identify the property of the packaging material PM based on photographed images generated by the camera 21. It is difficult to identify the thickness of the packaging material PM from photographed images, but it is possible to estimate at least one of the wettability, the hardness, or the material of the packaging material PM to some extent from the color of the surface of the packaging material PM. The property identification module 108 may identify at least one of the wetness, the hardness, or the material of the packaging material PM by analyzing the photographed images.

Further, the property identification module 108 may identify the property of the packaging material PM based on a detection signal from a sensor included in the robot 20. For example, the property identification module 108 may identify the property of the packaging material PM based on a change in torque detected by a torque sensor as the cutter 22 makes a cut into the corner C1. The property identification module 108 may identify the property of the packaging material PM based on a change in a detection signal from a contact sensor when the cutter 22 makes a cut into the corner C1.

The fourth orientation control module 102D controls the robot 20 so that the orientation of the blade 220 changes based on the property of the packaging material PM. It is assumed that a relationship between the property of the packaging material PM and the orientation of the blade 220 is defined in the robot control program. The fourth orientation control module 102D controls the robot 20 so that the orientation of the blade 220 becomes an orientation associated with the property of the packaging material PM. For example, the fourth orientation control module 102D controls the orientation of the blade 220 so that the blade 220 is oriented more toward (directing) an outer side of the packaging material PM when the packaging material PM has a first property than when the packaging material PM has a second property.

For example, when the packaging material PM is dry, the packaging material PM can be cut more easily than when the packaging material PM is wet even when the blade 220 is oriented toward the outer side of the packaging material PM, and thus the fourth orientation control module 102D controls the orientation of the blade 220 so that the blade 220 is oriented toward the outer side of the packaging material PM. As the packaging material PM becomes thinner, the blade 220 becomes more likely to come into contact with the content CT, and thus the fourth orientation control module 102D controls the orientation of the blade 220 so that the blade 220 is oriented toward the outer side of the packaging material PM. As the material of the packaging material PM becomes softer, the packaging material PM can be cut more easily even when the blade 220 is oriented toward the outer side of the packaging material PM, and thus the fourth orientation control module 102D controls the orientation of the blade 220 so that the blade 220 is oriented toward the outer side of the packaging material PM.

The robot control system 1 of Modification Examples 1-5 changes the orientation of the blade 220 based on the property of the packaging material PM. The robot control system 1 can cut the packaging material PM with the blade 220 oriented in accordance with the property of the packaging material PM.

Modification Example 1-6

For example, the robot controller 10 may change the orientation of the blade 220 in accordance with the type of the content CT. The type of the content CT is at least one of the material, the thickness, the wetness, or the hardness of the content CT. The robot control system 1 includes the type identification module 109 and a fifth orientation control module 102E.

The type identification module 109 identifies the type of the content CT of the packaging material PM. In Modification Example 1-6, the user inputs the type of the content CT from a handheld terminal connected to the robot controller 10. The type identification module 109 records, in the data storage unit 100, type parameters indicating a type of the content CT input by the user. For example, the user inputs at least one of the material, the thickness, the wetness, or the hardness of the content CT from the handheld terminal.

The type identification module 109 may identify the type of the content CT by using another method. For example, when the top face of the packaging material PM is open, the type identification module 109 may identify the type of the content CT based on photographed images generated by the camera 21. For example, when the camera 21 is arranged at the tip of the cutter 22, the type identification module 109 may use the camera 21 to photograph the content CT when the tip 222 of the cutter 22 is inserted, and identify the type of the content CT based on the photographed images generated by the camera 21.

The fifth orientation control module 102E controls the robot 20 so that the orientation of the blade 220 changes based on the type of the content CT. It is assumed that a relationship between the type of the content CT and the orientation of the blade 220 is defined in the robot control program. The fifth orientation control module 102E controls the robot 20 so that the orientation of the blade 220 becomes an orientation associated with the type of the content CT. For example, the fifth orientation control module 102E controls the orientation of the blade 220 so that the blade 220 is oriented more toward (directing) the outer side of the packaging material PM when the content CT are of a first type than when the content CT are of a second type.

For example, as the material of the packaging material PM becomes softer, the packaging material PM can be cut more easily even when the blade 220 is oriented toward the outer side of the packaging material PM, and thus the fifth orientation control module 102E controls the orientation of the blade 220 so that the blade 220 is oriented toward the outer side of the packaging material PM. As the material of the packaging material PM becomes thinner, the blade 220 becomes more likely to come into contact with the content CT, and thus the fifth orientation control module 102E controls the orientation of the blade 220 so that the blade 220 is oriented toward the outer side of the packaging material PM. When the packaging material PM is dry, the packaging material PM can be cut more easily than when the packaging material PM is wet even when the blade 220 is oriented toward the outer side of the packaging material PM, and thus the fifth orientation control module 102E controls the orientation of the blade 220 so that the blade 220 is oriented toward the outer side of the packaging material PM.

The robot control system 1 of Modification Example 1-6 identifies the type of the content CT of the packaging material PM. The robot control system 1 controls the robot 20 so that the orientation of the blade 220 changes based on the type of the content CT. The robot control system 1 can cut the packaging material PM with the blade 220 oriented in accordance with the type of the content CT.

Modification Example 1-7

For example, the robot controller 10 may detect the thickness of the packaging material PM based on the torque on the blade 220 detected by a torque sensor. The torque sensor may be arranged in order to detect the thickness of the packaging material PM, but in Modification Example 1-7, it is assumed that the torque sensor is arranged in order for the robot controller 10 to detect whether or not an abnormality has occurred in the robot 20. The robot controller 10 detects the thickness of the packaging material PM by using a torque sensor arranged for this purpose. The robot control system 1 of Modification Examples 1-7 includes the thickness detection module 110 and a sixth orientation control module 102F.

The thickness detection module 110 detects a thickness of the packaging material PM based on a torque on the blade 220. For example, the thickness detection module 110 detects the thickness of the packaging material PM based on a change in torque after the blade 220 touches the packaging material PM. When the blade 220 touches the packaging material PM, the blade 220 receives a reaction force, and hence an amount of increase in torque becomes equal to or more than a threshold value. As a result, the thickness detection module 110 detects that the blade 220 has touched the packaging material PM. When the blade 220 reaches the inner side of the packaging material PM, the reaction force against the blade 220 weakens, and hence an amount of reduction in torque becomes equal to or more than a threshold value. As a result, the thickness detection module 110 detects that the blade 220 has reached the inner side of the packaging material PM.

For example, the thickness detection module 110 detects the thickness of the packaging material PM based on the distance the blade 220 moves from when the blade 220 touches the packaging material PM to when the blade 220 reaches the inner side of the packaging material PM. The thickness detection module 110 may directly detect the moved distance as the thickness of the packaging material PM, or may detect a value obtained by multiplying the moved distance by a predetermined coefficient as the thickness of the packaging material PM.

The sixth orientation control module 102F controls the robot 20 so that the orientation of the blade 220 changes based on the thickness of the packaging material PM. It is assumed that a relationship between the thickness of the packaging material PM and the orientation of the blade 220 is defined in the robot control program. The sixth orientation control module 102F controls the robot 20 so that the orientation of the blade 220 becomes an orientation associated with the thickness of the packaging material PM. For example, the sixth orientation control module 102F controls the orientation of the blade 220 so that the blade 220 is oriented more toward (directing) an outer side of the packaging material PM when the packaging material PM is thinner.

The robot control system 1 of Modification Examples 1-7 detects the thickness of the packaging material PM based on the torque on the blade 220. The robot control system 1 controls the robot 20 so that the orientation of the blade 220 changes based on the thickness of the packaging material PM. The robot control system 1 can cut the packaging material PM with the blade 220 oriented in accordance with the thickness of the packaging material PM.

Other Modification Examples Relating to First Embodiment

For example, a stopper may be arranged on the cutter 22 so that the cutter 22 does not penetrate too far into the packaging material PM. The robot controller 10 may increase a vibration frequency of the cutter 22 when the cutter 22 cuts a corner of the packaging material PM compared to when the cutter 22 cuts a face of the packaging material PM. The robot controller 10 may reduce the vibration frequency of the cutter 22 when the packaging material PM is wet. The robot controller 10 may replace the cutter 22 in accordance with the packaging material PM.

3-2. Modification Examples Relating to Second Embodiment

Next, description is given of modification examples relating to the second embodiment. In the second embodiment, there has been described a case in which the fixing portion 300 is implemented by the suction device 31 arranged on the work table T, but the fixing portion 300 may be implemented by other hardware. In the modification examples relating to the second embodiment, description is given of a case in which the fixing portion 300 is implemented by a robot different from the robot 20. The robot control system 1 of the modification examples relating to the second embodiment include another robot different from the robot 20.

Figure 23:
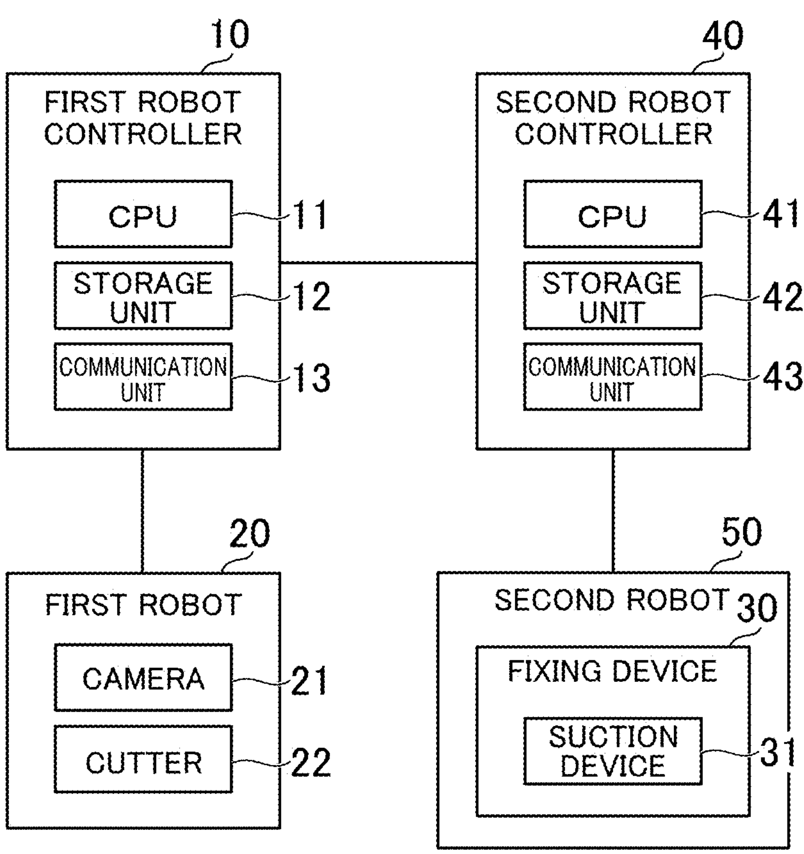
FIG. 23 is a diagram for illustrating an example of a hardware configuration of a robot control system according to modification examples relating to the second embodiment.

FIG. 23 is a diagram for illustrating an example of a hardware configuration of the robot control system 1 according to the modification examples relating to the second embodiment. In the modification examples relating to the second embodiment, the robot controller 10 and the robot 20 described in the second embodiment are referred to as "first robot controller 10" and "first robot 20," respectively. For example, the robot control system 1 includes a second robot controller 40 and a second robot 50. The first robot 20 is an example of a robot including a cutter 22. The second robot 50 is an example of another robot. In the modification examples relating to the second embodiment, a case in which the first robot controller 10 and the second robot controller 40 are directly connected via an industrial network or a network such as a LAN is given as an example, but the first robot controller 10 and the second robot controller 40 may be connected via a host controller. The first robot controller 10 and the second robot controller 40 may execute the processing described later based on instructions from the host controller.

For example, the second robot controller 40 includes a CPU 41, a storage unit 42, and a communication unit 43. The hardware configuration of each of the CPU 41, the storage unit 42, and the communication unit 43 may be the same as the hardware configuration of the CPU 11, the storage unit 12, and the communication unit 13, respectively. The point that the programs and data stored in the storage unit 42 may be supplied to the second robot controller 40 via a network, and the point that the hardware configuration of the second robot controller 40 is not limited to the example of FIG. 23 are the same as described in relation to the first robot controller 10.

The hardware configuration of the second robot 50 may be the same as the hardware configuration of the first robot 20, but the second robot 50 is different from the first robot 20 in terms of what is attached as an end effector. For example, the second robot 50 includes the fixing device 30 as an end effector. In the modification examples relating to the second embodiment, the fixing device 30 includes the suction device 31, like in the second embodiment. Thus, the second robot 50 includes the suction device 31 as an end effector at the tip. In addition, in the modification examples relating to the second embodiment, description is given of a case in which the second robot 50 does not include a camera, but similarly to the first robot 20, the second robot 50 may include a camera. The second robot 50 may include a motor encoder, a torque sensor, a contact sensor, or other sensors.

FIG. 24 is a diagram for illustrating an example of functions implemented in the modification examples relating to the second embodiment. For example, in the modification examples relating to the second embodiment, the second robot controller 40 includes a data storage unit 400 and a second robot control module 401. The data storage unit 400 is implemented by the storage unit 42. The second robot control module 401 is implemented by the CPU 41. The second robot control module 401 includes a fixing control module 402, a removal control module 403, a rotation control module 404, a cutting place identification module 405, a cutting situation identification module 406, and a property identification module 407.

For example, the data storage unit 400 stores data required for the second robot controller 40 to control the second robot 50. For example, the data storage unit 400 stores programs including code (commands) indicating control content of the second robot 50. The programs can be written in any language, for example, a robot language or a ladder language. Any code used in those languages may be used. For example, the programs include at least one of code for moving the second robot 50, code for changing a posture of the second robot 50, or code for controlling the suction device 31.

For example, the data storage unit 400 stores a robot control program for moving the suction device 31 to the surface of the packaging material PM and a suction device control program for controlling the suction device 31. The robot control program is similar to the robot control program described in the first embodiment in terms of the point that the robot control program is a program for implementing movement to a predetermined target position. For example, the robot control program may include an algorithm for calculating a path to the target position. The suction device control program is a program for transmitting various instructions, such as the suction start instruction described in the second embodiment, to the suction device 31. The fixing control module 402 controls the second robot 50 based on those programs so that the fixing device 30 of the second robot 50 fixes the packaging material PM.

Figure 25:
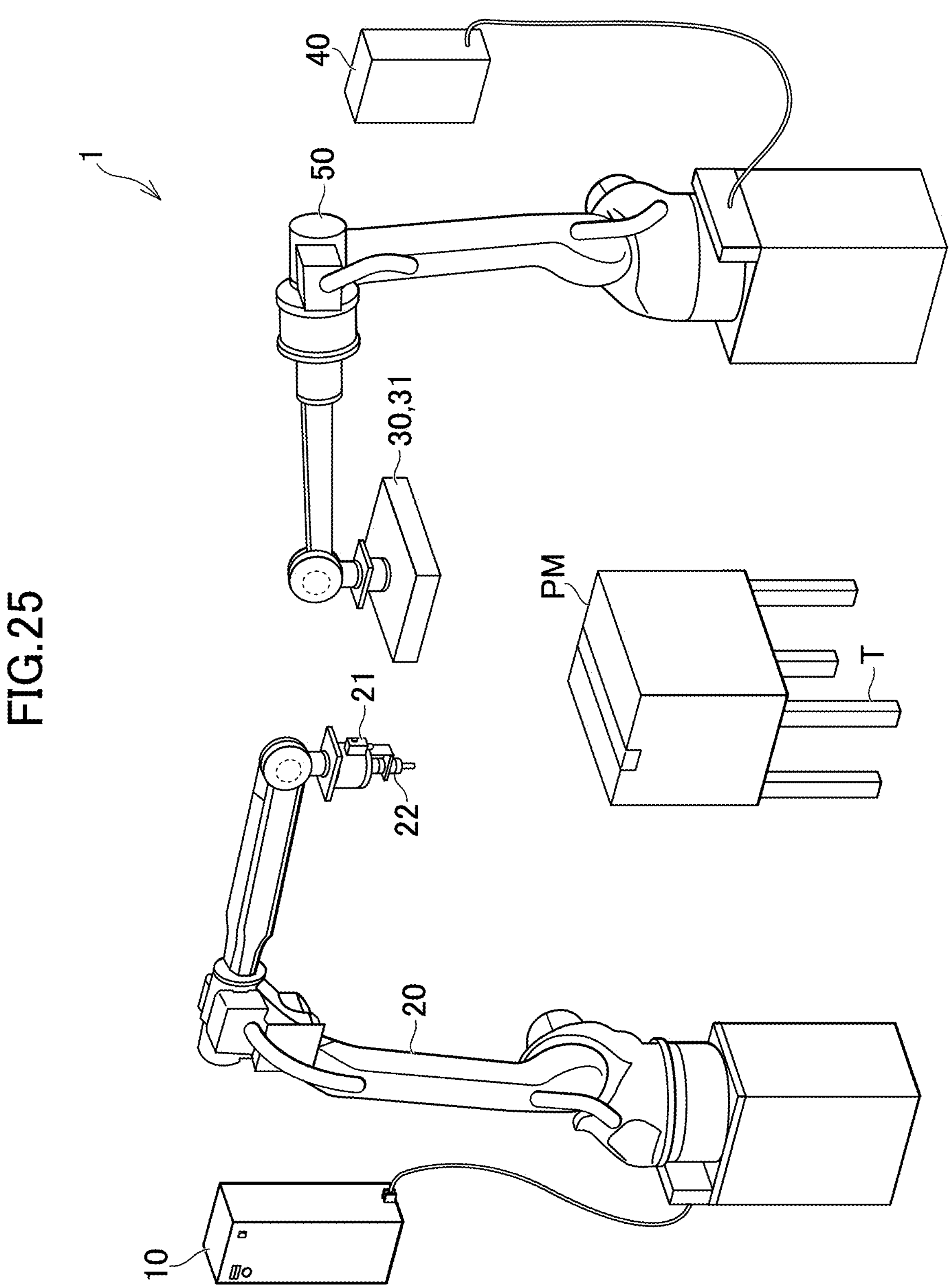
FIG. 25 is a diagram for illustrating an example of a space in which a first robot controller, a first robot, a second robot controller, and a second robot are arranged.

FIG. 25 is a diagram for illustrating an example of a space in which the first robot controller 10, the first robot 20, the second robot controller 40, and the second robot 50 are arranged.

For example, the second robot 50 is arranged on the opposite side of the first robot 20 when viewed from the work table T and the packaging material PM. It is noted that, like the first embodiment, the work table T in the modification examples relating to the second embodiment does not include the fixing device 30. Further, in FIG. 25, the communication line between the first robot controller 10 and the second robot controller 40 is not shown. The communication line is similarly also not shown in FIG. 26 and FIG. 27, which are described later.

As illustrated in FIG. 25, the fixing device 30 is attached to the tip of the second robot 50 as an end effector. In the example of FIG. 25, the suction cup of the suction device 31 of the fixing device 30 faces downward. In the state illustrated in FIG. 25, when the second robot controller 40 moves the second robot 50 so that the suction cup of the suction device 31 touches the top face of the packaging material PM, and controls so that the fixing device 30 presses on the packaging material PM from above, as a result, the fixing device 30 can fix the packaging material PM. Further, the second robot controller 40 can fix the packaging material PM with a stronger force by starting suction using the suction device 31.

In the modification examples relating to the second embodiment, the first robot 20 and the second robot 50 do not interfere with each other. For example, the first robot 20 may be prevented from contacting the second robot 50 by moving such that half of the circumference of the packaging material PM is cut at a time. For example, the second robot 50 may retreat to another position when the first robot 20 passes by, and start the fixing of the packaging material PM again after the first robot 20 has passed.

Modification Example 2-1

For example, in Modification Example 2-1, before the first robot 20 starts cutting the packaging material PM with the cutter 22, the second robot controller 40 moves the second robot 50 so that the second robot 50 fixes the top face of the packaging material PM with the fixing device 30. For example, the second robot controller 40 receives packaging material data indicating the position and the shape of the packaging material PM from the first robot controller 10. For example, the packaging material data indicates the positions of vertices V1 to V8 of the packaging material PM in a coordinate system based on the first robot 20.

For example, the second robot controller 40 converts the coordinate system based on the first robot 20 in the packaging material data to a coordinate system based on the second robot 50. A relative positional relationship between the first robot 20 and the second robot 50 (for example, direction and distance between the base of the first robot 20 and the base of the second robot 50) is specified by the user in advance as a parameter. The second robot controller 40 may convert the coordinate system of the packaging material data based on the relative positional relationship.

For example, the second robot controller 40 determines the position to which the fixing device 30 of the second robot 50 is to be moved based on the position and the shape of the packaging material PM indicated by the packaging material data after the coordinate system has been converted. The first robot controller 10 starts cutting the packaging material PM after the packaging material PM is fixed by the fixing device 30 of the second robot 50. The method of cutting the packaging material PM may be the same as in the second embodiment.

The coordinate system conversion may be executed by the first robot controller 10. In this case, the first robot controller 10 transmits packaging material data that has been converted into a coordinate system based on the second robot 50 to the second robot controller 40. Further, when the second robot 50 includes a camera similar to the camera 21, the second robot controller 40 may control the second robot 50 so that the camera of the second robot 50 photographs the packaging material PM. Similarly to the first robot controller 10, the second robot controller 40 may recognize the position and the shape of the packaging material PM based on photographed images generated by the camera of the second robot 50.

The robot control system 1 of Modification Example 2-1 includes a first fixing control module 402A. The first fixing control module 402A controls the second robot 50 so that the second robot 50 fixes the packaging material PM with the fixing device 30. For example, the first fixing control module 402A controls the second robot 50 so that the suction device 31 of the fixing device 30 touches the top face of the packaging material PM. The position of the top face of the packaging material PM is identified from the packaging material data. The first fixing control module 402A controls the second robot 50 so that the second robot 50 fixes the packaging material PM by supporting the packaging material PM in a direction different from the direction of the force applied to the packaging material PM by the blade 220.

The direction of the force applied to the packaging material PM by the blade 220 is the moving direction of the blade 220 or a direction in which the angle formed with the moving direction is less than a predetermined angle (for example, less than 20 degrees). This direction is hereinafter referred to as "cutting direction." As used herein, a direction different from the cutting direction is a direction in which the angle formed with the cutting direction is a predetermined angle or more (for example, 45 degrees or more). The direction different from the cutting direction is hereinafter referred to as "supporting direction."

In the example of FIG. 25, the cutting direction is the horizontal direction, and the supporting direction is the vertical direction. The first fixing control module 402A controls the second robot 50 so that the second robot 50 supports the packaging material PM in the vertical direction (that is, so that the second robot 50 presses on the packaging material PM from above). For example, the first fixing control module 402A determines a target position of the fixing device 30 of the second robot 50 based on the position and the shape of the packaging material PM indicated by the packaging material data. In Modification Example 2-1, the first fixing control module 402A determines a center point of the top face of the packaging material PM as the target position of the fixing device 30 of the second robot 50.

For example, the first fixing control module 402A controls the second robot 50 so that the fixing device 30 moves to the center point of the top face of the packaging material PM under a state in which the suction cup facing downward. The movement path of the second robot 50 can be determined by any algorithm. For example, the first fixing control module 402A calculates the movement path from the initial position set for the second robot 50 to the target position based on linear interpolation, circular interpolation, or spline interpolation. The first fixing control module 402A controls the second robot 50 based on the calculated movement path.

In Modification Example 2-1, a case in which the work table T does not include another fixing device different from the fixing device 30 of the second robot 50 is given as an example, but the work table T may include another fixing device. That is, the packaging material PM may be fixed by the fixing device 30 of the second robot 50 and the another fixing device of the work table T to be sandwiched from above and below.

The robot control system 1 of Modification Example 2-1 controls the second robot 50 so that the second robot 50 fixes the packaging material PM by supporting the packaging material PM in a direction different from the direction of the force applied to the packaging material PM by the blade 220. The packaging material PM can be fixed by the second robot 50, which is a different robot from the first robot 20 that cuts the packaging material PM. For example, the packaging material PM can be fixed more easily by the frictional force generated on the bottom face of the packaging material PM and the frictional force generated on the top face of the packaging material PM.

Modification Example 2-2

For example, in Modification Example 2-1, a case in which the second robot 50 fixes the packaging material PM from the top face of the packaging material PM is given as an example. The second robot 50 may fix a face other than the top face of the packaging material PM. In Modification Example 2-2, description is given of a case in which the packaging material PM is arranged not on the work table T but on the fixing device 30 of the second robot 50, and the second robot 50 fixes the packaging material PM from the bottom face of the packaging material PM.

In Modification Example 2-2, the work table T is not included. Assuming that the second robot 50 is in the state illustrated in FIG. 25 (however, the work table T does not exist), the second robot controller 40 controls the second robot 50 so that the suction cup of the fixing device 30 of the second robot 50 faces upward. The packaging material PM is placed on the fixing device 30 by a worker or a transport robot. When the packaging material PM is placed on the fixing device 30, the second robot controller 40 starts suction using the suction device 31. The second robot 50 uses the fixing device 30 to support the packaging material PM from below.

The robot control system 1 of Modification Example 2-2 includes a second fixing control module 402B. The second fixing control module 402B controls the second robot 50 so that the second robot 50 fixes the top face of the packaging material PM or at least the part in contact with the bottom face of the packaging material PM. The process by which the second robot 50 fixes the top face of the packaging material PM is as described in Modification Example 2-1, and hence, in Modification Example 2-2, description is given of a process in which the second robot 50 fixes at least the part in contact with the bottom face of the packaging material PM.

A target position of the fixing device 30 is determined in advance in the data storage unit 400. The target position is the position at which the packaging material PM is placed. For example, the second fixing control module 402B controls the second robot 50 so that the fixing device 30 moves to the target position under a state in which the suction cup faces upward. The second fixing control module 402B calculates the movement path from the initial position set for the second robot 50 to the target position based on the any algorithm described above. The second fixing control module 402B controls the second robot 50 based on the calculated movement path.

The robot control system 1 of Modification Example 2-2 controls the second robot 50 so that the second robot 50 fixes the top face of the packaging material PM or at least the part in contact with the bottom face of the packaging material PM. The packaging material PM can be fixed by the second robot 50 different from the first robot 20 that cuts the packaging material PM. For example, by fixing the bottom face side of the packaging material PM by the second robot

50, the second robot 50 takes the place of the work table T, and hence the work table T can also be eliminated.

Modification Example 2-3

For example, in Modification Example 2-1, the second robot controller 40 may control the second robot 50 so that the second robot 50 removes the upper portion of the packaging material PM after the first robot 20 completes the cutting of the packaging material PM. As another example, in Modification Example 2-2, the second robot controller 40 may control the second robot 50 so that the second robot 50 removes the bottom portion of the packaging material PM after the first robot 20 completes the cutting of the packaging material PM and the content CT are taken out.

The robot control system 1 of Modification Example 2-3 includes the removal control module 403. The removal control module 403 controls the second robot 50 so that the second robot 50 removes the upper portion or bottom portion of the packaging material PM after the cutting of the packaging material PM is complete. For example, when the first robot 20 completes the cutting of the packaging material PM, the first robot controller 10 transmits a cutting completion notification indicating that cutting of the packaging material PM is complete to the second robot controller 40. The second robot controller 40 identifies that the cutting of the packaging material PM is complete by receiving the cutting completion notification from the first robot controller 10.

Figure 26:
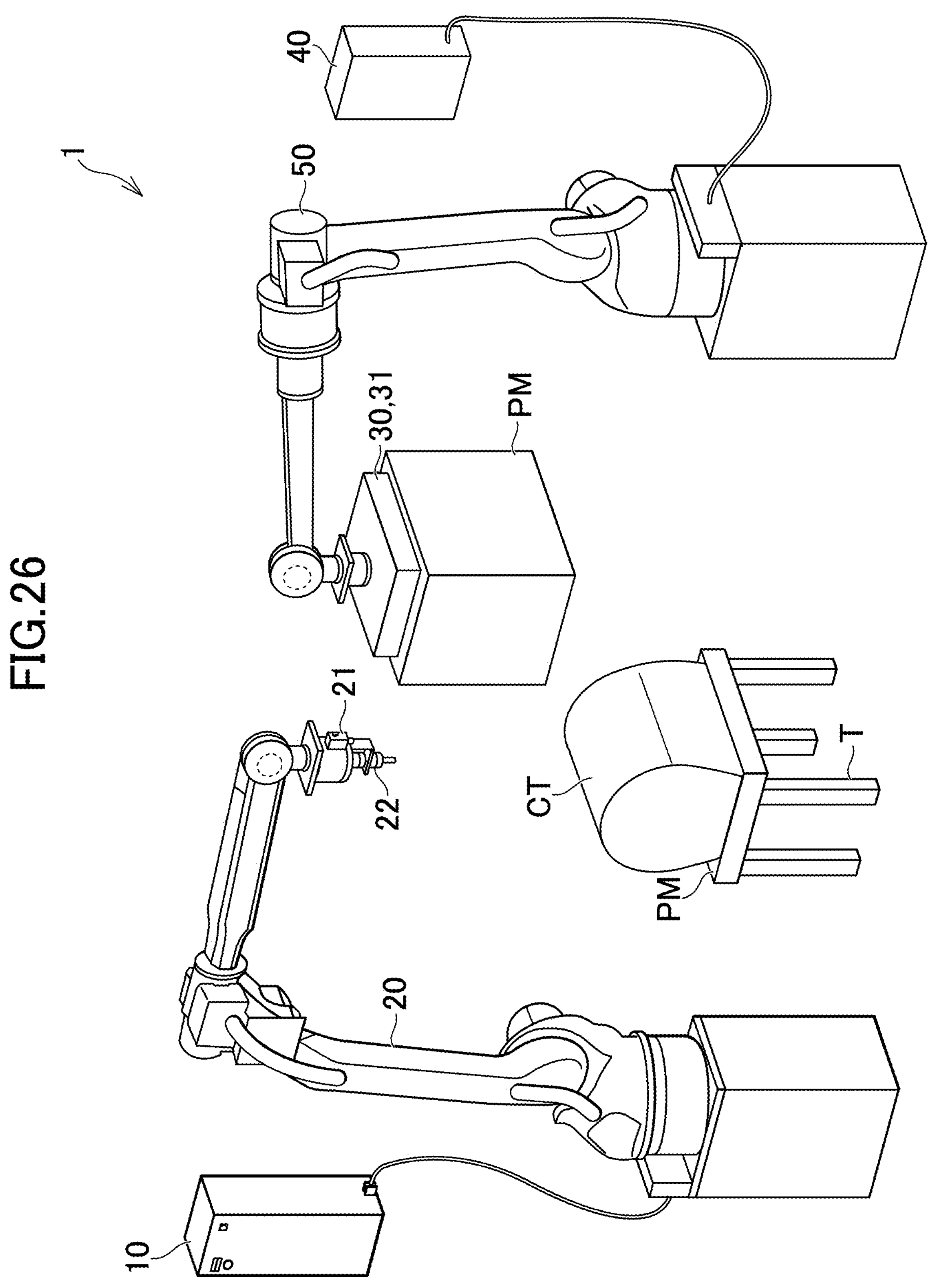
FIG. 26 is a diagram for illustrating an example of how an upper portion of the packaging material is removed in Modification Example 2-3.

FIG. 26 is a diagram for illustrating an example of how the upper portion of the packaging material PM is removed in Modification Example 2-3. In Modification Example 2-3, the second fixing control module 402B controls the second robot 50 so that the second robot 50 fixes the top face of the packaging material PM. The processing by the second fixing control module 402B in this case is the same as the processing of the first fixing control module 402A described in Modification Example 2-1. The second robot 50 presses on the packaging material PM from the top face while the packaging material PM is being cut, and after the cutting of the packaging material PM is complete, removes the upper portion of the packaging material PM in the same process. The upper portion of the packaging material PM is, of the packaging material PM, the portion on the upper side that is separated by the cut surface.

For example, the removal control module 403 includes an upper portion removal control module 403A which controls the second robot 50 so that the second robot 50 removes the upper portion after the cutting of the packaging material PM is complete. When the second robot controller 40 receives the cutting completion notification from the first robot controller 10, the upper portion removal control module 403A moves the upper portion of the packaging material PM to another location while maintaining suction by the suction device 31 of the fixing device 30. The movement destination position of the upper portion of the packaging material PM is determined in advance in the data storage unit 400.

For example, the upper portion removal control module 403A calculates a movement path from the current position at which the fixing device 30 is fixing the packaging material PM to the movement destination position based on the any algorithm described above, and controls the second robot 50 based on the calculated movement path. The upper portion removal control module 403A turns off suction by the suction device 31 when the fixing device 30 is moved to the movement destination position. The upper portion of the packaging material PM is arranged at the movement destination position. The upper portion removal control module 403A controls the second robot 50 so that the fixing device 30 moves to the initial position.

Modification Example 2-2 and Modification Example 2-3 may be combined. In this case, the removal control module 403 may control the second robot 50 so that, after the first robot 20 completes the cutting of the packaging material PM, and a worker removes the upper portion of the packaging material PM and takes out the content CT, the second robot 50 moves the bottom portion of the packaging material PM to another location while maintaining suction by the suction device 31 of the fixing device 30. The bottom portion of the packaging material PM is, of the packaging material PM, the portion on the lower side separated by the cut surface.

The robot control system 1 of Modification Example 2-3 controls the second robot 50 so that the second robot 50 removes the upper portion or the bottom portion of the packaging material PM after the cutting of the packaging material PM is complete. The packaging material PM can be efficiently removed by the second robot 50 which fixes the packaging material PM removing the upper portion or the bottom portion of the packaging material PM, and as a result, takt time is improved.

Further, when the robot control system 1 controls the second robot 50 so that the second robot 50 fixes the top face of the packaging material PM, the robot control system 1 controls the second robot 50 so that the second robot 50 removes the upper portion after the cutting of the packaging material PM is complete. The packaging material PM can be efficiently removed by the second robot 50 fixing the top face of the packaging material PM and removing the upper portion of the packaging material PM under a state in which the packaging material PM is still fixed, and as a result, takt time is improved.

Modification Example 2-4

For example, the work table T may be rotatable. In this case, the first robot 20 does not move around the packaging material PM placed on the work table T like in the second embodiment, but the packaging material PM may be cut by rotating the work table T. In Modification Example 2-4, like in Modification Example 2-1, a case in which the work table T is rotated under a state in which the top face of the packaging material PM is fixed by the second robot 50 is given as an example.

Figure 27:
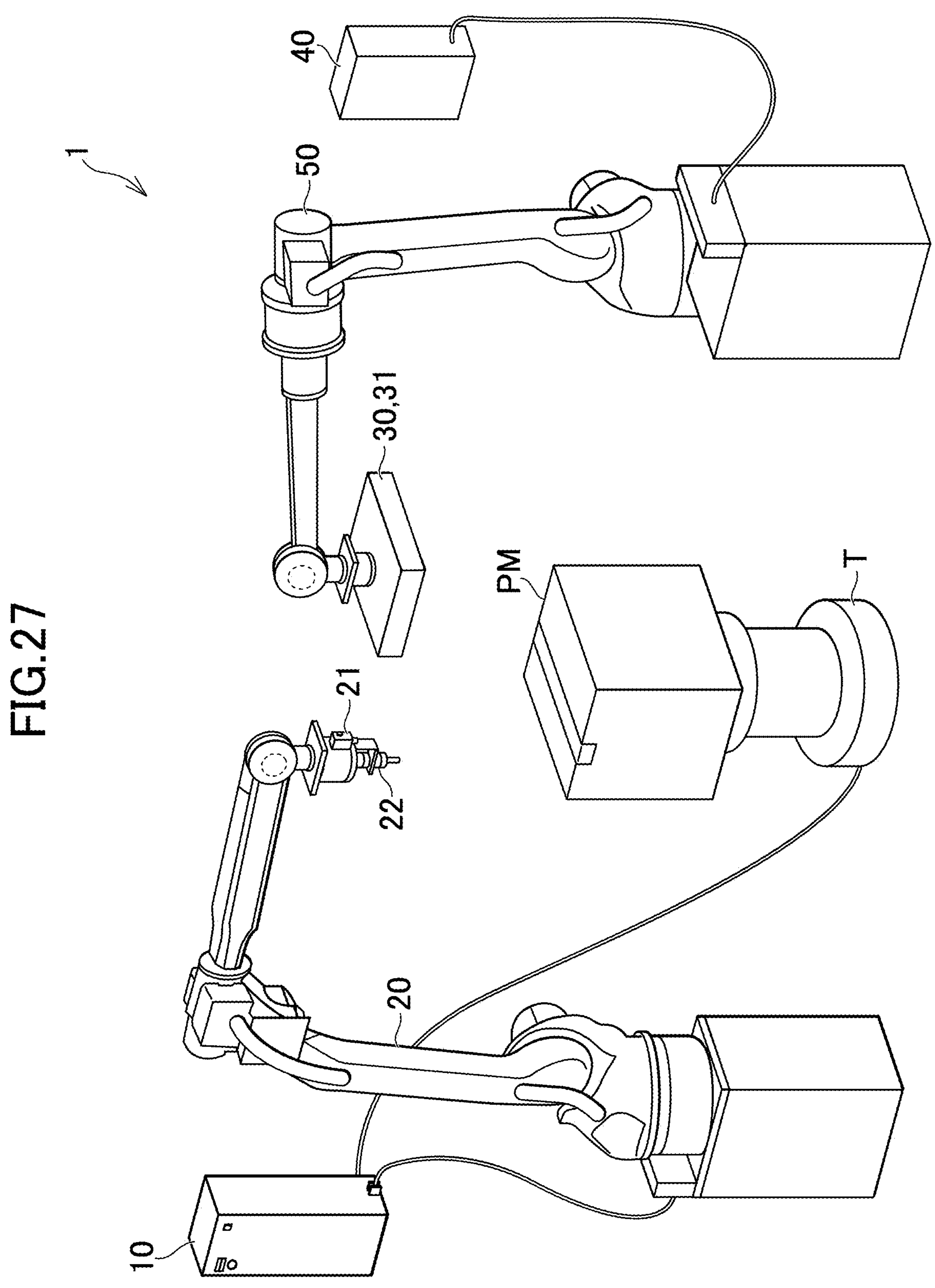
FIG. 27 is a diagram for illustrating an example of how a work table is rotated in Modification Example 2-4.

FIG. 27 is a diagram for illustrating an example of how the work table T is rotated in Modification Example 2-4. In Modification Example 2-4, description is given of a case in which the first robot controller 10 rotates the work table T, but the work table T may be rotated by another device other than the first robot controller 10. The control by which the second robot controller 40 causes the second robot 50 to fix the top face of the packaging material PM may be the same as in Modification Example 2-1.

The work table T in Modification Example 2-4 includes at least one motor. The work table T itself may be a publicly known turntable. The work table T is rotated based on rotation by the motor of the work table T. The work table T may include various sensors such as a motor encoder for detecting the rotational position of the motor. The first robot controller 10 includes a power line for causing the motor of the work table T to rotate. The first robot controller 10 rotates the work table T by controlling electric power to be supplied to the power line.

The robot control system 1 includes the rotation control module 404. The rotation control module 404 rotates the packaging material PM under a state in which the packaging material PM is fixed by the second robot 50. For example, when the fixing of the packaging material PM is complete, the second robot controller 40 transmits a fixing completion notification indicating that the fixing of the packaging material PM is complete to the first robot controller 10. When the first robot controller 10 receives the fixing completion notification, the first robot controller 10 identifies that fixing of the packaging material PM is complete.

For example, when the first robot controller 10 receives the fixing completion notification, the first robot controller 10 controls the first robot 20 so that the cutter 22 comes into contact with the corner C1. This control may be the same as in the second embodiment. Then, the rotation control module 404 rotates the work table T at a predetermined speed. The first robot controller 10 controls the first robot 20 so that the movement path of the cutter 22 is relatively similar to the movement path of FIG. 13 based on the position and the shape of the packaging material PM identified in advance and the rotational speed of the work table T. As the method of controlling the first robot 20 at this time, a publicly known cutting method using a turntable can be used.

The second robot controller 40 controls a tip motor so that the fixing device 30 rotates to match the rotation of the work table T. For example, when starting the rotation of the work table T, the first robot controller 10 transmits to the second robot controller 40 a rotation start notification indicating that the rotation of the work table T is to be started. When the second robot controller 40 receives the rotation start notification, the second robot controller 40 starts rotating the fixing device 30. Then, the rotation of the work table T and the rotation of the fixing device 30 are synchronized by performing communication between the first robot controller 10 and the second robot controller 40 until the cutting of the packaging material PM is complete.

The robot control system 1 of Modification Example 2-4 includes a second robot 50 different from the first robot 20, and rotates the packaging material PM under a state in which the second robot 50 fixes the packaging material PM. The packaging material PM can be rotated in a fixed state. For example, the robot control system 1 can rotate the packaging material PM and cut the side faces with the cutter 22.

Modification Example 2-5

For example, the second robot controller 40 may control the second robot 50 so that the position fixed by the fixing device 30 dynamically changes during the cutting of the packaging material PM. In Modification Example 2-5, the work table T does not rotate as in Modification Example 2-4, but like Modification Example 2-1, the first robot 20 moves around the packaging material PM and cuts the packaging material PM. The robot control system 1 of Modification Example 2-5 includes the cutting place identification module 405. The second robot 50 in Modification Example 2-5 may include a robot hand as the fixing device 30 instead of the suction device 31.

The cutting place identification module 405 identifies the cutting place of packaging material PM. The cutting place is the position at which the blade 220 of the cutter 22 touches the packaging material PM. The first robot controller 10 can identify the cutting place of the packaging material PM based on a detection signal from a sensor such as a motor encoder, a position sensor, or a contact sensor. The cutting place may be identified based on photographed images generated by the camera 21. The first robot controller 10 transmits cutting place data indicating the cutting place of the packaging material PM to the second robot controller 40.

For example, the second robot controller 40 receives the cutting place data from the first robot controller 10. The cutting place identification module 405 identifies the cutting place of the packaging material PM based on the cutting place data. When the cutting place data indicates coordinates of the cutting place in a coordinate system based on the first robot 20, the cutting place identification module 405 converts those coordinates to coordinates in a coordinate system based on the second robot 50. The cutting place identification module 405 identifies the cutting place of the packaging material PM based on the converted coordinates. The coordinate system conversion may be executed by the first robot controller 10.

The fixing control module 402 in Modification Example 2-5 includes a third fixing control module 402C. The third fixing control module 402C controls the second robot 50 so that the second robot 50 fixes the packaging material PM at a position corresponding to the cutting place. It is assumed that a relationship between the cutting place and the fixing position of the packaging material PM is stored in advance in the data storage unit 400. The relationship may be defined as part of a program code, or may be defined as data having another format such as a table format. The third fixing control module 402C controls the second robot 50 so that the second robot 50 fixes the packaging material PM at the fixing position associated with the cutting place.

For example, in a case in which the first robot 20 cuts the packaging material PM based on a movement path like that of FIG. 13, when the cutting place is near the corner C1, the third fixing control module 402C controls the second robot 50 so that, like Modification 2-1, the fixing position is near the center point of the top face of the packaging material PM. When the cutting of the packaging material PM progresses and the cutting place reaches the corner C3, the packaging material PM has been cut between the corner C1 and the corner C2 and between the corner C2 and the corner C3, and thus the third fixing control module 402C controls the second robot 50 so that the fixing position moves from near the center point of the top face of the packaging material PM in the direction of the vertex V7 so that the uncut portion can be pressed down.

For example, when the cutting of packaging material PM further progresses and the cutting place reaches the corner C4, the only uncut portion of the packaging material PM is between the corner C4 and the corner C1, and thus the second robot 50 is controlled so that the fixing position moves to a vicinity between the vertex V7 and the vertex V1 of the packaging material PM so that the portion that has not been cut can be pressed on.

The robot control system 1 of Modification Example 2-5 controls the second robot 50 so that the second robot 50 fixes the packaging material PM at a position corresponding to the cutting place. In the robot control system 1, the position at which the second robot 50 fixes the packaging material PM changes based on the cutting place, and the packaging material PM can be fixed at the optimal position corresponding to the cutting place, and thus the packaging material PM is less likely to move.

Modification Example 2-6

For example, in Modification Example 2-1, a case in which the second robot 50 presses on the packaging material PM from the top face is given as an example, but the second robot controller 40 may control the second robot 50 so that the second robot 50 presses on the corners of the packaging material PM. The robot control system 1 of Modification Example 2-6 includes a fourth fixing control module 402D. The second robot 50 in Modification Example 2-6 may include a robot hand as the fixing device 30 instead of the suction device 31. The second robot 50 in Modification Example 2-6 presses on the side faces of the packaging material PM.

In Modification Example 2-6, description is given of the fixing position of the second robot 50 in a case in which the first robot 20 cuts the packaging material PM by moving along a movement path MP like that of FIG. 13. The fourth fixing control module 402D controls the second robot 50 so that the second robot 50 presses on the corners of the packaging material PM. The second robot controller 40 can communicate to and from the first robot controller 10 to acquire the cutting place of the packaging material PM in real time. This point is as described in Modification Example 2-5.

For example, when the first robot 20 cuts between the corner C1 and the corner C2, a force acts on the packaging material PM in the direction from the corner C1 to the corner C2, and hence, in order to press in the direction opposite to the direction from the corner C1 to the corner C2 (direction from corner C2 to corner C1), the fourth fixing control module 402D controls the second robot 50 so that the fixing position is near the corner C2. When the first robot 20 cuts between the corner C2 and the corner C3, a force acts on the packaging material PM in the direction from the corner C2 to the corner C3, and hence, in order to press in the direction opposite to the direction from the corner C2 to the corner C3 (direction from corner C3 to corner C2), the fourth fixing control module 402D controls the second robot 50 so that the fixing position is near the corner C3.

For example, when the first robot 20 cuts between the corner C3 and the corner C4, a force acts on the packaging material PM in the direction from the corner C3 to the corner C4, and hence, in order to press in the direction opposite to the direction from the corner C3 to the corner C4 (direction from corner C4 to corner C3), the fourth fixing control module 402D controls the second robot 50 so that the fixing position is near the corner C4. When the first robot 20 cuts between the corner C4 and the corner C1, a force acts on the packaging material PM in the direction from the corner C4 to the corner C1, and hence, in order to press in the direction opposite to the direction from the corner C4 to the corner C1 (direction from corner C1 to corner C4), the fourth fixing control module 402D controls the second robot 50 so that the fixing position is near the corner C1.

The robot control system 1 of Modification Example 2-6 includes a second robot 50 different from the first robot 20, and controls the second robot 50 so that the second robot 50 presses on the corner C1 of the packaging material PM. The robot control system 1 uses the second robot 50 to press on the corner C1 of the packaging material PM, and as a result, the packaging material PM is less likely to move.

Modification Example 2-7

For example, the second robot controller 40 may use the robot 50 to support the packaging material PM in the direction opposite to the force applied to the packaging material PM by the blade 220. This control also includes the control described in Modification Example 2-6 as one mode. The robot control system 1 of Modification Example 2-7 includes a fifth fixing control module 402E.

The fifth fixing control module 402E controls the second robot 50 so that the second robot 50 fixes the packaging material PM by supporting the packaging material PM in the direction opposite to the direction of the force applied to the packaging material PM by the blade 220. The fifth fixing control module 402E may perform the same control as that of the fourth fixing control module 402D described in Modification Example 2-7, or may support the side faces instead of the corners C1 to C4.

For example, when the first robot 20 cuts between the corner C1 and the corner C2, a force acts on the packaging material PM in the direction from the corner C1 to the corner C2, and hence the fifth fixing control module 402E controls the second robot 50 to press on the side face bound by the vertices V3, V4, V6, and V5. When the first robot 20 cuts between the corner C2 and the corner C3, a force acts on the packaging material PM in the direction from the corner C2 to the corner C3, and hence the fifth fixing control module 402E controls the second robot 50 to press on the side face bound by the vertices V5, V6, V8, and V7.

For example, when the first robot 20 cuts between the corner C3 and the corner C4, a force acts on the packaging material PM in the direction from the corner C3 to the corner C4, and hence the fifth fixing control module 402E controls the second robot 50 to press on the side face bound by the vertices V1, V2, V8, and V7. When the first robot 20 cuts between the corner C4 and the corner C1, a force acts on the packaging material PM in the direction from the corner C4 to the corner C1, and hence the fifth fixing control module 402E controls the second robot 50 to press on the side face bound by the vertices V1, V2, V4, and V3.

The robot control system 1 of Modification Example 2-7 includes a second robot 50 different from the first robot 20, and controls the second robot 50 so that the second robot 50 fixes the packaging material PM by supporting the packaging material PM in the direction opposite to the force applied to the packaging material PM by the blade 220. The robot control system 1 uses the second robot 50, which is different from the first robot 20 that cuts the packaging material PM, to support the packaging material PM in the direction opposite to the force applied to the packaging material PM by the cutter 22, and as a result, the packaging material PM is less likely to move.

Modification Example 2-8

For example, in Modification Example 2-5, description has been given of a case in which the second robot 50 fixes the packaging material PM at a position corresponding to the cutting place. In Modification Example 2-8, description is given of a case in which the second robot controller 40 controls the second robot 50 so that the second robot 50 fixes the packaging material PM in accordance with a cutting situation, an example of which is the cutting place in Modification Example 2-5. The robot control system 1 of Modification Example 2-8 includes the cutting situation identification module 406.

The cutting situation identification module 406 identifies a cutting situation of the packaging material PM. The cutting situation is not limited to a cutting place like that in Modification Example 2-5, but may be, for example, the moving speed of the cutter 22 or the torque on the cutter 22. The first robot controller 10 can identify the cutting situation of the packaging material PM based on a detection signal from a sensor such as a motor encoder, a position sensor, a contact sensor, a position sensor, an acceleration sensor, or a torque sensor. The first robot controller 10 transmits cutting situation data indicating the cutting situation of the packaging material PM to the second robot controller 40. For example, the second robot controller 40 receives cutting situation data from the first robot controller 10. The cutting situation identification module 406 identifies the cutting situation of the packaging material PM based on the cutting situation data.

The fixing control module 402 in Modification Example 2-8 includes a sixth fixing control module 402F. The sixth fixing control module 402F controls the second robot 50 so that the second robot 50 fixes the packaging material PM based on the cutting situation. It is assumed that a relationship between the cutting situation and the method of fixing the packaging material PM is stored in advance in the data storage unit 400. The relationship may be defined as part of a program code, or may be defined as data having another format such as a table format. The sixth fixing control module 402F controls the second robot 50 so that the second robot 50 fixes the packaging material PM by using the fixing method associated with the cutting situation.

For example, the sixth fixing control module 402F may perform the same control as that of the fifth fixing control module 402E. Examples of a fixing method other than position-based fixing include fixing by using a force. The fixing force is a suction force or a pressing force. For example, the sixth fixing control module 402F controls the second robot 50 such that when the force applied by the cutter 22 to the packaging material PM is stronger, the fixing force is stronger.

The robot control system 1 of Modification Example 2-8 controls the second robot 50 so that the second robot 50 fixes the packaging material PM based on the cutting situation of the packaging material PM. The robot control system 1 can implement the optimal fixing corresponding to the cutting situation by using the second robot 50 to fix the packaging material PM based on the cutting situation of the packaging material PM.

Modification Example 2-9

For example, at the corners of the packaging material PM, there may be a portion on which the corrugated cardboard is pasted, and hence, when the cutter 22 cuts a corner of the packaging material PM, a larger force may be applied to the packaging material PM than when the cutter 22 cuts the faces of the packaging material PM. Thus, the second robot controller 40 may control the second robot 50 so that when the cutter 22 cuts the corners of the packaging material PM, the second robot 50 fixes the packaging material PM by using a stronger fixing force.

The fixing control module 402 in Modification Example 2-9 includes a seventh fixing control module 402G. The seventh fixing control module 402G controls the second robot 50 so that the force the second robot 50 uses to fix the packaging material PM becomes stronger when the first robot 20 cuts the corner C1 of the packaging material PM with the cutter 22 than when the first robot 20 cuts a face of the packaging material PM with the cutter 22. In Modification Example similarly 2-9, to Modification Example 2-5, it is assumed that the second robot controller 40 receives cutting place data from the first robot controller 10. As a result, the second robot controller 40 can identify whether the cutter 22 is cutting a corner or a face of the packaging material PM.

For example, the seventh fixing control module 402G controls the suction device 31 of the second robot 50 so that the suction force generated when the first robot 20 cuts the corner C1 of the packaging material PM with the cutter 22 is stronger than the suction force generated when the first robot 20 cuts a face of the packaging material PM with the cutter 22. The seventh fixing control module 402G may control the second robot 50 so that a pressing force generated when the first robot 20 cuts the corner C1 of the packaging material PM with the cutter 22 is stronger than the pressing force generated when the first robot 20 cuts a face of the packaging material PM with the cutter 22.

The robot control system 1 of Modification Example 2-9 controls the second robot 50 so that the force the second robot 50 uses to fix the packaging material PM becomes stronger when the first robot 20 cuts the corner C1 of the packaging material PM with the cutter 22 than when the first robot 20 cuts a face of the packaging material PM with the cutter 22. In the robot control system 1, even when a stronger force is applied to the packaging material PM when the first robot 20 cuts the corner C1 of the packaging material PM with the cutter 22 than when the first robot 20 cuts a face of the packaging material PM with the cutter 22, the packaging material PM is less likely to move.

Modification Example 2-10

For example, depending on a property of the packaging material PM, the packaging material PM may be damaged when the packaging material PM is fixed too strongly. As another example, depending on a property of the packaging material PM, the packaging material PM may be constructed from a material that moves easily. Thus, the second robot controller 40 may control the second robot 50 so that the second robot 50 performs fixing in accordance with the property of the packaging material PM. The robot control system 1 of Modification Example 2-10 includes the property identification module 407. The property identification module 407 identifies the property of the packaging material PM. The property identification module 407 may be the same as in Modification Examples 1-5, except for the point that the property identification module 407 is implemented by the second robot controller 40. The property identification module 407 of the second robot controller 40 may acquire from the first robot controller 10 the result of property identification by the property identification module 108 of the first robot controller 10.

The fixing control module 402 in Modification Example 2-10 includes an eighth fixing control module 402H. The eighth fixing control module 402H controls the fixing portion 300 based on the property of the packaging material PM. A relationship between the property of the packaging material PM and the method of fixing the packaging material PM is stored in advance in the data storage unit 400. The relationship may be defined as part of a program code, or may be defined as data having another format such as a table format. The eighth fixing control module 402H controls the second robot 50 so that the second robot 50 fixes the packaging material PM based on a fixing method associated with the property of the packaging material PM.

For example, the eighth fixing control module 402H controls the second robot 50 so that the second robot 50 uses a weaker fixing force to fix the packaging material PM when the surface of the packaging material PM is wet than when the surface of the packaging material is not wet. The eighth fixing control module 402H controls the second robot 50 so that the second robot 50 uses a stronger fixing force to fix the packaging material PM when the packaging material PM is large than when the packaging material is small.

The robot control system 1 of Modification Example 2-10 controls the fixing portion 300 based on the property of the packaging material PM. The robot control system 1 can fix the packaging material PM based on a fixing method associated with the property of the packaging material PM.

Other Modification Examples Relating to Second Embodiment

For example, the second robot controller 40 may transmit the torque detected when the second robot 50 is pressing on the packaging material PM to the first robot controller 10. The first robot controller 10 may control the speed of the cutter 22 based on the torque. The second robot controller 40 may detect the torque by using the torque sensor of the second robot 50, or may detect the torque by using a force sensor that can detect the force pressing on the packaging material PM. The second robot controller 40 may arrange the packaging material PM removed by the second robot 50 on a conveyor. A device for compressing and disposing of the packaging material PM may be arranged at the end of the conveyor.

3-3. Other Modification Examples

For example, the above-mentioned modification examples may be combined.

For example, each of the functions described above may be implemented by any device of the robot control system 1. The functions described as being included in the robot controller 10 (first robot controller 10) may be implemented by the second robot controller 40 or another device. The functions described as being included in the second robot controller 40 may be implemented by the robot controller 10 (first robot controller 10) or another device. The functions described as being implemented by one device may be shared among a plurality of devices.

4. Supplementary Notes Relating to First Embodiment

For example, the robot control system according to the first embodiment can also have the following configurations.

(1-1)

A robot control system, including:

a robot configured to hold a cutter; and a robot controller configured to control the robot so that the robot cuts a packaging material with a blade of the cutter, the robot controller including an orientation control module configured to control the robot so that the blade is oriented more toward an outer side of the packaging material when the robot cuts a face of the packaging material with the blade than when the robot cuts a corner of the packaging material with the blade.

(1-2)

The robot control system according to Item (1-1), wherein the orientation control module includes a first orientation control module configured to control the robot to cause the blade to enter the corner of the packaging material, orient the blade toward an outer side of the packaging material, and cut the face of the packaging material with the blade.

(1-3)

The robot control system according to Item (1-1) or (1-2), wherein the cutter includes a body including the blade, and a tip, and wherein the orientation control module includes a second orientation control module configured to change an orientation of the blade so that the tip is arranged between a content of the packaging material and the body.

(1-4)

The robot control system according to any one of Items (1-1) to (1-3), wherein the blade is arranged at one edge portion of the cutter, wherein the one edge portion is sharper than another edge portion of the cutter, and wherein the orientation control module includes a third orientation control module configured to change an orientation of the blade so that the another edge portion is arranged between a content of the packaging material and the one edge portion.

(1-5)

The robot control system according to any one of Items (1-1) to (1-4), wherein the robot is configured to hold a camera, wherein the robot control system further includes a shape recognition module configured to recognize a shape of the packaging material based on the camera, and wherein the robot controller includes a first cutting control module configured to control the robot so that the robot cuts below a bulge on a side face of the packaging material with the blade based on the shape.

(1-6)

The robot control system according to any one of Items (1-1) to (1-5), wherein the robot is configured to hold a camera, wherein the robot control system further includes a dent recognition module configured to recognize a dent of the packaging material based on the camera, and wherein the robot controller includes a second cutting control module configured to control the robot so that the robot cuts a position corresponding to the dent with the blade.

(1-7)

The robot control system according to any one of Items (1-1) to (1-6), wherein the robot controller includes a speed control module configured to control the robot so that a speed of the cutter changes between when the robot cuts the face of the packaging material with the blade and when the robot cuts the corner of the packaging material with the blade.

(1-8)

The robot control system according to any one of Items (1-1) to (1-7), wherein the robot controller includes a third cutting control module configured to control the robot so that a torque on the blade changes between when the robot cuts the face of the packaging material with the blade and when the robot cuts the corner of the packaging material with the blade.

(1-9)

The robot control system according to any one of Items (1-1) to (1-8), further including a property identification module configured to identify a property of the packaging material, wherein the orientation control module includes a fourth orientation control module configured to control the robot so that an orientation of the blade changes based on the property.

(1-10)

The robot control system according to any one of Items (1-1) to (1-9), further including a type identification module configured to identify a type of a content of the packaging material, wherein the orientation control module includes a fifth orientation control module configured to control the robot so that an orientation of the blade changes based on the type.

(1-11)

The robot control system according to any one of Items (1-1) to (1-10), further including a thickness detection module configured to detect a thickness of the packaging material based on a torque on the blade, wherein the orientation control module includes a sixth orientation control module configured to control the robot so that an orientation of the blade changes based on the thickness.

(1-12)

The robot control system according to any one of Items (1-1) to (1-11), wherein the robot controller includes a robot control module configured to control the robot so that the robot cuts the packaging material in which a bag-shaped content is packaged with the blade.

5. Supplementary Notes Relating to Second Embodiment

For example, the robot control system according to the second embodiment can also have the following configurations.

(2-1)

A robot control system, including:

a fixing portion configured to contact a bottom face of a packaging material, and to fix at least a part of a portion in contact with the bottom face;

a robot configured to hold a cutter; and a robot control module configured to control the robot so that the robot rotates around and cuts a side face of the packaging material with a blade of the cutter.

(2-2)

The robot control system according to Item (2-1), wherein the fixing portion includes a suction device configured to suck the at least a part of a portion in contact with the bottom face.

(2-3)

The robot control system according to Item (2-2), further including a suction device control module configured to control the suction device so that a suction force of the suction device increases when the robot rotates around and cuts the side face of the packaging material with the blade.

(2-4)

The robot control system according to any one of Items (2-1) to (2-3), further including:

another robot different from the robot; and a first fixing control module configured to control the another robot so that the another robot fixes the packaging material by supporting the packaging material in a direction different from a direction of a force applied to the packaging material by the blade.

(2-5)

The robot control system according to any one of Items (2-1) to (2-4), further including:

another robot different from the robot; and a second fixing control module configured to control the another robot so that the another robot fixes a top face of the packaging material or the at least a part of a portion in contact with the bottom face.

(2-6)

The robot control system according to Item (2-5), further including a removal control module configured to control the another robot so that the another robot removes an upper portion or a bottom portion of the packaging material after cutting of the packaging material is complete.

(2-7)

The robot control system according to Item (2-6), wherein the second fixing control module is configured to control the another robot so that the another robot fixes the top face of the packaging material, and wherein the removal control module includes an upper portion removal control module configured to control the another robot so that the another robot removes the upper portion after cutting of the packaging material is complete.

(2-8)

The robot control system according to any one of Items (2-1) to (2-7), further including:

another robot different from the robot; and a rotation control module configured to rotate the packaging material under a state in which the packaging material is fixed by the another robot.

(2-9)

The robot control system according to any one of Items (2-1) to (2-8), further including:

another robot different from the robot;

a cutting place identification module configured to identify a cutting place of the packaging material; and a third fixing control module configured to control the another robot so that the another robot fixes the packaging material at a position corresponding to the cutting place.

(2-10)

The robot control system according to any one of Items (2-1) to (2-9), further including:

another robot different from the robot; and a fourth fixing control module configured to control the another robot so that the another robot presses on a corner of the packaging material.

(2-11)

The robot control system according to any one of Items (2-1) to (2-10), further including:

another robot different from the robot; and a fifth fixing control module configured to control the another robot so that the another robot fixes the packaging material by supporting the packaging material in a direction opposite to a direction of a force applied to the packaging material by the blade.

(2-12)

The robot control system according to any one of Items (2-1) to (2-11), further including:

another robot different from the robot;

a cutting situation identification module configured to identify a cutting situation of the packaging material; and a sixth fixing control module configured to control the another robot so that the another robot fixes the packaging material based on the cutting situation.

(2-13)

The robot control system according to any one of Items (2-1) to (2-12), further including:

another robot different from the robot; and a seventh fixing control module configured to control the another robot so that a force the another robot uses to fix the packaging material becomes stronger when the robot cuts a corner of the packaging material with the cutter than when the robot cuts a face of the packaging material with the cutter.

(2-14)

The robot control system according to any one of Items (2-1) to (2-13), further including:

a property identification module configured to identify a property of the packaging material; and an eighth fixing control module configured to control the fixing portion based on the property.

(2-15)

A method of fixing a packaging material by using a fixing portion configured to, when a robot including a cutter is controlled so that the robot rotates around and cuts a side face of the packaging material with a blade of the cutter, contact a bottom face of the packaging material and to fix at least a part of a portion in contact with the bottom face.

(2-16)

A fixing device configured to, when a robot including a cutter is controlled so that the robot rotates around and cuts a side face of a packaging material with a blade of the cutter, contact a bottom face of the packaging material and to fix at least a part of a portion in contact with the bottom face.

(2-17)

A method of fixing a packaging material, the method including fixing at least a part of a portion in contact with a bottom face of the packaging material by using a fixing portion configured to contact the bottom face of the packaging material so that the packaging material is prevented from being moved by an external force received from a side face of the packaging material.

(2-18)

A fixing device configured to contact a bottom face of a packaging material which receives an external force from a side face and to fix at least a part of a portion in contact with the bottom face.

While there have been described what are at present considered to be certain embodiments of the invention, it will be understood that various modifications may be made thereto, and it is intended that the appended claims cover all such modifications as fall within the true spirit and scope of the invention.

The invention claimed is:

1. A robot control system, comprising:

a robot configured to hold a cutter; and circuitry configured to:

control the robot so that the robot cuts a packaging material with a blade of the cutter, and control the robot to direct the blade in a first orientation where the robot cuts a corner of the packaging material with the blade, and rotate the blade by a predetermined angle from the first orientation to a second orientation, oriented more toward an outer side of the packaging material than the first orientation, where the robot cuts a face immediately downstream of the corner of the packaging material with the blade.

2. The robot control system according to claim 1, wherein the circuitry is configured to control the robot to cause the blade to enter the corner of the packaging material, orient the blade toward an outer side of the packaging material, and cut the face of the packaging material with the blade.

3. The robot control system according to claim 1, wherein the cutter includes a body including the blade, and a tip, and wherein the circuitry is configured to change an orientation of the blade so that the tip is arranged between a content of the packaging material and the body.

4. The robot control system according to claim 1, wherein the blade is arranged at one edge of the cutter, wherein the one edge is sharper than another edge of the cutter, and wherein the circuitry is configured to change an orientation of the blade so that the another edge is arranged between a content of the packaging material and the one edge.

5. The robot control system according to claim 1, wherein the robot is configured to hold a camera, wherein the circuitry is configured to:

recognize a shape of the packaging material based on the camera, and control the robot so that the robot cuts below a bulge on a side face of the packaging material with the blade based on the shape.

6. The robot control system according to claim 1, wherein the robot is configured to hold a camera, wherein the circuitry is configured to:

recognize a dent of the packaging material based on the camera, and control the robot so that the robot cuts a position corresponding to the dent with the blade.

7. The robot control system according to claim 1, wherein the circuitry is configured to control the robot so that a speed of the cutter changes between when the robot cuts the face of the packaging material with the blade and when the robot cuts the corner of the packaging material with the blade.

8. The robot control system according to claim 1, wherein the circuitry is configured to control the robot so that a torque on the blade changes between when the robot cuts the face of the packaging material with the blade and when the robot cuts the corner of the packaging material with the blade.

9. The robot control system according to claim 1, wherein the circuitry is configured to:

identify a property of the packaging material, and control the robot so that an orientation of the blade changes based on the property.

10. The robot control system according to claim 1, wherein the circuitry is configured to:

identify a type of a content of the packaging material, and control the robot so that an orientation of the blade changes based on the type.

11. The robot control system according to claim 1, wherein the circuitry is configured to:

detect a thickness of the packaging material based on a torque on the blade, and control the robot so that an orientation of the blade changes based on the thickness.

12. The robot control system according to claim 1, wherein the circuitry is configured to control the robot so that the robot cuts the packaging material in which a bag-shaped content is packaged with the blade.

13. The robot control system according to claim 1, wherein the robot control system is configured to contact a bottom face of the packaging material, and to fix at least a part in contact with the bottom face.

14. The robot control system according to claim 13, further comprising a suction device configured to suck the at least the part in contact with the bottom face.

15. The robot control system according to claim 14, wherein the circuitry is configured to control the suction device so that a suction force of the suction device increases when the robot rotates around and cuts the side face of the packaging material with the blade.

16. The robot control system according to claim 1, wherein the circuitry is further configured to control the robot to establish a first angle between a normal of the blade and a normal of a face of the packaging material where the robot cuts a corner immediately upstream of the face of the packaging material with the blade, and rotate the blade to establish a second angle, less than the first angle, between the normal of the blade and the normal of the face of the packaging material where the robot cuts the face of the packaging material with the blade.

17. The robot control system according to claim 1, wherein the circuitry is further configured to control the robot to establish a first angle between a longitudinal axis of the blade and a straight imaginary line connecting two adjacent corners, one upstream and another downstream, of a face of the packaging material where the robot cuts the upstream corner of the packaging material with the blade, and rotate the blade to establish a second angle, less than the first angle, between the longitudinal axis of the blade and the straight imaginary line where the robot cuts the face of the packaging material with the blade.

18. The robot control system according to claim 1, wherein the circuitry is further configured to control the robot to establish a first angle between a longitudinal axis of the blade and a normal of a face of the packaging material where the robot cuts a corner immediately upstream of the face of the packaging material with the blade, and rotate the blade to establish a second angle, less than the first angle, between the longitudinal axis of the blade and the normal of the face of the packaging material where the robot cuts the face of the packaging material with the blade.

19. A method of controlling a robot configured to hold a cutter so that the robot cuts a packaging material with a blade of the cutter, the method comprising controlling the robot to direct the blade in a first orientation where the robot cuts a corner of the packaging material with the blade, and rotate the blade by a predetermined angle from the first orientation to a second orientation, oriented more toward an outer side of the packaging material than the first orientation, where the robot cuts a face immediately downstream of the corner of the packaging material with the blade.

20. A non-transitory computer-readable information storage medium storing a program that causes a robot controller, the robot controller controlling a robot configured to hold a cutter so that the robot cuts a packaging material with a blade of the cutter, to:

control the robot to direct the blade in a first orientation where the robot cuts a corner of the packaging material with the blade, and rotate the blade by a predetermined angle from the first orientation to a second orientation, oriented more toward an outer side of the packaging material than the first orientation, where the robot cuts a face immediately downstream of the corner of the packaging material with the blade.

* * * * *